United States Patent
Vargas et al.

(10) Patent No.: US 11,618,105 B2
(45) Date of Patent: Apr. 4, 2023

(54) METHODS FOR ESTABLISHING HYDROPHILIC AND HYDROPHOBIC AREAS ON A SURFACE OF A SUBSTRATE OR FILM AND ASSOCIATED MICROFLUIDIC DEVICES

(71) Applicant: Orbis Diagnostics Limited, Auckland (NZ)

(72) Inventors: Matheus Jose Teixeira Vargas, Auckland (NZ); Miriam Cather Simpson, Auckland (NZ); David Edward Williams, Auckland (NZ)

(73) Assignee: Orbis Diagnostics Limited, Auckland (NZ)

( * ) Notice: Subject to any disclaimer, the term of this patent is extended or adjusted under 35 U.S.C. 154(b) by 0 days.

(21) Appl. No.: 17/832,543

(22) Filed: Jun. 3, 2022

(65) Prior Publication Data

US 2022/0297239 A1   Sep. 22, 2022

Related U.S. Application Data

(63) Continuation of application No. PCT/IB2021/060530, filed on Nov. 13, 2021.
(Continued)

(51) Int. Cl.
*B23K 26/402* (2014.01)
*B23K 26/0622* (2014.01)
(Continued)

(52) U.S. Cl.
CPC .......... *B23K 26/402* (2013.01); *B23K 26/066* (2015.10); *B23K 26/0624* (2015.10); *B23K 26/073* (2013.01); *B23K 2103/42* (2018.08)

(58) Field of Classification Search
CPC .......................... B23K 26/0624; B23K 26/066
See application file for complete search history.

(56) References Cited

U.S. PATENT DOCUMENTS

| 3,626,143 A | 12/1971 | Fry et al. |
| 5,376,252 A | 12/1994 | Ekstroem et al. |
| (Continued) | | |

FOREIGN PATENT DOCUMENTS

| CN | 105833926 A | 8/2016 |
| EP | 2011629 A1 | 1/2009 |
| (Continued) | | |

OTHER PUBLICATIONS

Chen et al., Investigation on polycarbonate surface wetting property with femtosecond laser irradiation and ultrasonic treatment, Feb. 26, 2019, Optics and Laser Technology, 115, pp. 316-324 (Year: 2019).*
(Continued)

*Primary Examiner* — Timothy Kennedy
(74) *Attorney, Agent, or Firm* — Cooley LLP; Matthew Pavao; Brian P. Hopkins

(57) ABSTRACT

Embodiments of the present disclosure are directed to methods, systems and devices, for precise and reduced spot-size capabilities using a laser to alter surfaces without chemical treatment, chemical waste, or chemical residues is provided for microfluidic systems (e.g., lab-on-a-disk, for example). In some embodiments, hydrophobic and super-hydrophilic areas can be created on surfaces in the same material at different areas and positions merely by using different laser settings (e.g., spot size, wavelength, spacing, and/or pulse duration). Accordingly, capillary forces that are a recurrent issue in a microfluidic devices (e.g., a centrifugal microfluidic disk) can be controlled for practical applications, including, for example when users handle the disks and insert a sample, the moment the substrate/device (e.g., disk) is placed in a system (e.g., a centrifugal system), capillary
(Continued)

forces can take place and move the fluids, which becomes a problem for sequential bioassays taking place in substrate/device (e.g., disk). Thus, in some embodiments, the systems, devices and methods increase fluid control in microfluidic devices.

28 Claims, 15 Drawing Sheets

Related U.S. Application Data

(60) Provisional application No. 63/113,589, filed on Nov. 13, 2020.

(51) Int. Cl.
  B23K 26/066 (2014.01)
  B23K 26/073 (2006.01)
  B23K 103/00 (2006.01)

(56) References Cited

U.S. PATENT DOCUMENTS

| | | | |
|---|---|---|---|
| 5,957,579 A | 9/1999 | Kopf-Sill et al. | |
| 6,552,301 B2 | 4/2003 | Herman et al. | |
| 6,734,387 B2 | 5/2004 | Kafka et al. | |
| 9,517,929 B2 | 12/2016 | Hosseini | |
| 10,131,086 B2* | 11/2018 | Gupta | B29C 59/022 |
| 10,786,874 B2* | 9/2020 | Guo | C21D 8/0294 |
| 10,876,193 B2* | 12/2020 | Guo | B23K 26/355 |
| 2008/0248368 A1* | 10/2008 | Dadheech | H01M 8/04119 429/483 |
| 2009/0268265 A1* | 10/2009 | Shah | H04N 1/40037 358/474 |
| 2010/0143744 A1* | 6/2010 | Gupta | H01L 21/02686 438/57 |
| 2010/0172799 A1* | 7/2010 | Roeper | B01L 3/5023 422/68.1 |
| 2012/0008651 A1* | 1/2012 | Bischoff | B23K 26/06 372/25 |
| 2015/0136226 A1* | 5/2015 | Guo | B23K 26/0006 428/141 |
| 2016/0339424 A1* | 11/2016 | Megaridis | B01L 3/502746 |
| 2018/0117797 A1* | 5/2018 | Shin | B23K 26/0624 |
| 2018/0134059 A1* | 5/2018 | Adamson | B41N 3/032 |
| 2019/0054571 A1* | 2/2019 | Ding | B23K 26/122 |
| 2021/0237203 A1* | 8/2021 | Zhong | B05D 7/14 |
| 2022/0161365 A1* | 5/2022 | Tsubaki | B23K 26/355 |

FOREIGN PATENT DOCUMENTS

| | | |
|---|---|---|
| JP | 2014109564 A | 6/2014 |
| WO | WO-2017142958 A1 | 8/2017 |

OTHER PUBLICATIONS

Bachus et al, Fabrication of Patterned Superhydrophobic/Hydrophilic Substrates by Laser Micromachining for Small Volume Deposition and Droplet-Based Fluorescence, ACS Applied Materials and Interfaces, 2017, 9, 7629-7636 (Year: 2017).*
Adao, et al. "Estimation of the Surface Tension Components of Thiodiglycol," Langmuir (1998) 14: 4198-4203.
Aernouts, B., et al., "Visible and near-infrared spectroscopic analysis of raw milk for cow health monitoring: Reflectance or transmittance?," J. Dairy Sci. 94:5315-5329, doi: 10.3168/jds.2011-4354 (2011).
Aghvami et al. "Rapid prototyping of cyclic olefin copolymer (COC) microfluidic devices", Sensors Actuators, B Chem. (2017) 247, 940-949.
Ajmera et al. "Stabilisation of proteins via mixtures of amino acids during spray drying", Int. J Pharm. (2014) 463, 98-107.
Allen, A. H., et al., "Suggestions for the more ready employment of Adams' method of determining fat in milk," The Analyst 11, pp. 71-73 (1886).
Amasia, M., et al., "Large-volume centrifugal microfluidic device for blood plasma separation," Bioanalysis 2(10), pp. 1701-1710 (2010).
Andrade, J.D. "X-ray Photoelectron Spectroscopy (XPS)." Surf. Interfacial Asp. Biomed. Polym., 1985, 105-195.
Argov, N., Lemay, "Milk fat globule structure and function: nanoscience comes to milk production," Trends in Food Science & Technology, 19, pp. 617-623 (2008).
Ashes et al. "Potential to Alter the Content and Composition of Milk Fat Through Nutrition", J Dairy Sci. (1997), 80, 2204-2212.
Atkinson, J.T. et al. "The effect of surface roughness on fringe visibility in optical interferometry." Opt. Lasers Eng., 1980, 1:131-146.
Avik et al. "Roles of chemistry modification for laser textured metal alloys to achieve extreme surface wetting behaviors", Materials & Design, vol. 192, 2020.
Aydin, S. "A short history, principles, and types of ELISA, and our laboratory experience with peptide/protein analyses using ELISA." Peptides, 2015, 72:4-15.
Bale, M.D. et al. "Influence of copolymer composition on protein absorption and structural rearrangements at the polymer surface," J. Colloid Interface Sci., 1989, 132:176-187.
Balter M. L., et al., "Differential leukocyte counting: Via fluorescent detection and image processing on a centrifugal microfluidic platform," Anal. Methods, 8, 8272-8279 (2016).
Baudach et al. "Ultrashort pulse laser ablation of polycarbonate and polymethylmethacrylate", Appl. Surf Sci. (2000) 154, 555-560.
Beattie J. K. et al. "PH and the surface tension of water", J Colloid Interface Sci. (2014) 422, 54-57.
Becker et al. "Polymer microfluidic devices", Talanta (2002), 56, 267-287.
Berthier et al. "Engineers are from PDMS-land, Biologists are from Polystyrenia", Lab Chip (2012) 12, 1224.
Berthomieu, C. et al. "Fourier transform infrared (FTIR) spectroscopy." Photosynth. Res., 101:157-170.
Bhagat et al. "Microfluidics for cell separation", Med. Biol. Eng. Comput .(2010), 48:999-1014.
Bhushan, B. et al. "Lotus effect: surfaces with roughness-induced superhydrophobicity, self-cleaning, and low adhesion." Springer Handbook, 1437-1524.
Bi, H., et al., "Performance enhanced UV /vis spectroscopic microfluidic sensor for ascorbic acid quantification in human blood," Biosensors and Bioelectronics 85, 568-572 (2016).
Bloor, W. R., et al., "A method for the determination of fat in milk (nephelometric method),". J. Am. Chem. Soc. 36, pp. 1300-1304 (1914).
Boone et al. "Plastic advances microfluidic devices", Anal. Chem. (2002) 74, 78A-86A.
Brenner, T. et al. "Frequency-dependent transversal flow control in centrifugal microfluidics," Lab Chip, 2005, 5:146-150.
Brydson, J. "5.3 Polymer Solubility," Plastic Materials, Elsevier Science & Technology, 1999, 80-94.
Burtis, C.A. et al. "Development of a Miniature Fast Analyzer." Clin. Chem., 1972, 18:753-761.
Byszewska-Szpocinska E. et al., "New RIA kit for the determination of progesterone in cows' milk," Journal of Immunoassay and Immunochemistry 27, 279-288, DOI: 10.1080/15321810600734976 (2006).
Cai et al. "Investigation of CassieWenzel Wetting transitions on microstructured surfaces", Colloid Polym. Sci. (2016) 294, 833-840.
Callewaert, K. et al. "Excimer laser induced patterning of polymeric surfaces." Applied Surface Science, 2003, 218-225.
Capitán-Vallvey, L.F. et al. "Recent developments in computer vision-based analytical chemistry: A tutorial review." Anal. Chim. Acta., 2015, 899:23-56.
Carralero V., et al., "Development of a Progesterone Immunosensor Based on a Colloidal Gold-Graphite-Teflon Composite Electrode," Electroanalysis 19, No. 7-8, 853-858, DOI: 10.1002/elan.200603794 (2007).

(56) References Cited

OTHER PUBLICATIONS

Casavant et al. "Suspended microfluidics", Proc. Natl. Acad. Sci. (2013)110, 10111-10116.

Cchiello, E. et al. "A study of the chemical and morphological alterations of PS and PC surfaces induced by excimer laser treatments." J. Mater. Sci., 1989, 24:569-572.

Chen Q.-L., et al., "A fluorescence-based centrifugal microfluidic system for parallel detection of multiple allergens," Proc. of SPIE, vol. 7565, pp. 75650F-1-75650F-7, doi: 10.1117/12.840914 (2010).

Chen, Y. et al. "Fabrication, modification, and application of poly(methyl methacrylate) microfluidic chips." Electrophoresis, 2008, 29:1801-1814.

Chen, Z. et al. "Fabrication and characterization of poly(methyl methacrylate) microchannels by in situ polymerization with a novel metal template." Electrophoresis, 2003, 24:3246-3252.

Cheng et al. "Direct-write laser micromachining and universal surface modification of PMMA for device development", Sensors Actuators, B Chem. (2004) 99, 186-196.

Chin, C.D. et al. "Commercialization of microfluidic point-of-care diagnostic devices." Lap Chip, 2012, 12:2118-2134.

Choi et al. "Digital microfluidics" Annu. Rev. Anal. Chem. (2012) 5, 413-40.

Chércoles Asensio, R. et al. "Analytical characterization of polymers used in conservation and restoration by ATR-FTIR spectroscopy." Analytical and Bioanalytical Chemistry, 2009, 2081-2096.

Chung et al. "Bulge formation and improvement of the polymer in CO2 laser micromachining", J Micromechanics Microengineering (2005) 15, 1878-1884.

Chusuei, CC et al. "X-Ray Photoelectron Spectroscopy." Encyclopedia of Physical Science and Technology, 2003, 921-938.

Claycomb R. W., et al., "Rapid enzyme immunoassay for measurement of bovine progesterone," Biosensors & Bioelectronics 13, 1165-1171 (1998).

Clime et al. "Active pneumatic control of centrifugal microfluidic flows for lab-on-a-chip applications", Lab Chip (2015) 15, 2400-2411.

Colazo M. G., et al., "Comparison of 2 enzyme immunoassays and a radioimmunoassay for measurement of progesterone concentrations in bovine plasma, skim milk, and whole milk," The Canadian Journal of Veterinary Research, 72: 32-36 (2008).

Coons, A.H. et al. "Immunological Properties of an Antibody Containing a Fluorescent Group." Exp. Biol. Med., 1941, 200-202.

Garcia-Cordero J. L., et al., "Microfluidic CD-based somatic cell counter for the early detection of bovine mastitis," Twelfth International Conference on Miniaturized Systems for Chemistry and Life Sciences, pp. 1762-1764 (Oct. 2008).

Dann et al. "Forces involved in the adhesive process. II. Nondispersion forces at solid-liquid interfaces", J Colloid Interface Sci. (1970) 32, 321-331.

Das et al. Large-area microlens arrays fabricated on flexible polycarbonate sheets via single-step laser interference ablation. J Micromechanics Microengineering (2011) 21, 7 pages.

Datta et al. "Age gelation of UHTmilk—A review" Institution of Chemical Engineers, (2001), 14 pages.

Davis et al. "Competition between scission and cross-linking processes in the thermal degradation of a polycarbonate", Nature (1965), No. 4982, 1 page.

Davis et al. Thermal degradation of polycarbonate. J Chem. Soc. B Phys. Org. (1968), 45-47.

De Abreu, et al., "Bovine Reproductive Physiology and Endocrinology," Chapter 2, Reproduction Biotechnology in Farm Animals, Dec. 26, 2017 (39 total pages).

Delwiche et al. "Estrus detection with a progesterone biosensor", Trans. ASAE (2008) 44, 2003-2008.

Delwiche et al. "Improved biosensor for measurement of progesterone in bovine milk", Trans. Am. Soc. Agric. Eng. (2001) 44(6):1997-2002.

Devalckenaere et al. "Excimer laser ablation of polycarbonate-based plastic substrates", Nucl. Instruments Methods Phys. Res. Sect. B-Beaminteract. With Mater. Atoms (1999) 151, 263-267.

Dobson, H., et al., "Why is it getting more difficult to successfully artificially inseminate dairy cows?," Animal, 2:8, pp. 1104-1111 (2008).

Dransfield M. B., et al., "Timing of insemination for dairy cows identified in estrus by a radiotelemetric estrus detection system," J Dairy Sci. 81: 1874-1882 (1998).

Ducree Centrifugal Microfluidics, in Encyclopedia of Microjluidics and Nanojluidics (Li, D., Ed.) (2013), pp. 1-18.

Dudani J. S., et al., "Rapid inertial solution exchange for enrichment and flow cytometric detection of microvesicles," Biomicrofluidics 9, 014112, https://doi.org/10.1063/1.4907807, (Feb. 2015).

El-Abassy, R. M., et al., "Fast determination of milk fat content using Raman spectroscopy," Vibrational Spectroscopy, 56, pp. 3-8, doi:10.1016/j.vibspec.2010.07.001 (2011).

Espulgar, W., et al., "Centrifugal microfluidic platform for single-cell level cardiomyocyte-based drug profiling and screening," Lab on a Chip 15, 3572-3580, DOI: 10.1039/c5lc00652j (2015).

Federation, I. D., "The economic importance of dairying.," IDF Factsheet (Feb. 2013) (5 total pages).

Focke et al. Microthermoforming of microfluidic substrates by soft lithography (µTSL): optimization using design of experiments, J Micromechanics Microengineering (2011) 21,12 pages.

Forcato, D. O., et al., "Milk fat content measurement by a simple UV spectrophotometric method: an alternative screening method," J. Dairy Sci. 88: 478-481 (2005).

Fowkes, F.M. "Attractive forces at interfaces." Ind. Eng. Chem., 1964, 56:40-52.

Freire S. L. S., "Perspectives on digital microfluidics," Sensors and Actuators, A Physical, 250, 15-28 (2016).

Ghazaly, M. et al. "Photoluminescence emission spectra of Makrofol® {DE} 1-1 upon irradiation with ultraviolet radiation." Results Phys., 2017, 7:333-337.

Gilmore J., et al., "Challenges in the use of compact disc-based centrifugal microfluidics for healthcare diagnostics at the extreme point of care," Micromachines, 7,52, doi:10.3390/mi7040052 (2016) (26 total pages).

Gómez-De Pedro, S. "Automatic microfluidic system to perform multi-step magneto-biochemical assays." Sensors Actuators, B Chem, 2017, 245:477-483.

Goddart et al. Polymer surface modification for the attachment of bioactive compounds. Frog. Polym. Sci. (2007), 32, 698-725.

Golding et al. The scanning electron microscope in microbiology and diagnosis of infectious disease. Sci Rep (2016) 6, 26516.

Gomez "The future of microfluidic point-of-care diagnostic devices", Bioanalysis (2013) 5, 1-3.

Gordon, M. H., et al., FATS I Occurrence, Elsevier Science Ltd., pp. 2293-2296 (2003).

Gorkin, R., et al., Centrifugal microfluidics for biomedical applications, Lab Chip 10, 1758-1773, DOI: 10.1039/b924109d (2010).

Goulden et al. "Factors affecting the fat globule sizes during the homogenization of milk and cream", J Dairy Res. (1964) 31, 195-200.

Grazyna, C., et al., "Natural antioxidants in milk and dairy products," International Journal of Dairy Technology, vol. 70, No. 2, doi: 10.1111/1471-0307.12359 (May 2017).

Gupta, A. et al. "Solid State Photochemistry of Polycarbonates." Macromolecules, 1978, 11:1285-1288.

Hanafy, T. A "Dielectric relaxation and Schottky conduction of IR laser irradiated Makrofol-DE polycarbonate", J Appl. Polym. Sci. (2012) 124, 1-8.

Hansen, C.M. "Solubility Parameters—An Introduction." Hansen Solubility Parameters, A User's Handbook, 2000, 1-24.

Harilal, S.S. et al. "Femtosecond Laser Ablation: Fundamentals and Applications." Laser-Induced Breakdown Spectroscopy: Theory and Applications, Springer Berlin Heidelberg, 2014, 143-166.

Harwalkar et al. "Age-Thickening and Gelation of Sterilized Evaporated Milk", J Dairy Sci. (1983) 66, 735-7 42.

Haug, A, et al., "Bovine milk in human nutrition—a review," Lipids in Health and Disease, 6:25, doi:10.1186/1476-511X-6-25 (2007) (16 total pages).

He, T. et al., "The PDMS-based microfluidic channel fabricated by synchrotron radiation stimulated etching," Optics Express, vol. 18, No. 9, pp. 9733-9738 (Apr. 2010).

(56) References Cited

OTHER PUBLICATIONS

Hohman, B., "LED light source: Major advance in fluorescence microscopy." Biomed. Instrum. Technol., 2007, 461-464.
Hong et al. "Rapid prototyping of PMMA microfluidic chips utilizing a CO2 laser", Microjluid. Nanojluidics (2010) 9, 1125-1133.
Houghton, H. "LEDs: A flexible option for machine vision." Sens. Rev., 2002, 22:130-133.
Hu et al. "Experimental Investigation on Femtosecond Laser Ablation of Polycarbonate", Advances in Materials and Materials Processing, (2013) pp. 2359-2362.
Huang, F. et al. "Fluorescence Sandwich Assays for Protein Detection, in Biosensors Based on Sandwich Assays," Springer, Singapore, 2018, 29-45.
Huang, S. C. et al. "Efficient contrast enhancement using adaptive gamma correction with weighting distribution", IEEE Trans. Image Process. (2013), 22, 1032-1041.
Hwang et al. "Block-Copolymers With Low Surface-Energy Segments—Siloxane-Modified and Perfluoroalkane-Modified Blocks", Polymer (1995), 36(6), 1321-1325.
International Search Report and Written Opinion issued for the International Application No. PCT/IB2021/060530, dated Feb. 2, 2022 (12 pages).
Janczuk et al. Surface free-energy components of liquids and low energy solids and contact angles. J Colloid Interface Sci. (1989), 127, 189-204.
Jang et al. "The theral degradation of bisphenol a polycarbonate in air", Thermochim. Acta (2005) 426, 73-84.
Jankowski et al. "Stable hydrophilic surface of polycarbonate", Sensors Actuators B Chem. (2016) 226, 151-155.
Jebrail M. J., et al., "Synchronized synthesis of peptide-based macrocycles by digital microfluidics," Angew. Chem, 122, pp. 8807-8811, DOI: 10.1002/ange.201001604 (2010).
Jones et al. (2001) The effects of Tween 20 and sucrose on the stability of anti-L-selectin during lyophilization and reconstitution. J Pharm. Sci. 90, 1466-1477.
Jung, M.R. et al. "Validation of ATR-FT-IR to identify polymers of plastic marine debris, including those ingested by marine organisms." Mar. Pollut. Bull., 2018, 127:704-716.
Kangas, M.J. et al. "Colorimetric Sensor Arrays for the Detection and Identification of Chemical Weapons and Explosives." Crit. Rev. Anal. Chem., 2017, 47:138-153.
Kant et al. Studies on CO2 Laser Micromachining on PMMA to Fabricate Micro Channel for Microfluidic Applications, in Lasers Based Manufacturing: 5th International and 26th All India Manufacturing Technology, Design and Research Conference, AIMTDR (Joshi, N. S., and Dixit, S. U., Eds.), (2015), p. 221-238.
Kido, H., et al., "A novel, compact disk-like centrifugal microfluidics system for cell lysis and sample homogenization," Colloids Surfaces B Biointerfaces, 58, pp. 44-51, doi:10.1016/j.colsurfb.2007.03.015 (2007).
Kijlstra, J. et al. "Roughness and topology of ultra-hydrophobic surfaces." Colloids and Surfaces A: Physicochemical and Engineering Aspects, 2002, 521-529.
Kim et al. Improved EnzymeLinked Immunosorbent Assay for the Insecticide Imidacloprid, in Environmental Fate and Effects of Pesticides, (2003), pp. 2-30.
Kirby, A E. et al., "Digital microfluidics: An emerging sample preparation platform for mass spectrometry," Analytical Chemistry, 85, 6178-6184 (2013).
Kirby, D., "Centrifugo-magnetophoretic particle separation," Microfluid Nanofluid, 13: 899-908, DOI 10.1007/s10404-012-1007-6 (2012).
Klank et al. "CO(2)-laser micromachining and backend processing for rapid production of PMMA-based microfluidic systems", Lab Chip (2002) 2, 242-246.
Ko, Y. C. et al. "Characterization of hydrophilichydrophobic polymeric surfaces by contact angle measurements", J Colloid Interface Sci. (1981), 82, 25-37.

Koh, C.-Y., et al., "Centrifugal microfluidic platform for ultra sensitive detection of botulinum toxin," Analytical Chemistry 87, 922-928, DOI: 10.1021/ac504054u (2015).
Kong et al. Fabrication of a gold microelectrode for amperometric detection on a polycarbonate electrophoresis chip by photodirected electroless plating. Electrophoresis (2006) 27, 2940-2950.
Kong et al. Pneumatically Pumping Fluids Radially Inward On Centrifugal Microfluidic Platforms in Motion. Anal. Chem. (2010) 82, 8039-8041.
Konstantinou et al. "Combined hot embossing and milling for medium volume production of thermoplastic microfluidic devices", Sensors Actuators, B Chem. (2016) 234, 209-221.
Kuo J. N., et al., "Plasma separation and preparation on centrifugal microfluidic disk for blood assays," Microsyst. Technol. 21:2485-2494, DOI 10.1007/s00542-015-2408-8 (2015).
Lamming "The use of milk progesterone profiles to characterise components of subfertility in milked dairy cows", Anim. Reprod. Sci. (1998) 52, 175-190.
Lee, A P., "Digital microfluidics for bioassays and drug delivery," Engineering in Medicine and Biology Society, Proceedings of the 26th Annual International Conference of the IEEE EMBS (Sep. 2004) (1 total pages).
Lefévre, F. et al. "Integration of fluorescence sensors using organic optoelectronic components for microfluidic platform." Sensors Actuators, B. Chem., 2015, 221:1314-1320.
Li, D. et al. "Contact angles on hydrophobic solid surfaces and their interpretation," J. Colloid Interface Sci., 1992, 148:190-200.
Li et al. "A perspective on paper-based microfluidics: Current status and future trends" Biomicrofluidics (2012) 6, 11301-11313.
Li, S. et al. "Low-temperature bonding of poly-(methyl methacrylate) microfluidic devices under an ultrasonic field." J. Micromechanics Microengineering, 2008, 19(015035):1-6.
Lin, A.V. "Direct ELISA, in ELISA: Methods and Protocols (Hnasko, R. Ed.)," Springer New York, NY, 2015, 61-67.
Lin, A.V. "Indirect ELISA, in ELISA: Methods and Protocols (Hnasko, R. Ed.)," Springer New York, NY, 2015, 51-59.
Lin, B., et al., "Recent advances of microfluidics in Mainland China," Biotechnol. J. 1, pp. 1225-1234 (2006).
Lin, L. "Thermal challenges in MEMS applications: Phase change phenomena and thermal bonding processes." Microelectronics Journal, 2003, 179-185.
Liparoti, S., et al., "Effects of fast mold temperature evolution on micro features replication quality during injection molding," AIP Conference Proceedings 1914, 140007 (Dec. 2017); https://doi.org/10.1063/1.5016772 (6 total pages).
Lippok et al. "Dispersion compensation in Fourier domain optical coherence tomography using the fractional Fourier transform", Opt. Express (2012) 20, 23398.
Lisowski P., et al., "Microfluidic Paper-Based Analytical Devices (µPADs) and Micro Total Analysis Systems (µTAS): Development, Applications and Future Trends," Chromatographia 76: 1201-1214, DOI 10.1007/s10337-013-2413-y (2013).
Liu et al. "Surface modification of bisphenol A polycarbonate material by ultraviolet Nd:YV04 laser high-speed microprocessing technology", Journal of Micromechanics and Microengineering, Institute of Physics Publishing, vol. 24, No. 8, 2014, p. 85002 (11 pages).
Lu, C. et al. "New valve and bonding designs for microfluidic biochips containing proteins." 2007, 79:994-1001.
Lynch, J. M., et al., "Comparison of Babcock and Ether Extraction Methods for Determination of Fat Content of Cream: Collaborative Study," Journal of AOAC International, vol. 79, No. 4, pp. 907-916 (1996).
Madou, M.J. et al. "Design and fabrication of CD-like microfluidic platforms for diagnostics: microfluidic functions." Biomed. Microdevices, 2001, 3:245-254.
Madou, M.J. et al. "The LabCD (TM): A centrifuge-based microfluidic platform for diagnostics." Conference on Systems and Technologies for Clinical Diagnostics and Drug Discovery, 1998, 80-93.
Malek Laser processing for bio-microfluidics applications (part II). Anal. Bioanal. Chem. (2006), 385:1362-1369.

(56) References Cited

OTHER PUBLICATIONS

Maleki, N. et al. "Single-step calibration, prediction and real samples data acquisition for artificial neural network using a CCD camera", Talanta, (2004), 64, 830-835.

Malekinejad, H., et al., "Hormones in Dairy Foods and Their Impact on Public Health—A Narrative Review Article," Iran J. Public Health, vol. 44, No. 6, pp. 742-758 (Jun. 2015).

Mark et al. Aliquoting on the centrifugal microfluidic platform based on centrifugo-pneumatic valves. Microjluid. Nanojluidics (2011)10, 1279-1288.

Martin, et al. "Accurate determination of the sedimentation flux of concentrated suspensions." Phys. Fluids, 1995, 7:2510-2512.

Martin, J. G., et al., "Toward an Artificial Golgi: Redesigning the Biological Activities of Heparan Sulfate on a Digital Microfluidic Chip," J. Am. Chem. Soc. 131, 11041-11048 (Jul. 2009).

Martin, J. W., et al., "Raman on a disc: high-quality Raman spectroscopy in an open channel on a centrifugal microfluidic disc," Analyst 142, 1682-1688, DOI: 10.1039/c6an00874g (2017).

McKenna et al. Age gelation in UHT-processed reconstituted concentrated skim milk. Int. J Food Sci. Technol. (1991) 26, 27-38.

Meisterling E. M., "Use of concentrations of progesterone andestradiol-17 beta in milk in monitoring postpartum ovarian function in dairy cows," J. Dairy Sci. 70: 2154-2161 (1987).

Mendes, T. O., "Vibrational spectroscopy for milk fat quantification: line shape analysis of the Raman and infrared spectra," J. Raman Spectrosc. 47, 692-698, DOI 10.1002/jrs.4878 (2016).

Meng et al. "Conditional siphon priming for multi-step assays on centrifugal microfluidic platforms", Sensors Actuators B Chem .(2017) 242, 710-717.

Mensink et al. "How sugars protect proteins in the solid state and during drying (review): Mechanisms of stabilization in relation to stress conditions", Eur. J Pharm. Biopharm. (2017) 114, 288-295.

Meunier et al. "Fabrication of microlens arrays in polycarbonate with nanojoule energy femtosecond laser pulses", Opt. Lett. (2012) 37, 4266-8.

Miller-Chou, B.A. et al. "A review of polymer dissolution." Prog. Polym. Sci., 2003, 28:1223-1270.

Min D. B., et al. "Fat Analysis," Chapter 8, pp. 119-132, S.S. Nielson, Food Analysis, Food Science Texts Series, DOI 10.1007/978-1-4419-1478-1_8 (1959) (16 total pages).

Moen, S et al., "A centrifugal microfluidic platform that separates whole blood samples into multiple removable fractions due to several discrete but continuous density gradient section." PLOS One, Apr. 7, 2016, 1-11.

Moonrungsee, N. et al. "Colorimetric analyzer based on mobile phone camera for determination of available phosphorus in soil." Talanta, 2015, 136:204-209.

Moreira, G. et al., "Fast and versatile fabrication of PMMA microchip electrophoretic devices by laser engraving." Electrophoresis, 2014, 35:2325-2332.

Morijiri, T. et al., "Microfluidic counterflow centrifugal elutriation system for sedimentation-based call separation." Microfluid Nanofludics, 2013, 14:1049-1057.

Naessens et al. Direct writing of microlenses in polycarbonate with excimer laser ablation. Appl. Opt. (2003) 42, 6349-6359.

Narendran R., et al., "Estrogen and progesterone concentrations in bovine milk during the estrous cycle," Theriogenology, vol. 12, No. 1, pp. 19-25 (1979).

Nayak et al. CO2-laser micromachining of PMMA: the effect of polymer molecular weight. J Micromechanics Microengineering (2008) 18, 095020.

Ng, S.H. et al. "Thermally activated solvent bonding of polymers." Microsyst. Technol., 2008, 14:753-759.

Nie, M. et al., "Bottom-up biofabrication using microfluidic techniques," Biofabrication 10, 44103 (2018) (13 total pages).

Nikcevic, I. et al. "Characterization and performance of injection molded poly(methylmethacrylate) microchips for capillary electrophoresis," 2007, A1154, 444-453.

Noda, I. et al. "Group Frequency Assignments for Major Infrared Bands Observed in Common Synthetic Polymers." Physical Properties of Polymers Handbook, Spring New York, NY, 2007, 395-406.

Nolte, D. D., "Invited Review Article: Review of centrifugal microfluidic and bio-optical disks," Review of Scientific Instruments 80, pp. 101101-1-101101-22, https://doi.org/10.1063/1.3236681 (2009).

Noroozi, Z. et al. "Reciprocating flow-based centrifugal microfluidics mixer," 2009, 80:075102-075102-8.

O'Beirne, A.J. et al. "Heterogeneous enzyme immunoassay," J. Histochem. Cytochem., 1979, 27(8):1148-1162.

OECD/Food and Agriculture Organization of the United Nations (2014), OECD-FAO Agriculture Outlook 2014, OECD Publishing, http://dx.doi.org/10.1787/arg_outlook-2014-en (329 total pages).

Ogilvie, I.R.G, et al. "Solvent processing of PMMA and COC chips for bonding devices with optical quality surfaces," 14th Int. Conf. Miniaturized Syst. Chem. Life Sci., 2010, 1244-1246.

Ogończyk, D. "Bonding of microfluidic devices fabricated in polycarbonate." Lap Chip, 2010, 10:1324-1327.

Oku, Y., et al., "Validation of a direct time-resolved fluoroimmunoassay for progesterone in milk from dairy and beef cows," The Veterinary Journal, 190, 244-248, doi:10.1016/j.tvjl.2010.10.024 (2011).

Olson, M. E., "Vessel diameter-stem diameter scaling acrosswoody angiosperms and the ecological causes of xylem vessel diameter variation," New Phytologist 197, pp. 1204-1213 (2013).

Oss, C. et al. Estimation of the Polar Surface Tension Parameters of Glycerol and Formamide, for Use in Contact Angle Measurements on Polar Solids, J Dispers. Sci. Technol. (1990) 11, 7 5-81.

Ouyang, Y. et al. "Rapid patterning of tunable hydrophobic values on disposable microchips by laser printer lithography." Lab Chip, 2013, 13:1762-1771.

Owens, D.K. et al. "Estimation of the Surface Free Energy of Polymers." J. Appl. Polym. Sci., 1969, 13:1741-1747.

Pandey, C. M., et al., "Microfluidics Based Point-of-Care Diagnostics," Biotechnology Journal, 13, 1700047 (2018) (11 total pages).

Paquin et al. "Technological properties of high-pressure homogenizers: The effect of fat globules, milk proteins, and polysaccharides", International Dairy Journal, (1999), p. 329-335.

Park, Y.-S., et al., "Fully automated centrifugal microfluidic device for ultrasensitive protein detection from whole blood," Journal of Visualized Experiments, 110, e54143 (Apr. 2016) (7 total pages).

Pathak, A. et al. "Indicator-impregnated agarose films for colorimetric measurement of pH." SLAS Technol., 2017, 22:81-88.

Pennington, J. A., et al., Influences on Progesterone Concentration in Bovine Milk, J Dairy Sci. 64, 259-266 (1981).

Petropoulos et al. "Surface Texture Characterization and Evaluation Related to Machining", Surface Integrity in Machining (Davim, J. P., Ed.), (2010) p. 37-66.

Pham, N. M., et al., "Malaria and the "last" parasite: how can technology help?," Malaria Journal 17:260, https://doi.org/10.1186/s12936-018-2408-0 (2018) (16 total pages).

Philipse, A.P. "Colloidal sedimentation (and filtration)." Curr. Opin. Colloid Interface Sci., 1997, 2:200-206.

Podoleanu, A.G. "Optical coherence tomography." Journal of Microscopy, 2012, 1-11.

Pohler, K. G., et al., "Predicting Embryo Presence and Viability," Regulation of Implantation and Establishment of Pregnancy in Mammals: Tribute to 45 Year Anniversary of Roger V. Short's "Maternal Recognition of Pregnancy", Advances in Anatomy, Embryology and Cell Biology 216, pp. 253-270, doi: 10.1007/978-3-319-15856-3_13 (2015).

Pope et al. "Use of progesterone concentrations in plasma and milk in the diagnosis of pregnancy in domestic cattle", Br. Vet. J (1976) 132, 497-506.

Prakash "Fabrication of microchannels on transparent PMMA using CO2 Laser (10.6 μm) for microfluidic applications: An experimental investigation", Int. J Precis. Eng. Manuf (2015) 16, 361-366.

Rajamahendran, R. et al. "The use of rapid on-farm milk progesterone tests as an aid to reproductive management in dairy-cattle." Can. J. Anim. Sci., 1990, 70:997-1003.

(56) References Cited

OTHER PUBLICATIONS

Rebollar, E. et al. "Ultraviolet and infrared femtosecond laser induced periodic surface structures on thin polymer films." Appl. Phys. Lett., 2012, 100:041106-1-041106-4.
Resch-Genger, U. et al. "Quantum dots versus organic dyes as fluorescent labels." Nat. Methods., Sep. 2008, 5(9):763-775.
Richardson, J.F. et al. "Sedimentation and fluidization: Part 1." Chem. Eng. Res. Des., 1997, 75:S82-S100.
Riveiro A. et al. "Laser texturing to control the wettability of materials", Science Direct, Procedia CIRP, vol. 94, 2020, pp. 879-884.
Romagnolo et al. "The accuracy of enzyme-linked immunosorbent assay and latex agglutination progesterone test for the validation of estrus and early pregnancy diagnosis in dairy cattle", Theriogenology (1993) 39, 1121-1128.
Rombach et al. "Pre-storage and release of purification reagents for full "hands-off" integration of DNA/RNA assays on the Labdisk platform", in 18th International Conference on Miniaturized Systems for Chemistry and Life Sciences, MicroTAS 2014 (2014), 4 pages.
Romoli et al. Experimental approach to the laser machining of PMMA substrates for the fabrication of microfluidic devices. Opt. Lasers Eng. (2011) 49, 419-427.
Rowe, P.N. "A convenient empirical equation for estimation of the Richardson-Zaki exponent." Chem. Eng. Sci., 1987, 42:2795-2796.
Ruben, S.D., "Respect the implementation: Using NI myRIO in undergraduate control education." Proceedings of the American Control Conference, 2016, 7315-7320.
Rubenstein, K.E. et al.,"'Homogeneous enzyme immunoassay. A new immunochemical technique'" Biochemical and Biophysical Research Communications, (1972), 47(4), 6 pages.
Russel, W.B. et al. "Colloidal Dispersions," 1991, 543 pages.
Sackmann et al. "The present and future role of microfluidics in biomedical research", Nature (2014) 507, 181-9.
Said-Galiev, É. et al. "Ablation of polymers and composites when exposed to CO2 laser radiation (review)." Mech. Compos. Mater., 1992, 28:97-114.
Samsonova, J.V. et al., "Pretreatment-free lateral flow enzyme immunoassay for progesterone detection in whole cows' milk." Talanta, 2015, 132:685-689.
Sarin, H., "Physiologic upper limits of pore size of different blood capillary types and another perspective on the dual pore theory of microvascular permeability," Journal of Angiogenesis Research, 2:14 (2010).
Schmitt, J. "Optical Coherence Tomography (OCT): A Review." IEEE J. Sel. Top. Quantum Electron., 1999, 5(4):1205-1215.
Segur et al. "Viscosity of Glycerol and Its Aqueous Solutions", Industrial and Engineering Chemistry, (1951), 43, p. 2117-2120.
Sharma, V. et al. "Shape separation of gold nanorods using centrifugation," PNAS, Mar. 31, 2009, 106(13):4981-4985.
Shrivastav, T. G., et al., "Enzyme linked immunosorbent assay for milk progesterone," Journal of Immunoassay and Immunochemistry, (2010), 31:301-313.
Sichien M., et al., "Processing means for milk fat fractionation and production of functional compounds," Dairy-Derived Ingredients: Food and Nutraceutical Uses, pp. 68-102 (2009).
Siegrist J., et al., "Serial siphon valving for centrifugal microfluidic platforms,".Microfluid Nanofluid (2010), 9: 55-63.
Silverio, V., et al., "Microfabrication techniques for microfluidic devices," Complex Fluid-Flows in Microfluidics, pp. 25-51, doi: 10.1007/978-3-319-59593-1_2 (2018).
Simersky, R. et al. "Development of an ELISA-based kit for the on-farm determination of progesterone in milk." Vet. Med. (Praha)., 2007, 52:19-28.
Sista, R., et al., "Development of a digital microfluidic platform for point of care testing," Lab Chip, 8, 2091-2104 (2008).
Smith et al. "Improving the deconvolution and interpretation of XPS spectra from chars by ab initio calculations", Carbon (2016) 110, 155-171.

Smiths., et al., "Paper-based smart microfluidics foreducation and low-cost diagnostics," South African Journal of Science, vol. 111, No. 11/12 (Nov./Dec. 2015) (10 total pages).
Snakenborg et al. "Microstructure fabrication with a CO2 laser system", J Micromechanics Microengineering (2004) 14, 182-189.
Solomon, C. et al. "Fundamentals of Digital Image Processing: A Practical Approach with Examples in Matlab", (2010), 341 pages.
Srinivasan R. "Ablation of polymethyl methacrylate films by pulsed (ns) ultraviolet and infrared (9.17 μm) lasers: A comparative study by ultrafast imaging", J Appl. Phys. (1993) 73, 2743-2750.
Steele et al. "Surface Energy of Microcrystalline Cellulose Determined by Capillary Intrusion and Inverse Gas Chromatography", The AAPS Journal, (2008), 10(3), p. 494-503.
Steigert, J. et al. "Rapid prototyping of microfluidic chips in COC," J. Micromechanics Microengineering, 2007, 17:333-341.
Steinitz "Quantitation of the blocking effect of Tween 20 and bovine serum albumin in ELISA microwells", Anal. Biochem .(2000) 282, 232-238.
Stevenson J. S., et al., "Feedback effects of estradiol and progesterone on ovulation and fertility of dairy cows after gonadotropin-releasing hormone-induced release of luteinizing hormone 1," J. Dairy Sci. 99:3003-3015 (2016).
Streets, A M., and Huang, Y., "Chip in a lab: Microfluidics for next generation life science research," Biomicrofluidics 7, 011302 (Jan. 2013).
Strohmeier O., et al., Centrifugal microfluidic platforms: advanced unit operations and applications, Chem. Soc. Rev. 44, 6187-6229, DOI: 10.1039/c4cs00371c (2015).
Suriano, R. et al. "Femtosecond laser ablation of polymeric substrates for the fabrication of microfluidic channels." Appl. Surf. Sci., 2011, 257:6243-6250.
Sweetman A J., et al., Modelling the fate and behaviour of lipophilic organic contaminants in lactating dairy cows. Environmental Pollution 104, pp. 261-270 (1999).
Taggi A J. et al., "Printing Processes," in Kirk-Othmer Encyclopedia of Chemical Technology, pp. 171-206 (2000) (59 total pages).
Tang et al. "A review of biomedical centrifugal microfluidic platforms", Micromachines (2016), 7(26), 29 pages.
Thiebaud et al. "Highpressure homogenisation of raw bovine milk. Effects on fat globule size distribution and microbial inactivation", Int. Dairy J (2003) 13, 427-439.
Titapiccolo et al. "Rennet-induced aggregation of homogenized milk: Impact of the presence of fat globules on the structure of casein gels", Dairy Sci. Technol. (2010) 90, 623-639.
Trapiella-Alfonso et al. "Development of a quantum dot-based fluorescent immunoassay for progesterone determination in bovine milk", Biosens. Bioelectron. (2011) 26, 4753-4759.
Truong T., et al., "Effect of Milk Fat Globule Size on Functionalities and Sensory Qualities of Dairy Products," Effect of Milk Fat Globule Size on the Physical Functionality of Dairy Products, pp. 47-67, DOI: 10.1007/978-3-319-23877-7_7 (2016).
Tsao, C.W. et al. "Bonding of thermoplastic polymer microfluidics," Microfluid Nanofluidics, 2009, 6:1-16.
Tsao "Polymer microfluidics: Simple, low-cost fabrication process bridging academic lab research to commercialized production", Micromachines (2016), 7, 225, 11 pages.
Urbaniak-Domagala W. "The Use of the Spectrometric Technique FTIR-ATR to Examine the Polymers Surface", Adv. Apects Spectrosc. (2012) 86-104.
Urech, L. et al. "Photoablation of Polymer Materials, in Photochemistry and Photophysics of Polymer Materials," John Wiley & Sons, Inc., 2010, 541-568.
"Surface Tension Components and Parameters of Liquids and Solids", Interfacial Forces in Aqueous Media, (2006) Second Edition, p. 213-226.
Valle, G. et al. "Micromachining of photonic devices by femtosecond laser pulses." J. Opt. A Pure Appl. Opt., 2009, 11, 19 pages.
Van Krevelen et al. "Volumetric Properties", Properties of Polymers (2009), p. 71-108.
Van Oordt et al. "Lamination of polyethylene composite films by ultrasonic welding: Investigation of peel behavior and identification of optimum welding parameters", J Appl. Polym. Sci. (2013), 131, 7 pages.

(56) References Cited

OTHER PUBLICATIONS

Van Oordt et al. "The LabDisk—A fully automated centrifugal lab-on-a-chip system for the detection of biological threats", Communications in Computerand Information Science, (2012) p. 220-223.
Van Oordt T., Barb, Y., Smetana,]., Zengerle, R., and Von Stetten, F. (2013) Miniature stick-packaging-an industrial technology for pre-storage and release of reagents in lab-on-achip systems. Lab Chip 13, 2888-2892.
Vijayakumari, G et al. "Investigation on the electrical properties of polymer metal nanocomposites for physiological sensing applications." Physics Procedia, 2013, 67-78.
Vijayalakshmi et al. "Studies on modification of surface properties in polycarbonate (PC) film induced by DC glow discharge plasma" Int. J Polym. Sci. (2011), 7 pages.
Vukovic D., et al., "Progesterone concentration in milk and blood serum and reproductive efficiency of cows after Ovsynch treatment," Turkish Journal of Veterinary and Animal Sciences, vol. 40, No. 1, pp. 75-80, doi:10.3906/vet-1505-17 (2016).
Waldmann, A, et al., "Level and distribution of progesterone in bovine milk in relation to storage in the mammary gland," Animal Reproduction Science 56, 79-91 (1999).
Wang et al. "Surface Wettability Modification of Cyclic Olefin Polymer by Direct Femtosecond Laser Irradiation", Nanomaterials, vol. 5, No. 3, 2015, pp. 1442-1453.
Wang, T., et al., "A super-resolution CMOS image sensor for bio-microfluidic imaging," IEEE Biomedical Circuits and Systems Conference: Intelligent Biomedical Electronics and Systems for Better Life and Better Environment, BioCAS 2012—Conference Publications, pp. 388-391 (2012).
Wang, Y. et al. "Review of surface profile measurement techniques based on optical interferometry." Opt. Lasers Eng., 2017, 93:164-170.
Wang, Z.K. et al. "Polymer hydrophilicity and hydrophobicity induced by femtosecond laser direct irradiation." Appl. Phys. Lett., 2009, 95:111110-1, 3 pages.
Watkins et al. An immunoassay for chlorinated dioxins in soils. Chemosphere (1989) 19, 267-270.
Weibin et al. The effects of hydrothermal aging on properties and structure of bisphenol A polycarbonate, Polym. De grad. Stab. (2009) 94, 13-17.
Wenzel, "Resistance of Solid Surfaces to Wetting by Water," Industrial & Engineering Chemistry, 28(8):988-994, 1936.
Wheeler, G., "The significance of dairy to the New Zealand economy," Reserve Bank of New Zealand (May 2014) (16 total pages).
Whitesides, G. M., "The origins and the future of microfluidics," Nature, vol. 442, pp. 368-373 (Jul. 2006).
Wlodkowic et al. Rise of the micromachines: Microfluidics and the future of cytometry. Methods Cell Biol. (2011), Chapter 5, 105-125.
Wu, J., et al., "Optical imaging techniques in microfluidics and their applications," Lab on a Chip, 12, 3566-3575, DOI: 10.1039/c2lc40517b (2012).
Wu, L. et al. "Development and Application of an ELISA Kit for the Detection of Milk Progesterone in Dairy Cows." Monoclon. Antib. Immunodiagn. Immunother. 2014, 33:330-333.
Wu L., et al., Separation of leukocytes from blood using spiral channel with trapezoid cross-section, Analytical Chemistry 84, 9324-9331, dx.doi.org/10.1021/ac302085y (2012).
Wu, S. "Calculation of interfacial tension in polymer system." J. Polym. Sci. Part C Polym. Symp., 1971, 34:19-30.
Xu, W., et al., "Milk quality control: Instant and quantitative milk fat determination with a BODIPY sensor-based fluorescence detector," Chem. Commun. 50, 10398-10401, DOI: 10.1039/c4cc04670f(2014).
Yang et al. "The marching velocity of the capillary meniscus in a microchannel", J Micromechanics Microengineering (2004) 14, 220-225.
Yao, M., et al., "Highly sensitive and miniaturized fluorescence detection system with an autonomous capillary fluid manipulation chip," Micromachines 3, pp. 462-479, doi: 10.3390/mi3020462 (2012).
Yao, Susu et al. "Contrast signal-to-noise ratio for image quality assessment", IEEE International Conference on Image Processing (2005), 4 pages.
Yaqoob, Z. et al. "Spectral domain optical coherence tomography: a better OCT imaging strategy." Biotechniques, California Institute of Technology, Dec. 2005, 6-12.
Yeo, J.C., et al., "Microfluidic size separation of cells and particles using a swinging bucket centrifuge," Biomicrofluidics 9, 054114, https://doi.org/10.1063/1.4931953 (Sep. 2015) (12 total pages).
Yi, X. et al. "Colorimetric Sandwich Assays for Protein Detection, in Biosensors Based on Sandwich Assays," Springer Singapore, 2018, 15-27.
Yoshimitsu, Z. "Effects of Surface Structure on the Hydrophobicity and Sliding Behavior of Water Droplets." Langmuir, 2002, 18(15):5818-5822.
Yoshinaga, K., et al., "Simple method for the quantification of milkfat content in foods by LC-APCI-MS/MS using 1,2-dipalmitoyl-3-butyroyl-glycerol as an indicator," Journal of Oleo Science, 62 (3), 115-121 (2013).
Zhang "Selective metallization of polymers using laser induced surface activation (LISA)—characterization and optimization of porous surface topography", Int. J Adv. Manuf Technol. (2011) 55, 573-580.
Zhang, J., et al., "Fundamentals and applications of inertial microfluidics: a review," Lab on a Chip, 16, pp. 10-34 (2016).
Zhang, J., et al., "Inertial particle separation by differential equilibrium positions in a symmetrical serpentine micro-channel," Scientific Reports, 4: 4527, DOI: 10.1038/srep04527 (Mar. 2014) (9 total pages).
Zhang, J.-Y. et al. "Modification of polymers with UV excimer radiation from lasers and lamps." J. Adhes. Sci. Technol., 1994, 8:1179-1210.
Zhang, L., et al, "Hand-powered centrifugal microfluidic platform inspired by the spinning top for sample-to-answer diagnostics of nucleic acids," Lab on a Chip, 18, 610-619 (2018).
Zhang, Q., et al., "Logic digital fluidic in miniaturized functional devices: Perspective to the next generation of microfluidic lab-on-chips," Electrophoresis, 38, pp. 953-976 (2017).
Zhao, B., et al., "A Controllable and Integrated Pump-enabled Microfluidic Chip and Its Application in Droplets Generating," Scientific Reports, 7:11319, DOI:10.1038/S41598-017-10785-1 (Sep. 2017) (8 total pages).
Zheng, Q. et al. "Size Effects of Surface Roughness to Superhydrophobicity." Procedia IUTAM, 2014, 10:462-475.
Zhou "Region-selective electroless gold plating on polycarbonate sheets by UV-patterning in combination with silver activating", Electrochim. Acta (2010) 55, 2542-2549.
Zhu, X. et al. "Study of PMMA thermal bonding." Microsyst. Technol., 2007, 13:403-407.
Zimmerman, W. B., "Electrochemical microfluidics," Chemical Engineering Science 66, pp. 1412-1425 (2011).
Zisman, W.A. "Relation of the Equilibrium Contact Angle to Liquid and Solid Constitution." 1964, 43:1-51.
Engvall, E. "Enzyme Immunoassay ELISA and EMIT." Methods Enzymol., 1980. (Book).

* cited by examiner

Exemplary dimensions in millimetres.

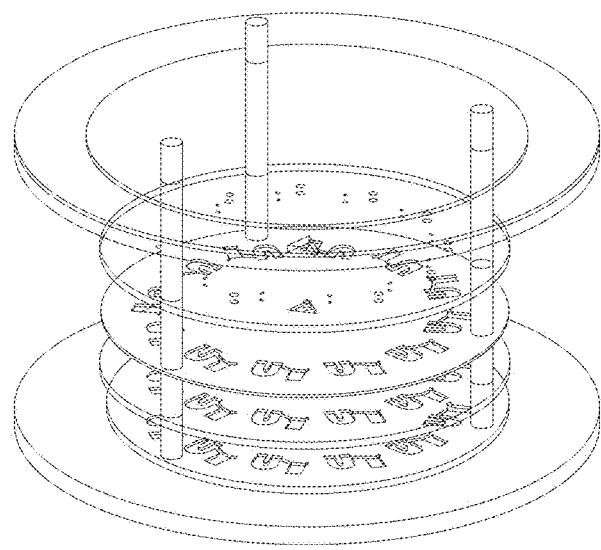
*FIG. 1C*
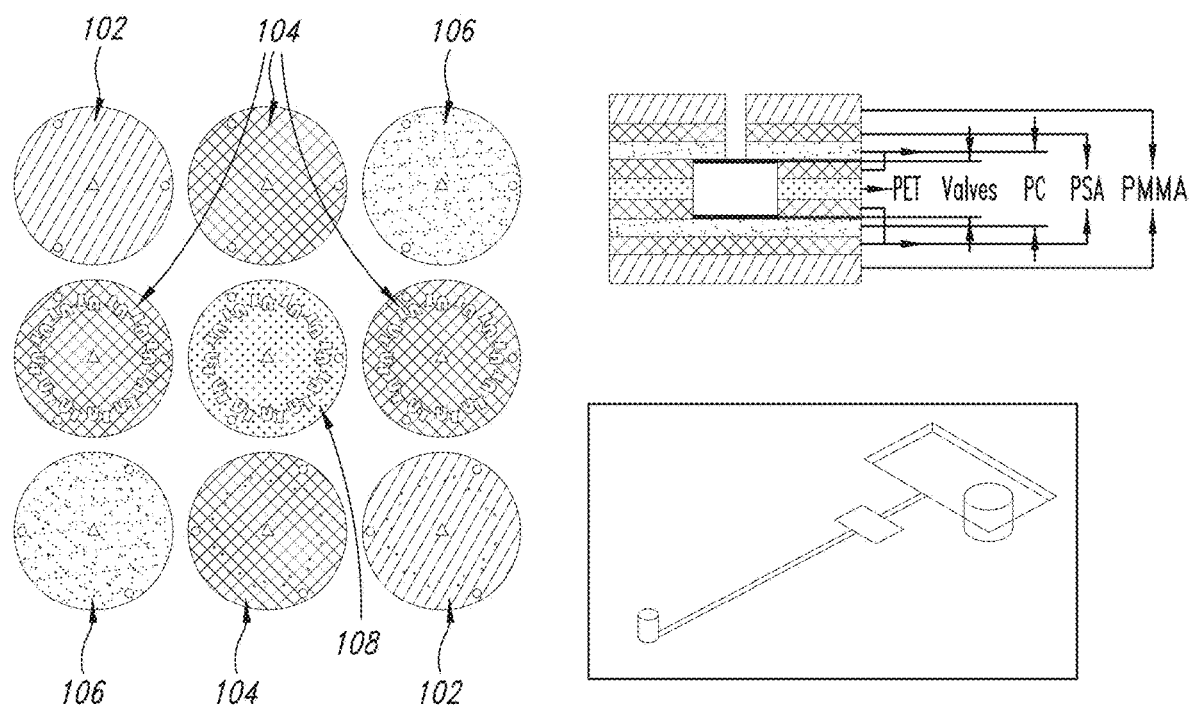
*FIG. 1D-1*  *FIG. 1D-2*

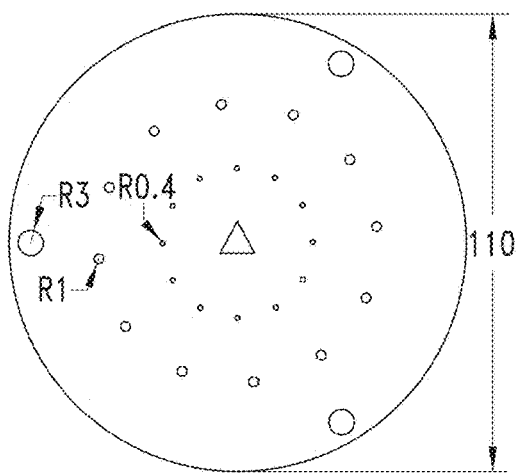 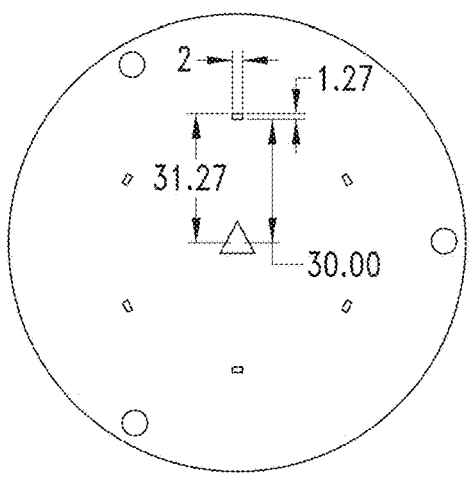
FIG. 1E-1    FIG. 1E-2
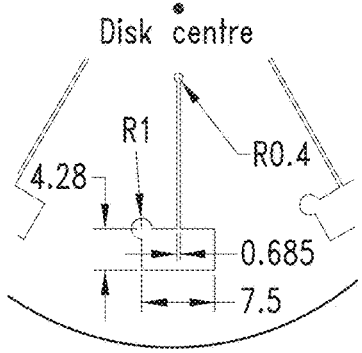
FIG. 1E-3
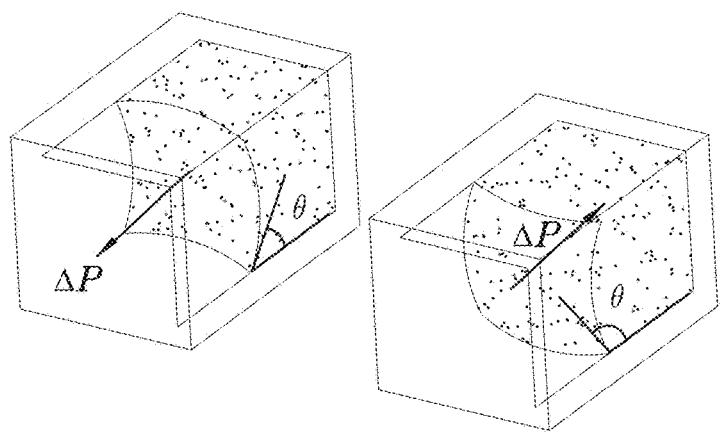
FIG. 1F

| Spacing between laser passes (um) | Fluid flow | Power | Contact angle (°) | Stdv (°) |
|---|---|---|---|---|
| 40 | Advancing | 13mW | 148.9 | 3.85 |
| | | 5mW | 144.9 | 5.71 |
| | Receding | 13mW | 142.5 | 3.64 |
| | | 5mW | 135 | 5 |
| | Static | 13mW | 125.8 | 1.5 |
| | | 5mW | 129.3 | 1.1 |
| 45 | Advancing | 13mW | 154.08 | 3.72 |
| | | 5mW | 159.33 | 4.96 |
| | Receding | 13mW | 142.41 | 6.09 |
| | | 5mW | 153.97 | 2.85 |
| | Static | 13mW | 129.2 | 2.1 |
| | | 5mW | 135.9 | 1.3 |
| 50 | Advancing | 13mW | 149.49 | 3.7 |
| | | 5mW | 152.26 | 5.36 |
| | Receding | 13mW | 145.32 | 4.04 |
| | | 5mW | 149.11 | 2.72 |
| | Static | 13mW | 132.1 | 1.5 |
| | | 5mW | 129.2 | 1.6 |
| 55 | Advancing | 13mW | 164.39 | 4.97 |
| | | 5mW | 158.40 | 4.98 |
| | Receding | 13mW | 155.89 | 3.81 |
| | | 5mW | 155 | 4.97 |
| | Static | 13mW | 147.0 | 1.2 |
| | | 5mW | 132.0 | 1.1 |
| N/A | Advancing | Control | 84 | 2.7 |
| | Receding | Control | 82 | 3 |
| | Static | Control | 78.5 | 2.5 |

*FIG. 2B*

| | Control | Hydrophobic | Hydrophilic |
|---|---|---|---|
| $\theta_w(°)$ | 80.0±2.30 | 158.4±5.0 | 17.3±2.0 |
| $\theta_h(°)$ | 40.88±3.87 | 40.88±3.87 | 40.88±3.87 |
| W (μm) | 679.0±40.0 | 710.0±35.0 | 666.0±38.0 |
| H (μm) | 375±15 | 375±15 | 375±15 |
| Burst frequency (rpm) | 648.5±49.6 | 817.6±35.4 | 522.50±48.88* (A: 662.50±48.20, difference: 140.0±29.43) |
| Theoretical P (Pa) | 351.74±24.76 | 487.83±19.66 | 222.86±19.70 |
| Experimental P (Pa) | 349.07±55.11 | 490.49±42.10 | 212.55±34.87 |

*calculated from Pressure

METHODS FOR ESTABLISHING HYDROPHILIC AND HYDROPHOBIC AREAS ON A SURFACE OF A SUBSTRATE OR FILM AND ASSOCIATED MICROFLUIDIC DEVICES

RELATED APPLICATIONS

This application is a Continuation of International Patent Application No. PCT/IB2021/060530, filed Nov. 13, 2021, which claims priority to and the benefit of U.S. Provisional Patent Application No. 63/113,589, filed Nov. 13, 2020. Each of these disclosures is herein incorporated by reference it its entirety.

BACKGROUND

In all microfluidics, fluid control is essential for accuracy and precision of sample-to-answer results. As microchannel dimensions decrease in microfluidic devices, forces inside of the channels become more dominant (e.g., increased capillary force depending on the surface material and fluid used). A way of controlling the fluid inside of the micro-channels is by making passive valves inside these channels.

At the moment, the valves are restricted by completely changing the entire material or large surface areas to hydrophobic or hydrophilic, or, insertion of a material and elaborate chemical modification on large areas of the microfluidic scale, specific areas of the micro-channels.

In the late 1990s, polymers supplanted silicon and glass as the material of choice for the fabrication of micro total analysis systems (μTAS) and lab-on-a-chip devices. However, more recently, the microfluidics field has explored more with thermoplastic polymers, which have enabled research facilities to rapidly prototype devices and transfer the technology to industrial applications. Thermoplastics are densely crossed-linked, mouldable, are optically clear, durable, have low raw material costs, as well as established manufacturing methods, making them attractive for mass production. One of the main thermoplastics used for microfabrication is poly (bisphenol A carbonate), otherwise known as polycarbonate (PC). This optically transparent polymer has a high intrinsic absorption at 248 nm, in the deep-UV wavelength band, and low absorption in the near-infrared.

Some of its characteristics, such as low surface energy, high chemical stability, poor surface absorbability and adhesion to other films and coatings, make this polymer challenging to integrate into μTAS devices. Several studies have tried to tune PC's dielectric properties, surface modification (and wettability), effect of chemical doping in the PC laser ablation and micropatterning using excimer nanosecond laser irradiation. Femtosecond pulsed laser irradiation has also been used for micro hole drilling, micro pattern and lens arrays, on PC. Those studies demonstrated the formation of microstructures and how changing the wettability of polymer surfaces can be of great interest in microfluidics.

Wettability, characterized by hydrophilicity and hydrophobicity, plays a role in nanofluidic and microfluidic devices due to the high surface area-to-volume ratio, therefore, making the fluid more susceptible to the surface tension on the microchannel walls.

The ability to tune the wettability of surfaces is a critical to precise fluid control in microfluidics, especially centrifugal microfluidic discs. Hydrophobic valves, have been used to control the burst speed (rotational speed at which the fluid opens the valve and move to another reservoir) or to stop capillary action and therefore allow better sample metering and avoidance of cross contamination between chambers. In the case of hydrophilic surfaces, the use of capillary force can be used to displace fluid back to the centre of microfluidic disks allowing for the use of timed valves and siphons.

SUMMARY

Embodiments of the present disclosure provides methods, systems and devices for manipulating the burst frequency and pressure in microfluidics channels (e.g., of a microfluidic circuit) using laser surface modification, to induce both super-hydrophilic (having a contact angle of zero or near zero) and hydrophobic (displaying a contact angle of 90 deg. or greater, and in some embodiments, of 150 deg. or greater (the latter corresponding to a super-hydrophobic area, with very low contact angle hysteresis (<10°) with water), areas on the same disc material, without any added reagents or post-treatment. Such embodiments provide crucial functionality for further miniaturization of devices in the future.

Embodiments of the present disclosure enable the tuning of the wettability of surfaces—in some embodiments, both super-hydrophilic and hydrophobic, which is an important factor to precise fluid control in microfluidic (especially microfluidic disks). Hydrophobic valves, have been used to control the burst speed (rotational speed at which the fluid opens the valve and move to another reservoir) or to stop capillary action and therefore allow better sample metering and avoidance of cross contamination between chambers. In the case of super-hydrophilic surfaces, the use of capillary force can be used to displace fluid back to the centre of microfluidic disks allowing for the use of timed valves and siphons Embodiments of the present disclosure introduce surface modification techniques using femto and nanosecond lasers which enable the modification of the wettability of a substrate, e.g., polycarbonate or other polymers, to respectively hydrophobic (and/or super-hydrophobic including contact angles of 150 degrees or higher), and/or super-hydrophilic, without chemical waste. In addition, techniques according to some embodiments allow for site-specific modification, enabling more efficient fluid manipulation in microfluidic devices. The applicability of such physically altered surfaces as microfluidic valves, according to some embodiments, were determined by considering burst frequencies using centrifugal microfluidic systems (CMS or CMSs), which, in some embodiments, result in an increase in a pressure required to burst a hydrophobic valve, decrease for a hydrophilic valves. Hydrophilic valves according to some embodiments, can also function as a means to increase a pressure necessary to burst the valves. Moreover, in some embodiments, the increase or decrease in pressure can be adjusted or tuned, according to some embodiments of the disclosure, according to, for example, channel dimensions and valve (hydrophobic or hydrophilic) patch area inside of the channel.

Accordingly, in some embodiments, a microfluidic surface/substrate (e.g., centrifuge disk) manufacturing method is provided and comprises providing a substrate having a surface (e.g., polycarbonate, for example), which may be a disk, and at least one of:

establishing one or more hydrophobic areas (at high precision, accuracy even at micro or nano areas) on the surface of a substrate (e.g., microfluidic centrifuge disk or other microfluidic device) by exposing such areas to a predetermined wavelength or range of wavelengths of light (e.g., 800 nm, and in some embodiments, e.g., infrared) via in some embodiments, a femtosecond (for example) pulsed laser, and in some embodiments, using a femtosecond pulsed laser, where, the pulsed laser creates corresponding contact angles, in some embodiments, 90 deg. or greater, 120 degrees or greater, and, in some embodiments, greater than 150 deg.; and establishing one or more super-hydrophilic areas on the surface by exposing such areas to a UV nanosecond laser pulses, with contact angles (in some embodiments), of zero or near zero degrees.

In some embodiments, a microfluidic manufacturing method is provided and comprises providing a polycarbonate (for example) disk (PD), and establishing one or more fluid valves, and/or pathways on the surface of the PD comprising one or more combinations of hydrophobic and super-hydrophilic areas adjacent one another, where hydrophobic areas are established on the surface of PD by exposing such areas to a predetermined wavelength or wavelengths (e.g., 800 nm) via, for example, a femtosecond pulsed laser (FPL), where the FPL creates contact angles corresponding to hydrophobicity (see, e.g., FIG. 2B), and super-hydrophilic areas are established on the surface of the PD by exposing such areas to a UV nanosecond laser pulses, and establishing contact angles corresponding to super-hydrophilicity.

In some such embodiments, as noted above, one and/or another of the following additional features, functionality, ranges of values, steps, and/or clarifications can be included (in some embodiments, a plurality of, and in some embodiments, all of) yielding yet further embodiments:

contact angle related to the walls of the height of the channel of between 37° and 45°;

contact angle related to the walls of the width of the channel of between about 140° and 164°;

width of a microchannel of between about 650 and 750 μm;

height of a microchannel of between about 350 and 390 μm; and pressure of between about 450 and 550 Pa.

The above-noted values, as well as other values disclosed herein relating to contact angles, pressures, and hydrophobicity/hydrophilicity, can be adjusted or tuned according to channel dimensions and laser parameters.

In some embodiments, precise and reduced spot-size capabilities using a laser to alter surfaces, without chemical treatment, chemical waste, or chemical residues is provided for producing, for example, lab-on-a-disk-systems (as well as other microfluidic systems, e.g., capillary sampling). In some embodiments, hydrophobic and/or super-hydrophilic can be created on surfaces in the same material (e.g., polycarbonate, polymers) at different areas and positions merely by using different laser settings (e.g., spot size, wavelength, spacing, and/or pulse, etc.). Accordingly, capillary forces, that are a recurrent issue in microfluidics, can be controlled for practical applications, including, for example when users handle a disk and insert the sample, the moment the disk is placed in a centrifugal system (for example), capillary forces can take place and move the fluids, which becomes a problem for sequential bioassays taking place in disk. Thus, in some embodiments, the systems, devices and methods increase fluid control in the microfluidic field in general (e.g., microfluidic disks, blood sampling. Some embodiments can also be applied to open-microfluidic circuits that may take advantage of having a hydrophobic or super-hydrophilic circuits or patches in specific circuit locations.

In some embodiments, such functionality can be achieved via at least one of:

material modification using laser ablation;

formation of hydrophobic microfluidic valves;

formation of super-hydrophilic microfluidic valves;

formation of hydrophobic and/or super-hydrophilic surfaces in the same material using different laser(s) parameters;

precise area, positioning and design of surface modification (precise location and reduced size relative to any current technology, enabling valves in micro-channels that can be used for micro- and nano-fluidics), including, for example, formation of hydrophobic and/or super-hydrophilic surfaces of/for/within micro-channels;

and use of alternate, or different spacings between lased and non-lased areas (micro-areas) so as to tune a degree of hydrophobicity and hydrophilicity of the material surface to a desired amount.

In some embodiments, a microfluidic device manufacturing method is provided and includes providing a substrate or film having a surface, and at least one of establishing one or more hydrophobic areas on the surface of the substrate by exposing such areas to an IR wavelength of a first pulsed laser, such that the first pulsed laser creates predetermined contact angles (e.g., static), and establishing one or more super-hydrophilic areas on a different location on the same surface by exposing such areas to an UV wavelength from a second pulsed laser.

Such embodiments may include one and/or another of the following additional features, functionality, structure, steps, or clarifications (in some embodiments, a plurality of, in some embodiments, a majority of, in some embodiments, substantially all of, and in some embodiments all of), leading to yet further embodiments:

hydrophobic areas are created via machining using spot pulses from a femtosecond laser;

and the super-hydrophilic areas are created via machining using spot pulses from a nanosecond laser.

In some embodiments, a microfluidic device manufacturing method is presented and includes providing a one or more microfluidic channels on a surface of a substrate or film, and establishing one or more areas fluid valves, and/or pathways on the surface of the surface comprising one or more combinations of hydrophobic and super-hydrophilic areas. The hydrophobic areas are established on the surface of the substrate or film by exposing such areas to an IR wavelength of a first pulsed laser, where the first pulsed laser creates predetermined contact angles. Additionally, the super-hydrophilic areas are established on the surface of the surface or substrate by exposing such areas to a UV wavelength of a second pulsed laser.

In some embodiments, a method of making a hydrophobic area and/or a super-hydrophilic area on at least one surface of a polycarbonate (PC) substrate or film (for example), or on at least one surface of a substrate or film material including properties similar to PC (for example) is provided and includes machining, using laser ablation, at least a portion of the at least one surface of the substrate or film via a plurality of spot pulses from a laser to form, via a mask or a spatial light modulator (SLM), at least one of a super-hydrophilic area and a hydrophobic area. For the super-hydrophilic area, the laser comprises a nanosecond laser, and for the hydrophobic areas, the laser comprises a femtosecond laser.

Such embodiments may include one and/or another of the following additional features, functionality, structure, steps, or clarifications (in some embodiments, a plurality of, in some embodiments, a majority of, in some embodiments, substantially all of, and in some embodiments all of), leading to yet further embodiments:

- the power of the nanosecond laser is configured based on the depth of ablation desired;
- a wavelength of the nanosecond laser is selected from the group consisting of: between 150-400 nm, 150-350 nm, 150-300 nm, 150-250 nm, 150-200 nm, 200-400 nm, 250-400 nm, 300-400 nm, 350-400 nm, and ranges therebetween;
- a wavelength of the nanosecond laser is selected in the UV range;
- the nanosecond laser is a UV laser;
- the femtosecond laser is an IR laser;
- a wavelength of the femtosecond laser used as demonstration is 800 nm;
- a wavelength of the nanosecond laser used as demonstration is 248 nm;
- spot pulses of the nanosecond laser are delivered for a duration selected from the group consisting of: between 0.1-50 ns, between 0.1-40 ns, between 0.1-30 ns, between 0.1-20 ns, between 0.1-10 ns, between 0.1-5 ns, between 0.1-1 ns, between 0.5-50 ns, between 1-50 ns, between 5-50 ns, between 10-50 ns, between 15-50 ns, between 20-50 ns, between 25-50 ns, between 30-50 ns, between 35-50 ns, between 40-50 ns, between 45-50 ns, and ranges therebetween;
- a repetition rate of the nanosecond laser is selected from the group consisting of: between: 1 Hz-5 kHz, 1 Hz-4 kHz, 1 Hz-3 kHz, 1 Hz-2 kHz, 250 Hz-5 kHz, 250 Hz-4 kHz, 250 Hz-3 kHz, 500 Hz-5 kHz, 500 Hz-4 kHz, 500 Hz-5 kHz, 1-5 kHz, 1-4 kHz, 1-3 kHz, 1-2 kHz, 2-5 kHz, 2-4 kHz, 2-3 kHz, 3-5 kHz, 3-4 kHz, 4-5 kHz, and ranges therebetween;
- a spot pulse size established by the nanosecond laser is selected from the group consisting of: between 10-10,000 $\mu m^2$, between 100-10,000 $\mu m^2$, between 250-10,000 $\mu m^2$, between 500-10,000 $\mu m^2$, between 750-10,000 $\mu m^2$, between 1,000-10,000 $\mu m^2$, between 2,000-10,000 $\mu m^2$, between 3,000-10,000 $\mu m^2$, between 4,000-10,000 $\mu m^2$, between 5,000-10,000 $\mu m^2$, between 6,000-10,000 $\mu m^2$, between 7,000-10,000 $\mu m^2$, between 8,000-10,000 $\mu m^2$, between 9,000-10,000 $\mu m^2$, between 10-1,000 $\mu m^2$, between 10-2,000 $\mu m^2$, between 10-3,000 $\mu m^2$, between 10-4,000 $\mu m^2$, between 10-5,000 $\mu m^2$, between 10-6,000 $\mu m^2$, between 10-7,000 $\mu m^2$, between 10-8,000 $\mu m^2$, between 10-9,000 $\mu m^2$, between 1,000-2,000 $\mu m^2$, between 1,000-3,000 $\mu m^2$, between 1,000-4,000 $\mu m^2$, between 1,000-5,000 $\mu m^2$, between 1,000-6,000 $\mu m^2$, between 1,000-7,000 $\mu m^2$, between 1,000-8,000 $\mu m^2$, between 1,000-9,000 $\mu m^2$, between 1,000-10,000 $\mu m^2$; and ranges therebetween;
- a spacing between spot pulses of the nanosecond laser is selected from the group consisting of: between 1-100.000 nm, between 1-75,000 nm, between 1-50,000 nm, between 1-25,000 nm, between 1-20,000 nm, between 1-15,000 nm, between 1-10,000 nm, between 1-5,000 nm, between 1-4,000 nm, between 1-3,000 nm, between 1-2,000 nm, between 1-1,000 nm, between 1000-100,000 nm, between 10,000-100,000 nm, between 25,000-100,000 nm, between 50,000-100,000 nm, between 75,000-100,000 nm, and ranges therebetween;
- a spacing between lines of spot pulses of the nanosecond laser is selected from the group consisting of: between 1 nm-1000 μm, between 1 nm-750 μm, between 1 nm-500 μm, between 1 nm-250 μm, between 1 nm-100 μm, between 1 nm-50 μm, between 1 nm-10 μm, between 1 nm-1 μm, between 10 nm-1000 μm, between 100 nm-1000 μm, between 1 μm-1000 μm, between 10 μm-1000 μm, between 100 μm-1000 μm, between 250 μm-1000 μm, between 500 μm-1000 μm, between 750 μm-1000 μm, between 800 μm-1000 μm, between 900 μm-1000 μm, and ranges therebetween;
- the nanosecond laser establishes the super-hydrophilic area within a channel, and a static water contact angle is established in the channel of the super-hydrophilic area of greater than 99 deg. from a water droplet arranged between a top and a bottom wall of a channel including the super-hydrophilic are, or a completely wettable surface is formed where the water contact angle is zero or near zero deg.;
- the power of the femtosecond laser is configured based on the depth of ablation desired;
- the power of the femtosecond laser is selected from the group consisting of: between 1-1000 mW, between 10-1000 mW, between 25-1000 mW, between 50-1000 mW, between 100-1000 mW, between 250-1000 mW, between 300-1000 mW, between 400-1000 mW, between 500-1000 mW, between 750-1000 mW, between 800-1000 mW, between 900-1000 mW, between 1-900 mW, between 1-800 mW, between 1-700 mW, between 1-600 mW, between 1-500 mW, between 1-400 mW, between 1-300 mW, between 1-200 mW, between 1-100 mW, between 1-50 mW, between 1-25 mW, between 1-20 mW, between 1-15 mW, between 1-10 mW, between 1-5 mW, and ranges therebetween;
- a wavelength of the femtosecond laser is selected from the group consisting of: between 680-1130 nm, between 680-1000 nm, between 680-900 nm, between 680-800 nm, between 680-700 nm, between 700-1130 nm, between 800-1130 nm, between 900-1130 nm, between 1000-1130 nm, and ranges therebetween;
- spot pulses of the femtosecond laser are delivered for a duration selected from the group consisting of: between 10-400 fs, between 25-400 fs, between 50-400 fs, between 75-400 fs, between 100-400 fs, between 150-400 fs, between 200-400 fs, between 250-400 fs, between 300-400 fs, between 350-400 fs, between 10-300 fs, between 10-200 fs, between 10-100 fs, between 10-75 fs, between 10-50 fs, between 10-25 fs, and ranges therebetween;
- a repetition rate of the femtosecond laser is selected from the group consisting of: between 500 Hz-300 kHz, between 500 Hz-200 kHz, between 500 Hz-100 kHz, between 500 Hz-50 kHz, between 500 Hz-10 kHz, between 500 Hz-5 kHz, between 500 Hz-1 kHz, between 500 Hz-750 Hz, between 750 Hz-300 kHz, between 1 kHz-300 kHz, between 1.5 kHz-300 kHz, between 2 kHz-300 kHz, between 5 kHz-300 kHz, between 10 kHz-300 kHz, between 25 kHz-300 kHz, between 50 kHz-300 kHz, between 100 kHz-300 kHz, between 150 kHz-300 kHz, between 200 kHz-300 kHz, between 250 kHz-300 kHz, and ranges therebetween;
- a spot size established by the femtosecond laser is selected from the group consisting of: between 1-2500

μm², between 1-2000 μm², between 1-1500 μm², between 1-1000 μm², between 1-750 μm², between 1-500 μm², between 1-250 μm², between 1-100 μm², between 1-75 μm², between 1-50 μm², between 1-25 μm², between 1-10 μm², between 1-5 μm², between 1-2 μm², between 10-2500 μm², between 25-2500 μm², between 50-2500 μm², between 75-2500 μm², between 100-2500 μm², between 250-2500 μm², between 500-2500 μm², between 750-2500 μm², between 1000-2500 μm², between 1250-2500 μm², between 1500-2500 μm², between 1750-2500 μm², between 2000-2500 μm², between 2250-2500 μm², and ranges therebetween;

a spacing between spot pulses of the femtosecond laser is selected from the group consisting of: between 500 nm-100 μm, between 1 μm-100 μm, between 10 μm-100 μm, between 25 μm-100 μm, between 50 μm-100 μm, between 75 μm-100 μm, between 80 μm-100 μm, between 90 μm-100 μm, between 500 nm-90 μm, between 500 nm-75 μm, between 500 nm-50 μm, between 500 nm-25 μm, between 500 nm-10 μm, between 500 nm-5 μm, between 500 nm-2 μm, between 500 nm-1 μm, and ranges therebetween;

a spacing between lines of spot pulses of the femtosecond laser is selected from the group consisting of: between 500 nm-100 μm, between 2500 nm-100 μm, between 500 nm-100 μm, between 750 nm-100 μm, between 1 μm-100 μm, between 2 μm-100 μm, between 5 μm-100 μm, between 10 μm-100 μm, between 25 μm-100 μm, between 30 μm-100 μm, between 40 μm-100 μm, between 50 μm-100 μm, between 75 μm-100 μm, between 80 μm-100 μm, between 90 μm-100 μm, between 100 nm-100 μm, between 100 nm-75 μm, between 100 nm-50 μm, between 100 nm-25 μm, between 100 nm-20 μm, between 100 nm-10 μm, between 100 nm-5 μm, between 100 nm-2 μm, between 100 nm-1 μm, between 100 nm-900 nm, between 100 nm-750 nm, between 100 nm-500 nm, between 100 nm-250 nm, between 100 nm-200 nm, between 100 nm-150 nm, and ranges therebetween;

the femtosecond laser establishes the hydrophobic areas within a channel (as well as can establish the hydrophobic areas), such that, a static contact angle of 90 deg. or greater, and in some embodiments, 120 deg. or greater, and in some embodiments, 150 deg. or greater (super-hydrophobic areas);

the PC substrate or film is adhered to one or more additional layers;

and the one or more additional layers comprise one or more of: at least one layer of polyethylene terephthalate (PET), an additional layer of polycarbonate (PC) and including at least one surface, at least one layer of polymethyl methacrylate (PMMA) arranged adjacent at least one of the layers of PC, and at least one layer of a pressure sensitive adhesive (PSA) arranged between adjacent layers;

In some embodiments, a method for producing a material and/or surface of a substrate or film is provided which includes at least one of one or more super-hydrophilic and one or more hydrophobic areas, produced via a nanosecond laser (for super-hydrophilic) and a femtosecond laser (for hydrophobic), respectively.

In some embodiments (which can include those listed above and elsewhere in this disclosure), at least one of the super-hydrophilic areas and/or the hydrophobic areas are configured as valves for a microfluidic circuit, device, or channel.

In some embodiments, a system is provided for conducting any of the methods disclosed herein.

In some embodiments, a microfluidic device is provided and includes at least one polymer (e.g., polycarbonate (PC) substrate or film, or a material including properties similar to PC), the substrate or film including a predetermined thickness, and including at least one surface. At least a portion of the at least one surface of the at least one substrate of film is machined using laser ablation via a plurality of spot pulses from a laser to form, with a mask or a spatial light modulators (SLM), at least one of a super-hydrophilic area and a hydrophobic area, via one or more passes. Each super-hydrophilic area includes a static contact angle of zero or near zero, and each hydrophobic area includes a static contact angle of greater than 90 deg., in some embodiments, greater than 120.0 deg., and in some embodiments, 150 deg. or greater (which can be considered super-hydrophobic).

Further to such device embodiments, the polymer substrate or film (e.g., PC) is adhered to one or more additional layers, and the one or more additional layers comprise one or more of: at least one layer of polyethylene terephthalate (PET), at least one layer of polycarbonate (PC), at least one layer of polymethyl methacrylate (PMMA) (which in some embodiments is arranged adjacent at least one of the layers of PC if used), and at least one layer of a pressure sensitive adhesive (PSA) arranged between adjacent layers.

In addition, in such device embodiments, the substrate or film comprises or is part of a centrifugal microfluidic disk.

The methodology for some of the embodiments of the disclosure can establish a combination of any of hydrophobic and super-hydrophilic areas (as well as hydrophilic if desired) on a substrate (e.g., a polymer, such as polycarbonate), with corresponding contact angles to attain of the forgoing can be established. Accordingly, in some embodiments, a nanosecond pulsed laser can used to effect a hydrophilic area having a contract angle range of 30 degrees or less, or a super-hydrophilic area having a contact angle range of approximately zero degrees, and a femtosecond laser can be used to effect a hydrophobic area having a contact angle range of 90 degrees or greater, in some embodiments, between 90 and 150 degrees, in some embodiments between 120 and 150 deg., or a super-hydrophobic area having a contact angle of 150 degrees or higher.

Accordingly, in some embodiments, the hydrophilic areas produced via a nanosecond laser, which can be tuned via associated parameters in view of the amount of hydrophilicity desired, to product contact angles of (according to various embodiments), selected from the group consisting of: zero (0) or near zero (super-hydrophilic); between 0-1 deg.; between 0-2 deg.; between 0-3 deg.; between 0-4 deg.; between 0-5 deg.; between 0-10 deg.; between 1-2 deg., between 1-3 deg., between 1-4 deg. between 1-5 deg., between 1-10 deg., between 2-3 deg., between 2-4 deg., between 2-5 deg., between 2-10 deg., between 3-4 deg., between 3-5 deg., between 3-10 deg., between 4-5 deg., between 5-10 deg., between 0-50 deg., between 0-40 deg., between 0-30 deg., between 0-20 deg., between 0-15 deg., between 5-15 deg., between 5-20 deg., between 5-30 deg., between 5-40 deg., between 5-50 degrees, between 10-20 deg., between 10-25 deg., between 10-30 deg., between 10-40 deg., between 10-50 deg., between 15-20 deg., between 15-25 deg., between 15-30 deg., between 15-40 deg., between 15-50 deg., between 20-30 deg., between 20-40 deg., between 20-50 deg., between 25-30 deg., between 25-40 deg., between 25-50 deg., between 30-40 deg., between 30-50 deg., between 40-50 degrees, and range therebetween.

Accordingly, in some embodiments, the hydrophobic areas produced via a femtosecond laser, which can be tuned via associated parameters in view of the amount of hydrophobicity desired, to product contact angles of (according to various embodiments), selected from the group consisting of: 90 deg. or greater, 95 deg. or greater, 100 deg. or greater, 110 deg. or greater, 115 deg. or greater, 120 deg. or greater, 125 deg. or greater, 130 deg. or greater, 135 deg. or greater, 140 deg. or greater, 150 deg. or greater, between 90-100 deg., between 90-120 deg., between 90-149 deg., between 100-120 deg., between 100-149 deg., between 110-120 deg., between 110-149 deg., and between 120-149 deg., and ranges therebetween.

Additionally, in some embodiments, methods (and corresponding systems and devices) to attain hydrophobicity and super-hydrophilicity, and fine tuning thereof—and as noted in this disclosure—is via laser parameters, can produce surfaces/areas/portions corresponding to super-hydrophilicity or hydrophobicity.

These and other embodiments, features, functions, objects, and advantages of the subject disclosure will become even clearer with the following detailed description and accompanying drawings, a brief description of which follows immediately below.

BRIEF DESCRIPTION OF THE DRAWINGS

FIG. 1C illustrates an alignment tool, and various layers/substrates of a microfluidic disk, for assembling the microfluidic disk, according to some embodiments;

FIGS. 1D-1 and 1D-2 illustrate layers/substrates forming a microfluidic disk, according to some embodiments;

FIG. 1E-1 through 1E-3 illustrate dimensions for at least some of the layers and microfluidic elements or circuits, according to some embodiments;

FIG. 1F illustrates contact angles for microfluidics;

FIG. 2A-2B illustrates hydrophobic surfaces showing increase compared to the control in Advancing (Adv), Receding (Rec) and Static (Sta) contact angles, with respect to spacing and power used, according to some embodiments;

FIG. 3 illustrates an image of surface roughness created on a polymer (e.g., PC) via a femtosecond laser to establish hydrophobicity, according to some embodiments;

DETAILED DESCRIPTION

In some embodiments, a particular material having a surface (e.g., polycarbonate) can be machined via laser ablation with different laser parameters to obtain super-hydrophilic, and hydrophobic areas ("modified area" or "modified areas"). In addition, such materials can be part of a layered composite for, among many reasons, structural integrity. Accordingly, while some embodiments are discussed below correspond to layered structures, where one and/or another of the layers include a surface machined via laser ablation to produce the modified areas (as well as microfluidic circuits, microfluidic channels, and microfluidic valves—the latter which can correspond to the modified areas), some embodiments of the disclosure are directed to surface modification of a material to effect modified areas, whether or not they are combined into a layered composite.

One of skill in the art will appreciate that methods, systems and devices, according to some embodiments, can produce (or be) microfluidic devices/systems with merely hydrophobic and hydrophilic areas/surfaces (e.g., in addition to or in place of effecting hydrophobic and super-hydrophilic areas/surfaces Various lasers and laser configurations/parameters are disclosed herein, a brief description of each is set out below.

Figure 1A:
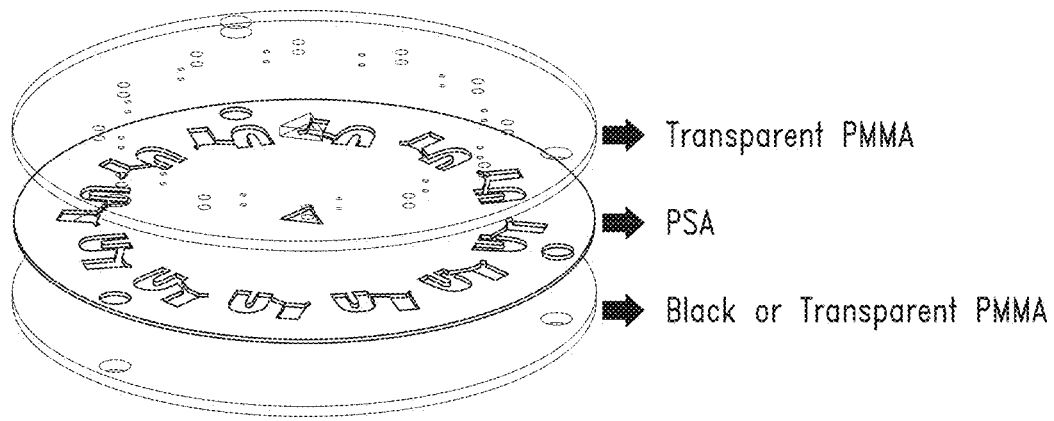
FIG. 1A illustrates a plurality of different types of polymer being assembled together to form a microfluidic disk, according to some embodiments.
Figure 1B:
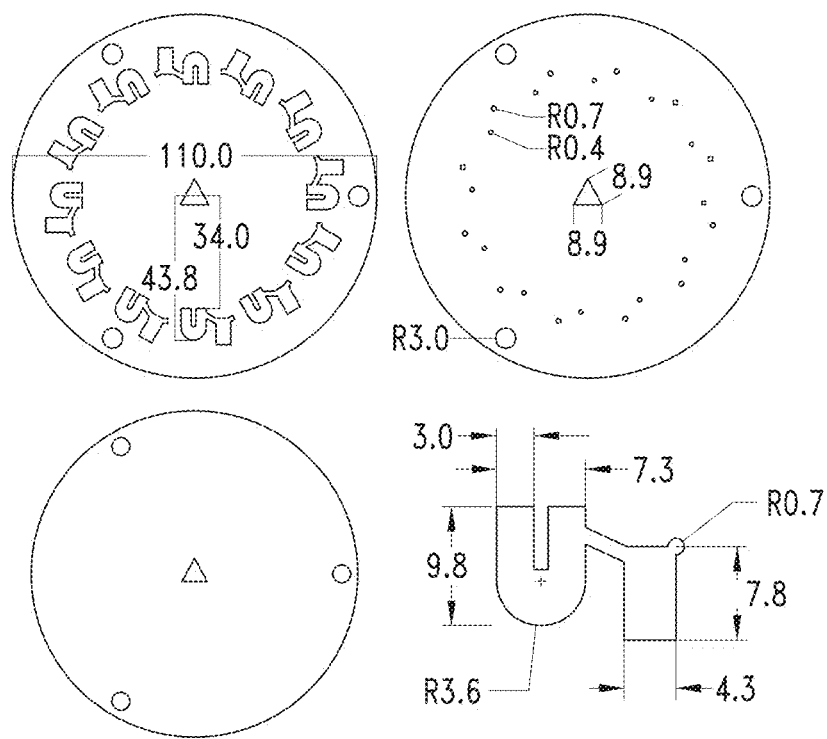
FIG. 1B illustrates exemplary dimensions for various layers/substrates for a microfluidic disk, according to some embodiments.

As shown in FIG. 1A, in some embodiments, one or more, and in some embodiments, a plurality (e.g., two) of polymethyl methacrylate (PMMA) layers, which, in an embodiment, can include two different PMMA layers—a 2.5 mm black layer (e.g.) and a 2.0 mm transparent layer (e.g.), coupled to a medical grade 125 µm pressure sensitive adhesive (PSA) (ARcare 90106, Adhesive Research). In some embodiments, the two different colours serve to compare an effect of different backgrounds during, for example, fat separation experiments. FIG. 1B illustrates exemplary, and non-limiting, dimensions of disks and microfluidic circuits according to some embodiments.

A bottom and a top part of microfluidic disks, according to some embodiments, can be cut using a continuous wave $CO_2$ laser (Universal Laser Systems, VLS3.50, 30 W, 10.6 µm). The PMMA can be cut using 2.0 lenses from Universal systems with working distance of 50.8 mm and 127 µm spot size. The settings used to cut the 2.0 mm and 2.5 mm PMMA were respectively 30 W at 11.25 mm/s and 30 W at 8.75 mm/s. In some embodiments, the PSA can also be cut using the same laser system, but different lenses. A HPDFO (High Power Density Focusing Optics) lens was used to generate a 25.4 µm spot size, and parameters used to cut the PSA can be 1.35 W and 55 mm/s using the smaller spot size.

In some embodiments, modified surfaces can be made with 100 µm polycarbonate (PC) films (e.g., Makrofol®), or materials having similar properties. Hydrophilic PC surfaces can be fabricated using nanosecond UV laser machining (i.e., ablation), the specifications, according to some embodiments, can be 248 nm, 5 ns pulse duration, 500 Hz repetition rate, and can be a nanosecond laser from Xantos XS, Coherent Inc., USA) via a micromachining stage (e.g., IX-100C, JPSA Inc., USA). Creation of a flat-top beam profile can be achieved with a physical mask, and/or a spatial light modulator (SLM)(SLM can be used so that many spots can be machined/ablated at the same time). In some embodiments, an optimized setting can be approximately 100 µm$^2$ spot sizes (10 µm×10 µm), 1 µm spacing between shots, and 8, 10 and 12 µm spacing between lines. In some embodiments, the power used for the nanosecond laser can be 0.5 mW.

In some embodiments, hydrophobic substrate surfaces (e.g., polymer—e.g., polycarbonate) can be fabricated with femtosecond laser machining, the specifications, according to some embodiments, can be 800 nm, 100 fs pulse duration, 1 kHz, and can be a femtosecond laser from Legend Elite, Coherent Inc., USA (the micromachining stage (e.g., IX-100C, JPSA Inc., USA.). In some embodiments, optimized femtosecond laser settings can be, 2500 µm$^2$ square spot sizes (10 µm×10 µm), 1 µm spacing between shots, and 40, 45, 50, 55 µm spacing between lines (laser power can be 5 and 13 mW, according to some embodiments).

In some embodiments, a total area machined using both the nanosecond and femtosecond laser, can be approximately 6×6 mm, but in other embodiments, can be lesser or greater. The super-hydrophilic and hydrophobic surfaces can be used as valves along channels in microfluidic circuits (e.g., provided on a centrifugal microfluidic disk).

As noted above, in some embodiments, hydrophobic and most super-hydrophilic valves created by the laser machining can be used to create hydrophobic and super-hydrophilic valves in centrifugal microfluidic disk channels. Accordingly, in some embodiments, such centrifugal microfluidic disks can include a plurality of layers including, a layer of 100 µm thick PC film (e.g., Makrofol®), a layer of 125 µm thick pressure sensitive adhesive (PSA), e.g., AR-MH-90106, a 150 µm thick layer of polyethylene film, and a 2 mm thick layer of PMMA (e.g., PSP Plastics).

Microfluidic circuits can be formed on a surface of a layer formed by two pressure sensitive adhesive (PSA) layers sandwiching a polyethylene terephthalate (PET) sheet. These 3 layers can be attached and cut as a single piece. The nanosecond laser can be used to cut the circuit layer (e.g., for super-hydrophilic areas).

Various layers can be cut using a nanosecond laser system with a 110 µm diameter spot size, 0.8 µm spacing, 380 mW and two passes (e.g., a plurality of passes). A location of a start and an end of valves/surface modifications relative to the centre, can be, in some embodiments, 30.00 mm and 31.27 mm, respectfully. In other embodiments, the laser settings can be 100 µm diameter circle spot size, 0.8 µm spacing between shots and 335 mW and 3 passes (e.g., a plurality of passes). Beam shapes of the laser can be formed via an iris to avoid losing laser power.

Another polymer layer(s) (e.g., PMMA) can be attached to a sheet of PSA and can be cut/configured using to form the base and top of the disk, which also contained the air release outputs and sample input ports. In some embodiments, the PMMA layer can be cut via a continuous wave $CO_2$ laser (e.g., Universal Laser Systems, VLS3.50, 30 W, 10.6 µm), which, in some embodiments includes a power of 30 W and a scan speed of approximately 12.5 mm/s (one and/or another of the power and speed can be changes and/or scaled).

Microfluidic circuits machined on disks, according to some embodiments, can include one or more chambers configured for sample processing and analysis. Disks can also be was optimised with modifications in design made here include the angle of the chamber walls, dimensions, the addition of a waste chamber for accurate measurement of an initial sample and manufacturing materials. A total volume of the sample chamber can be 12.3 µl, whereas a sample analysed after separation between a measurement and waste chamber can be 5.1 µl.

In some embodiments, disks can include a plurality of layers, and in some embodiments, three (3) layers, which can be assembled together and aligned using three-point alignment as shown in FIG. 1C. The top layer of the disk, which in some embodiments, contains the sample or control inlets and the pressure release valves. The central layer contains one or more microfluidic circuits. The bottom layer can be used to, with the top layer, sandwich the microfluidic circuit layer. In this alignment method, the layers include alignment holes 102C and a rotor hole 104C. The cut layers are thus aligned using a three (3) poles that are of a predetermined diameter (e.g., 6 mm) and fitted to the alignment holes in disk. The disks were then pressed together using a roller.

FIG. 1D-1 illustrates the layers and assembly of a disk according to some embodiments, and includes PMMA layer 102D-1 (grey, 102), PSA layer 104D-1 (yellow, 104), PC layer 106D-1 (blue, 106), where the valves are arranged, and PET layer 108D-1 (brown/orange 108). The disk layers cross-section and its assembling. Exemplary dimensions are set out in FIG. 1E-1, top layer of PMMA, FIG. 1E-2, a PC layer showing the distance of valves, and FIG. 1E-3, fluidic circuit layer(s) being machined onto a PSA-PET-PSA assembly.

FIG. 1F is an illustration of a contact angle (θ) between a fluid and solid (e.g., wall). Specifically, in the left-hand view, capillary forces due to a hydrophilic surface push the liquid in the channel by wetting the walls and creating a concave meniscus. In the right-hand view, a hydrophobic surface stops the liquid from moving through a channel creating a convex meniscus. As one of ordinary skill in the art will appreciate (and is familiar with), a goniometer can be used to measure contact angles, and is essentially a platform to hold a sample perpendicular to a camera, where the user can acquire a perpendicular picture of a droplet relative to the surface being analysed. Measurements of contact angles correspond to how microchannels work in terms of capillary force. In addition, surface energy can be measured to quantify the differences between different surfaces used to fabricate microfluidic devices (e.g., disks) and their effect on fluid manipulation.

The contact angle can be correlated to surface tensions or energies via Young's equation (1) below $$\gamma_{sv} = \gamma_{sl} + \gamma_{lv} \cos \theta$$

Where, θ is the contact angle and $\gamma_{sv}$, $\gamma_{sl}$ and $\gamma_{lv}$ are respectively, the surface energy of solid-vapor, solid-liquid and liquid-vapor interfaces. There are several different methods to analyse the surface free energy (SFE) of solids. Some examples are Zisman, Fowkes, Wu, Equation-of-State (EOS) and Owens-Wendt-Rabel-Kaelble (OWRK) models.[170-174] For example, The Wu method distinguishes the polar ($\gamma_{sv}^p$ and $\gamma_{lv}^p$) and disperse components ($\gamma_{sv}^d$ and $\gamma_{lv}^d$) of the surface energy. It is based on the reciprocal mean and force additivity, where the SFE of a solid can be calculated in the expression (2) in below, [172]

$$\gamma_{sl} = \gamma_{sv} + \gamma_{lv} - 4\left|\frac{\gamma_{sv}^d \gamma_{lv}^d}{(\gamma_{sv}^d + \gamma_{lv}^d)} - \frac{\gamma_{sv}^p \gamma_{lv}^p}{(\gamma_{sv}^p + \gamma_{lv}^p)}\right|$$

By combining Young's equation with the expression immediately above, the Wu equation can be written to be associated with the contact angle as set out below (3).

$$\frac{1}{4}\gamma_{lv}(1 + \cos\theta) = \left|\frac{\gamma_{sv}^d \gamma_{lv}^d}{(\gamma_{sv}^d + \gamma_{lv}^d)} - \frac{\gamma_{sv}^p \gamma_{lv}^p}{(\gamma_{sv}^p + \gamma_{lv}^p)}\right|$$

In this equation, there are two unknowns $\gamma_{sv}^d$ and $\gamma_{sv}^p$, and can be solved as a system of equations by using two different liquids, therefore, using two different contact angles. Likewise, the OWRK method also distinguishes between the polar and the dispersive components and it needs at least two liquids to solve for the solid SFE. However, it uses a harmonic mean to account for all the interactions in the system, resulting in the equation below (4).

$$\gamma_{sl}=\gamma_{sv}+\gamma_{lv}-2\sqrt{\gamma_{lv}^d\gamma_{sv}^d}-2\sqrt{\gamma_{lv}^p\gamma_{sv}^p}$$

Combining (1), with (3), results in equation (5) below:

$$\tfrac{1}{2}\gamma_{sl}(1+\cos\theta)=\sqrt{\gamma_{lv}^d\gamma_{sv}^d}+\sqrt{\gamma_{lv}^p\gamma_{sv}^p}$$

This equation can be rearranged to a linear form (y=mx+c) in order to find the dispersive and polar components of the solid ($\gamma_{sv}^d$ and $\gamma_{sv}^p$) as seen in the following equation (6):

$$\frac{\gamma_{sl}(1+\cos\theta)}{2\sqrt{\gamma_{lv}^d}} = \sqrt{\gamma_{sv}^p}\frac{\sqrt{\gamma_{lv}^p}}{\sqrt{\gamma_{lv}^d}} + \sqrt{\gamma_{sv}^d}$$

The linear regression of two liquids results in a slope and intersection that can be used to calculate the polar component of the liquid and the intersection can be used to calculate the dispersive component.

Figure 2A:
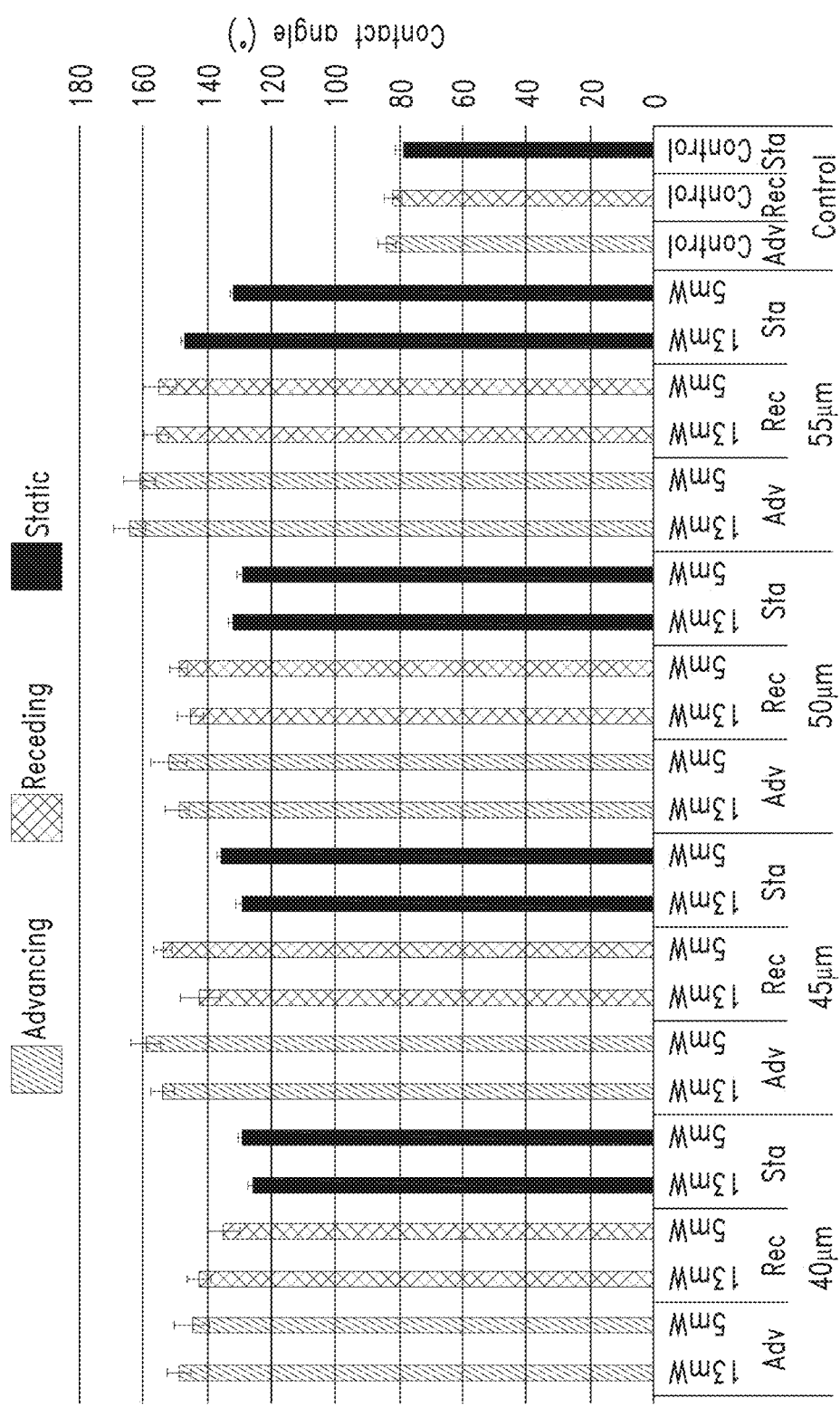
Figure 3:
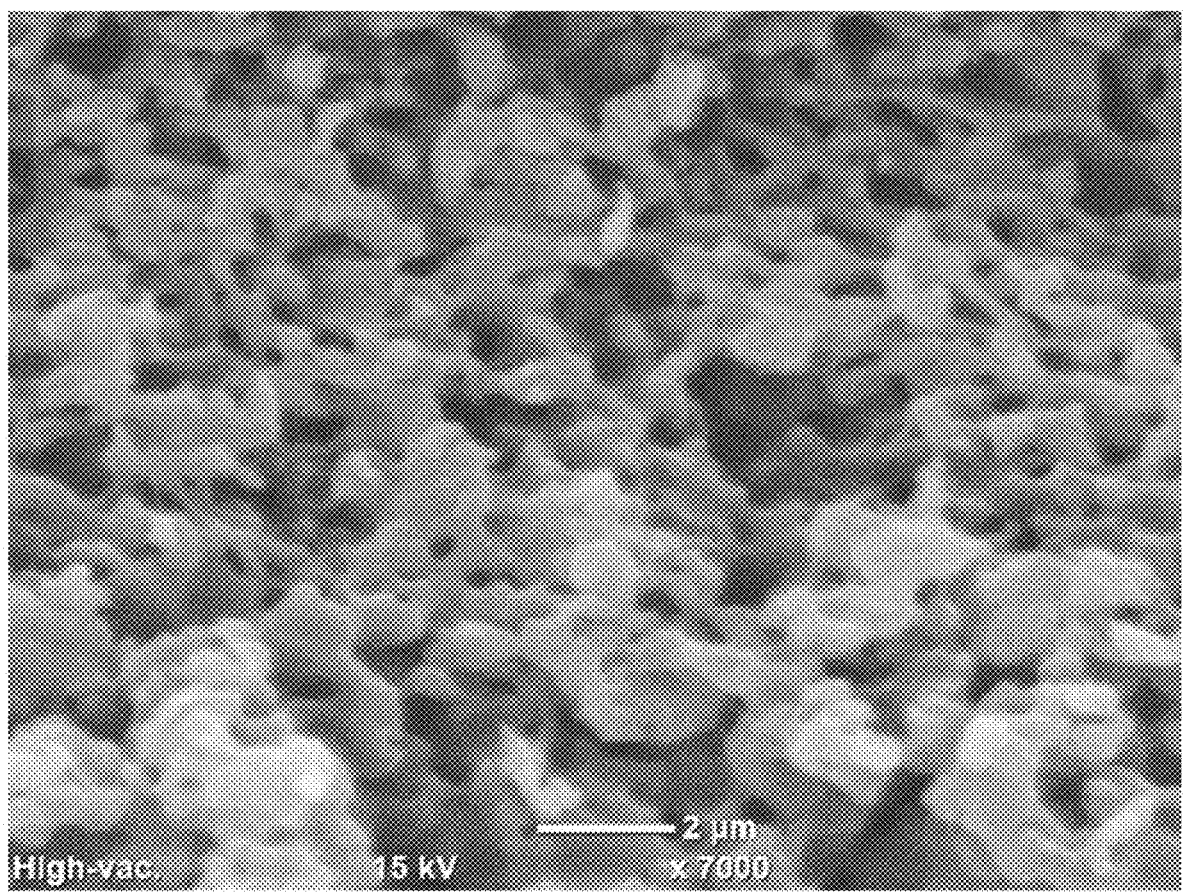

Accordingly, in some embodiments use of a femtosecond laser allows for the creation of a hydrophobic surface for static contact angles of, in some embodiments, greater than >136.0°±2.0 (hydrophobic surfaces can also be created). In some embodiments, hydrophobicity is also dependent on the spacing between laser lines. Therefore, using the same spot-sizes of (e.g., 50 μm), and central distances from each line being 40, 45, 50, and 55 μm (for example; see FIG. 4), the contact angles increase as spacing is increased. Furthermore, in some embodiments, the measure of advancing and receding contact angles correspond to superhydrophobic behaviour (i.e., above 150°) for line spacing of 55 urn and a hysteresis equal to 9.9°. FIG. 2A shows contact angle results and comparisons for hydrophobic surfaces according to some embodiments. Hydrophobic surfaces show an increase as compared to a control in Advancing (Adv), Receding (Rec) and Static (Sta) contact angles. The graph also displays the difference in contact angle according to the spacing and power used (see FIG. 2B).

Surface morphology of the machined areas (according to some embodiments) can be examined using a scanning electron microscope (SEM). Hydrophobic surfaces demonstrate an increase in roughness (see FIG. 3), due to non-linear absorption by the PC of near-infrared high intensity femtosecond laser. In some embodiments, the non-thermal characteristics of the femtosecond laser do not allow for a reflow of polymer, and therefore, the smoothing of the surface.

Figure 4:
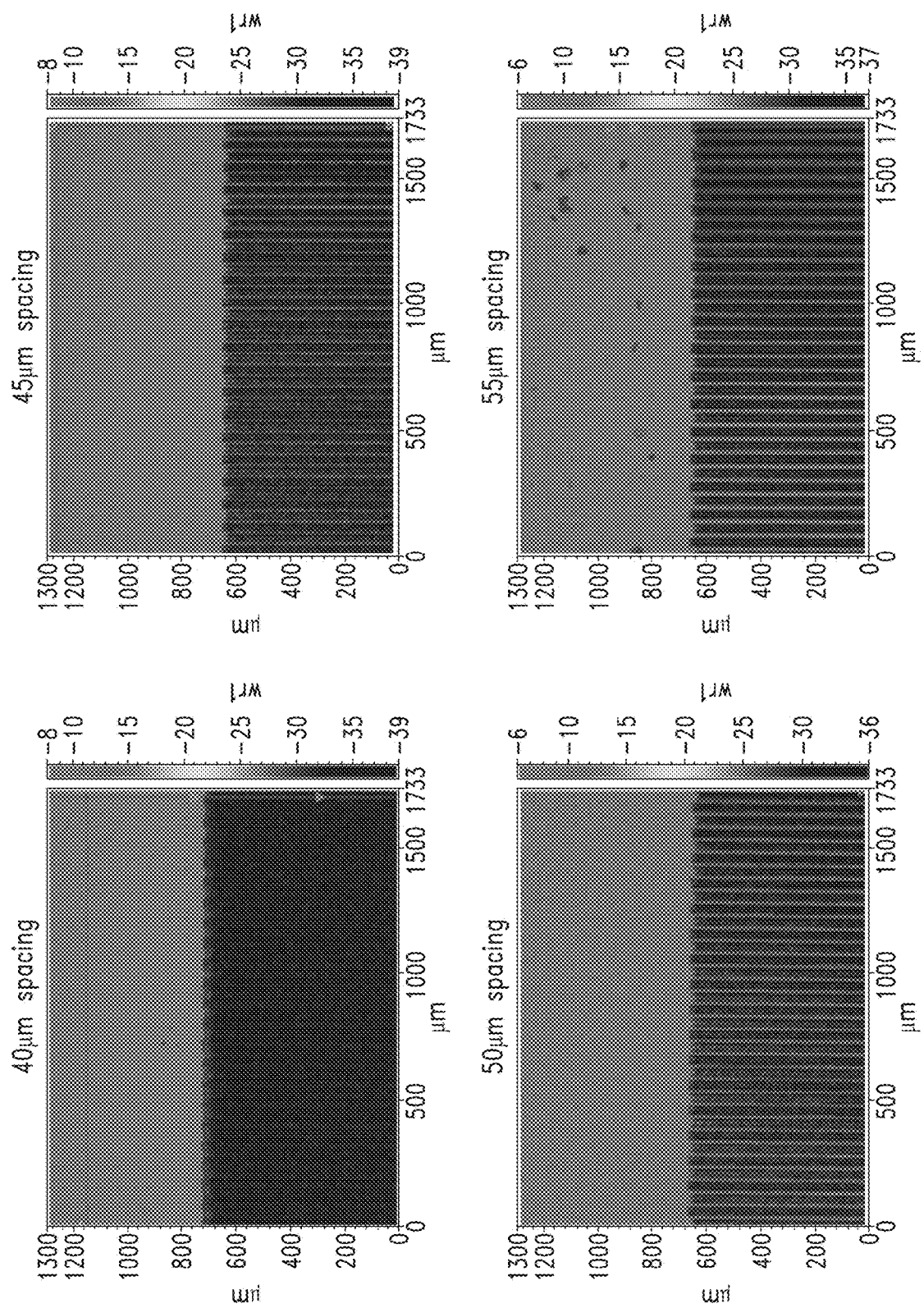
FIG. 4 illustrates optical profile measurements on top view and cross-section views for hydrophobic surfaces at different line spacing for a 13 mW laser, according to some embodiments.
Figure 4:
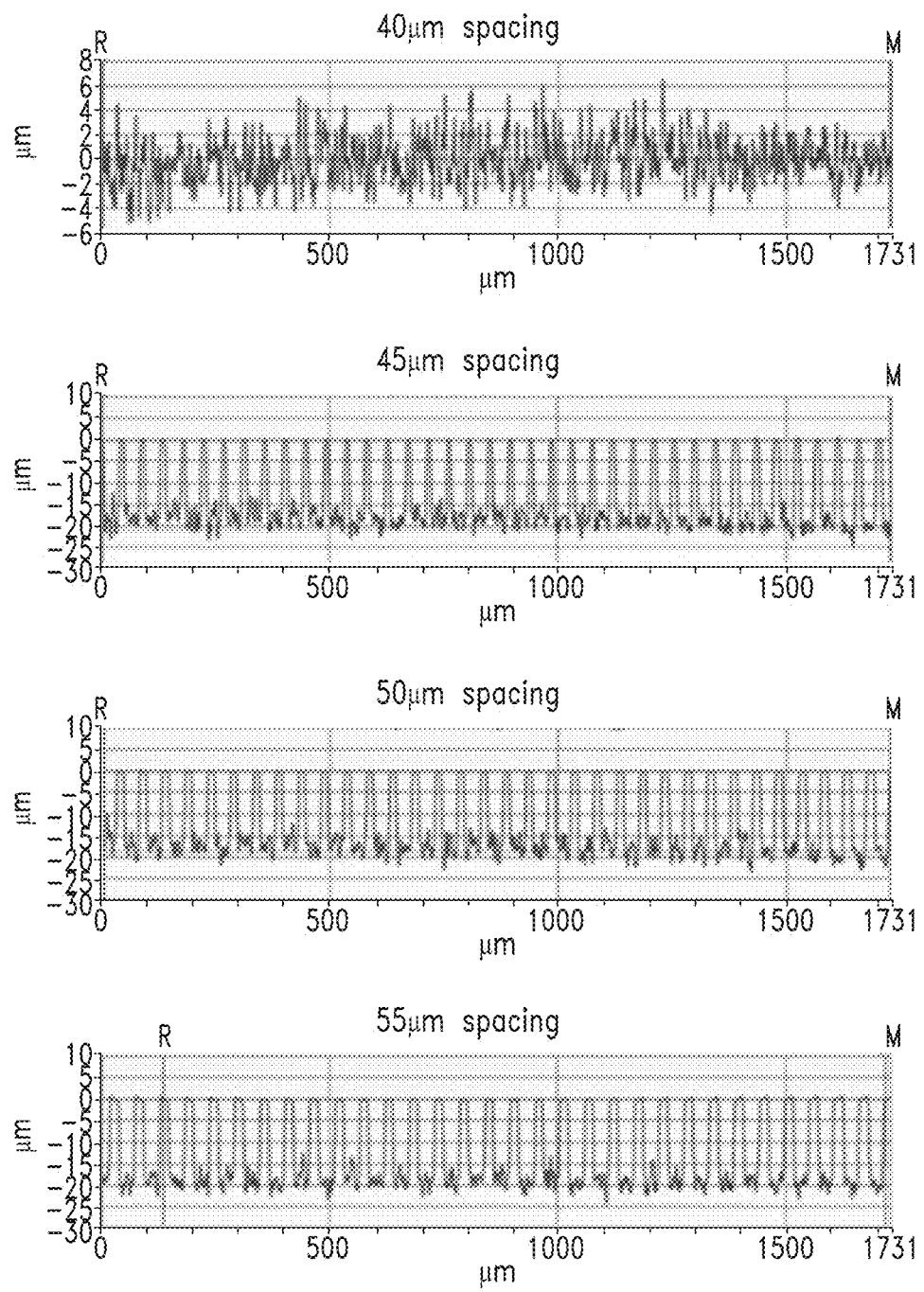

In addition to the rough surface, formation of crests of the same height of non-ablated areas can be obtained, and, in some embodiments, due to a larger line spacing. Hence, along with the rough surface, crests influence the difference in the contact angles. As shown in FIG. 2A, the largest increase in hydrophobicity occurs in the largest spacing used (55 μm), whereas the lowest occurs at 40 μm spacing. Parallel crests were seen in all but the 40 μm spacing as seen in FIG. 4. Furthermore, lower spacing ablation generated an irregular surface that varied approximately 4.0 μm in height. The highest ablation spacing (55 μm) using 13 mW power generated 20±2.5 μm grooves whilst 5 mW power 15±2.3 μm. The change in power generated virtually no change in hydrophobicity for the advancing and receding contact angles.

The optical profiler demonstrated that most of the increase in hydrophobicity due to the femtosecond laser ablation was generated by the increase in surface roughness as seen in the 40 μm spacing sample in FIG. 4, which illustrates optical profile measurements via a top view and a cross-section view for hydrophobic surfaces at different line spacing for 13 mW laser power. Furthermore, the formation of square crests at larger spacing can be a factor in the increase in hydrophobic surfaces.

Figure 5:
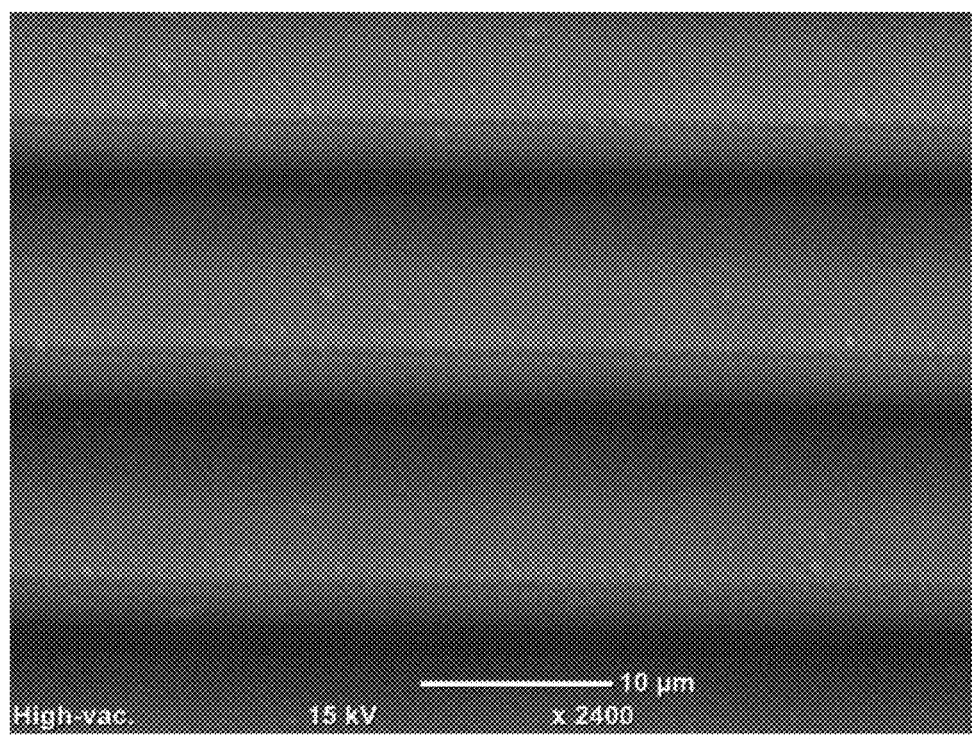
FIG. 5 illustrates a super-hydrophilic surface created on a substrate/film (e.g., PC), which shows crests and smooth surfaces produced by a nanosecond laser, according to some embodiments.

Hydrophilic surface morphology and wettability, according to some embodiments, is via surface modification by a nanosecond laser. In some embodiments, a nanosecond laser is used at a plurality of overlapped spacings (e.g., three (3)), which can generate similar or the same crests as that for hydrophobic surface modification. However, smoothness of ablated areas result using a nanosecond laser which occurs through a thermal degradation process. Therefore, heating caused by the nanosecond laser is sufficient to melt the polymer, which is followed by a re-flow of the melted material, leading to the smooth surface (see. FIG. 5).

Figure 6:
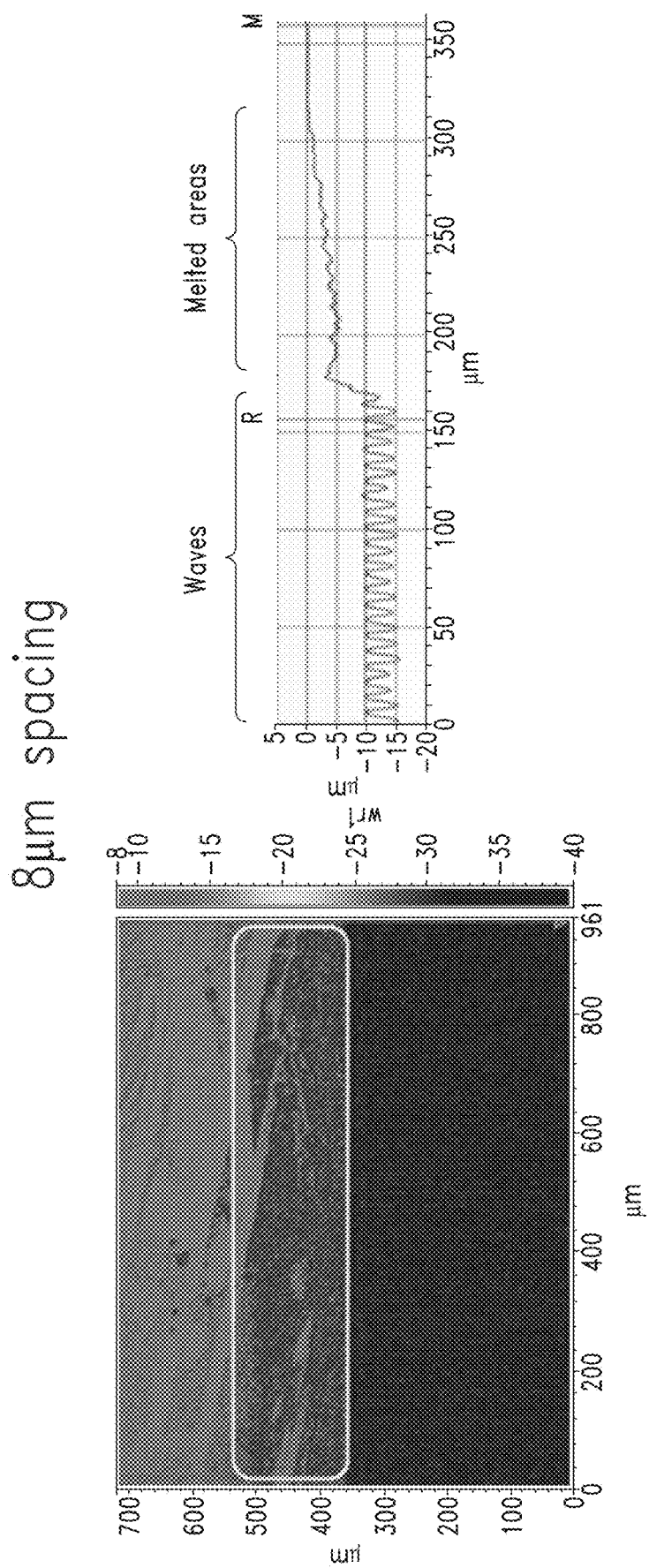
FIG. 6 illustrate optical profile measurements on top view and cross-section view for super-hydrophilic surfaces at different line spacing, where waves (or microchannels formed by ablation within the ablated area) and the melted area (white box) are also shown, according to some embodiments.
Figure 6:
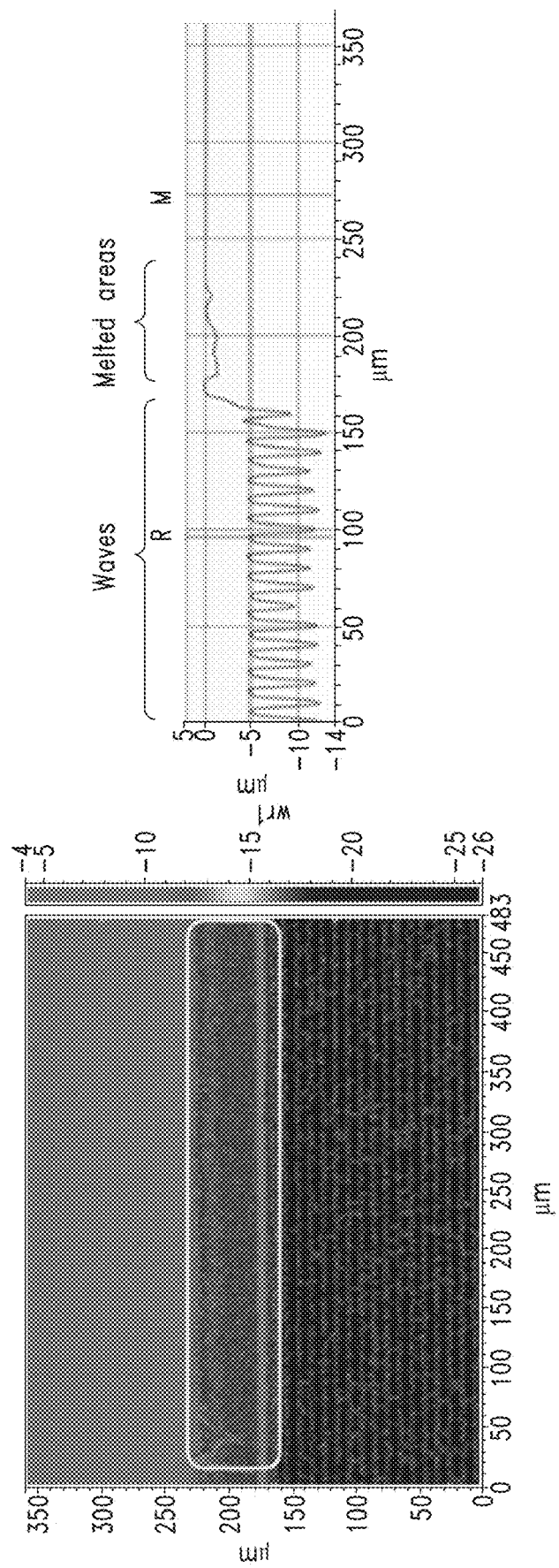
Figure 6:
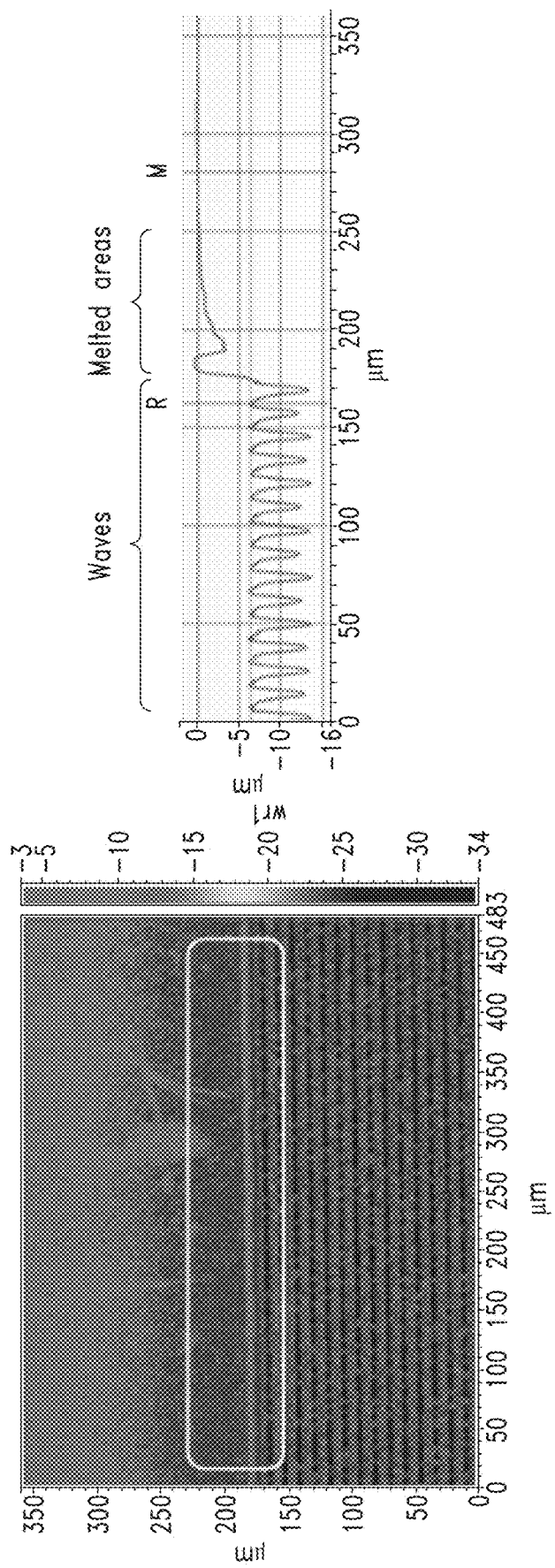

Other evidence of the heating and melting process is a deformation of borders of the ablated area due to heat transfer, which does not occur in the faster pulses when using femtosecond laser, and the heating influences the formation of smooth wave like structures, as opposed to that with the hydrophobic surfaces, where the crests were sharp and had square-like tops. In some embodiments, lower spacing ablation (8 μm) resulted in smaller wave patterns, due to melting, than that with larger spacing lines as illustrated in FIG. 6. FIG. 6 illustrates the optical profile measurements with respect to a top view and a cross-section view for super-hydrophilic surfaces at different line spacing. The waves (or microchannels formed by ablation within the whole ablated area) and the melted area (white box) are also shown. As shown, the wave top formed during ablation for 8, 10 and 12 μm spacings are 10.0±0.7, 5.5±0.8 and 6.0±1.0 μm, respectively, below the ablation surface, and the bottoms of the waves are at 15.0±1.0, 12.0±0.8 13.0±1.0 μm, respectively.

Figure 7:
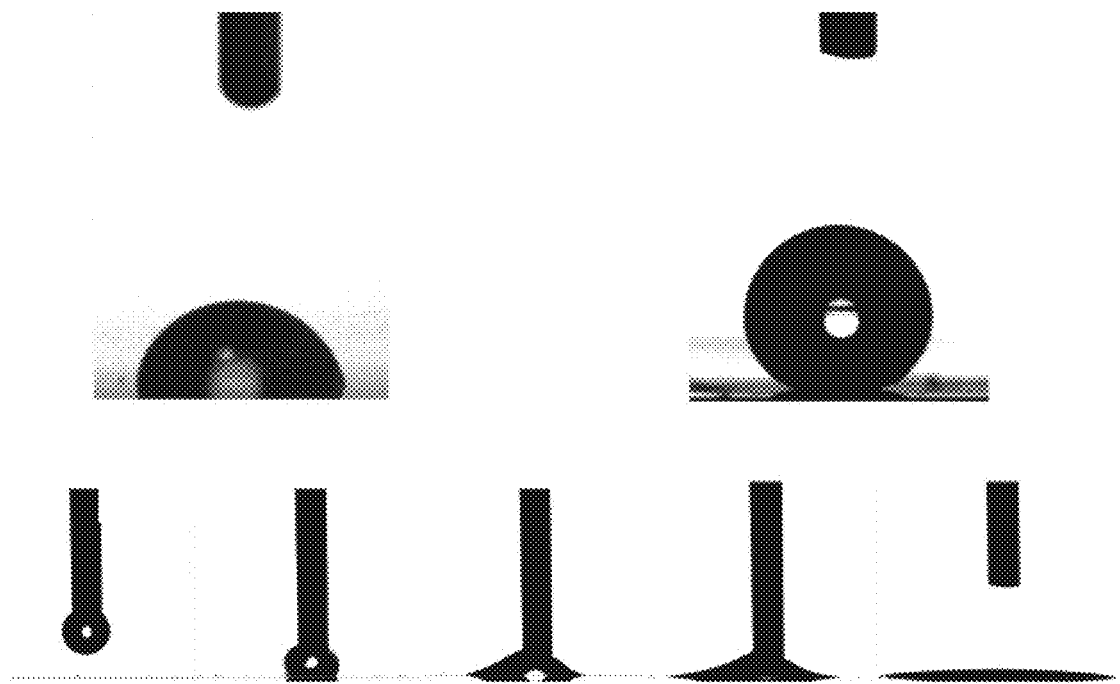
FIG. 7 illustrates, (top/left) a polymer (e.g., PC) unmodified surface (78.5 deg.), (top/right) a femtosecond laser modified surface (145 deg.), and (bottom) a nanosecond laser modified surface and its super-hydrophilic wetting behaviour, according to some embodiments.

Accordingly, in some embodiments, the grooves in the waves can lead to the formation of smooth open capillaries, which can be approximately 10 µm in width and 5.0, 6.5 and 7 µm in depth. The formation of these open micro-channels within the ablated area is, in some embodiments, a factor for creating a capillary force that pulls a liquid and results in a zero-contact angle of the sample. Therefore, such a surface corresponds to a super-hydrophilic surface. Using a goniometer to record a sequence of images at 100 ms interval, some of the results of which are shown in FIG. 7, which shows the hydrophilicity of the surface, as compared to a control and hydrophobic static contact angles. The top left of FIG. 7 shows a PC unmodified surface (78.5 deg.), the top-right showing a femtosecond laser modified surface (145 deg.), and the bottom showing a nanosecond laser modified surface and its hydrophilic wetting behaviour.

Figure 8:
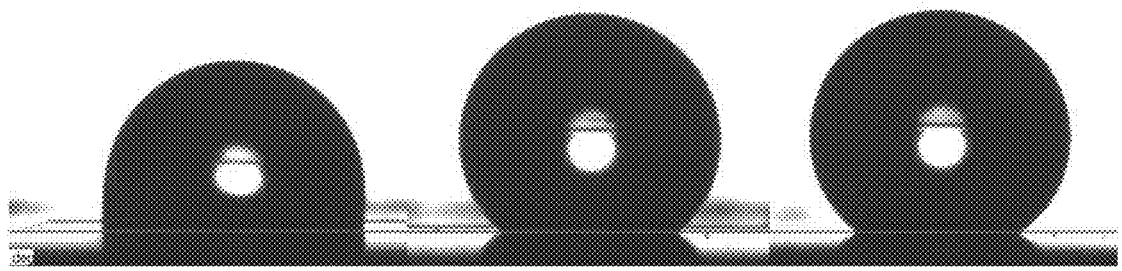
FIG. 8 illustrates, (left to right) an increase of hydrophobicity of the gold coated (blocked) super-hydrophilic surfaces created in a substrate (e.g., PC) according to 8, 10 and 12 µm line spacings, according to some embodiments.

Wettability of the ablated surface can verify the influence of the surface pattern relative to chemical modification through a possible insertion of chemical groups (hydrophobic or super-hydrophilic) that may affect the interaction in the solid-liquid interface. Accordingly, samples area coated with gold in order to hinder the hydrophilic effects due to the change in surface chemistry, turning the hydrophilic surface into hydrophobic. FIG. 8 shows, left to right, an increase of hydrophobicity of the gold coated (blocked) hydrophilic surfaces created in PC according to 8, 10 and 12 µm line spacings. The static contact angle for 8, 10 and 12 µm spacing samples were respectively 99.0±2.7, 127.7.0±3.1, 144±4.0°. Therefore, this increase in contact angle confirms that the hydrophilicity is due to the chemical change of the material. Furthermore, an airgap caused by the waves, induced a Cassie-state of wettability, where the air pockets, located within the waves crests, induce an increase in contact angle seen after the hydrophilic groups were covered by gold.

Figure 9:
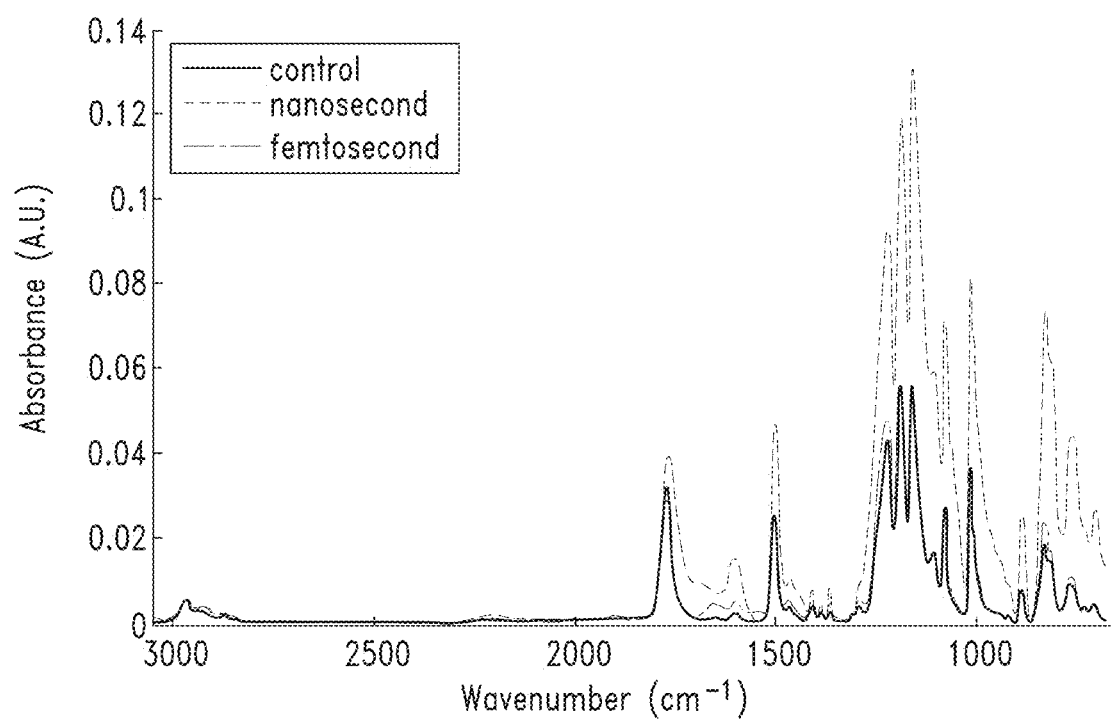
FIG. 9 illustrates the ATR-FTIR spectra of the three polymer (e.g., PC) surfaces, normalized to the same height for the CH 2996 cm-1 and overlaid for comparison, according to some embodiments.

For example, in some embodiments, hydrophobic and super-hydrophilic surfaces can include both morphological and chemical components. For example, an ATR-FTIR spectra of a PC sample before laser treatment and after nanosecond and femtosecond laser treatment was evaluated and the results of and it is shown in FIG. 9. The spectra were normalized to the same height for the 2966 $cm^{-1}$ (CH stretch mode for the methyl group) band to more easily visualize differences in the C—O and C=O groups, which are considered hydrophilic, caused by the different laser treatment effects. The main peaks in the spectra were the C—H stretch modes of methyl groups between 2800 to 3000 $cm^{-1}$, the sharp carbonyl stretch around 1770 $cm^{-1}$, the phenol ring stretch at 1501 $cm^{-1}$, the carbon-oxygen stretch (C(O)C) mode appearing as a broad band at 1220 $cm^{-1}$ and 1011 $cm^{-1}$. Smaller bands due to the C—H stretch modes of the phenol rings appear between 3100-3000 $cm^{-1}$, whilst the bands at 830 $cm^{-1}$ and 1880 $cm^{-1}$ were overtones and out-of-plane deformations of para-disubstituted phenol rings in the backbone of the PC.

The spectra differences in relative intensities, bandwidths and shifts were apparent in some of the bands. The changes indicated surface modification due to thermal degradation, particularly for the nanosecond-lasered surface. The use of the nanosecond treatment increased the relative intensities of the C=O and O(C)O stretch modes at respectively 1770 $cm^{-1}$ and 1218-1011 $cm^{-1}$, as well as red shifted bands and broader bands for the nanosecond laser treated samples. The same changes can also be observed for the deformation and twisting bonds for the chains ($CH_2$). This could be explained by greater thermal degradation of the PC structures resulting in scission of the polymer chains followed by branching, eventually leading to crosslinking and gelation or reflow of the surface material.

For the femtosecond treatment a slight broadening and increase in frequency and intensity can be observed in the CO stretch modes at 1221 $cm^{-1}$. Furthermore, a small broadening in these bands is indicative of a structural change due to a small thermal effect, but in considerably lower effects than the nanosecond treatment. In addition, a small increase in the C=C stretch mode for the aromatic ring. The changes to the femtosecond ablated surface are far fewer changes as the thermal damage by this technique is small.

Figure 10:
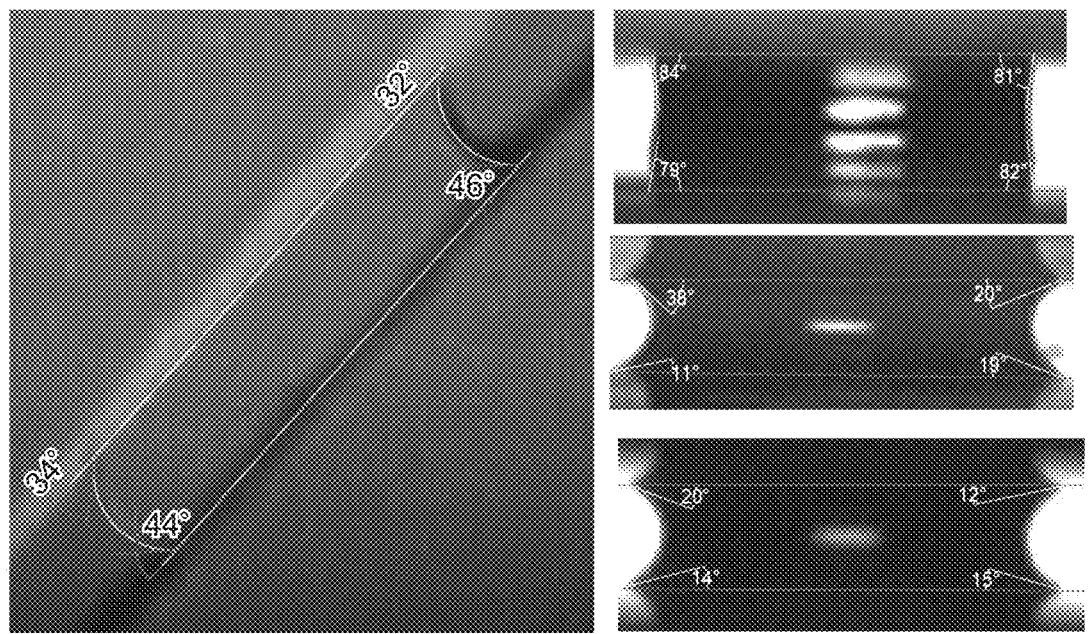
FIG. 10 illustrates (left) top view of the channel showing θh (right-top) control, (right-centre) (super)hydrophobic and (right-bottom) super-hydrophilic surfaces and their wettability inside of a microchannel, according to some embodiments.

Accordingly, the ability to have high fluid control in microchannels corresponds to the ability to miniaturize microfluidic circuits even further. For example, in centrifugal microfluidics, the fluid can be controlled using the forces derived from the disk spin, the capillary force due to the dimensions of the channels and wall wettability, as shown in FIG. 10, the left-view of a channel showing θh, the right-top view is a control, right-center showing hydrophobic, and right-bottom view showing hydrophilic surfaces and corresponding wettability inside of a microchannel. The behaviour of the fluid being compressed inside a micro channel demonstrates that the modified hydrophobic surface displays a Wenzel state; in other words, the droplets are in full contact with the rough surface. This is supported by the fluid behaviour in hydrophobic valves, which hold a water droplet even at the exit transition between the modified and unmodified surface. Therefore, the Wenzel state is supported by chemical and morphological analysis, as well as by the fluid behaviour inside of the microchannel. Investigation of a cross-view of the channels with the different surfaces show that hydrophobic and hydrophilic surfaces (top and bottom of channels) display similar wettability in a closed channel despite a complete difference in wettability on the open surface measurements.

An increase in wettability from both processed surfaces compared to control have different effects on the liquid droplet and allowed for different fluid manipulations. The hydrophobic valves show an increase in the necessary burst frequency from 648.5±49.6 to 817.6±35.4 rpm, leading to an experimental pressure increase, using:

$$P_{burst} = \rho \Delta R \overline{R} \left( \frac{\pi \cdot \omega}{30} \right)^2$$

The increase is from 349.07±55.11 to 490.49±42.10 Pa. Hence, an increase of approximately 29% in the pressure necessary to burst the hydrophobic valves compared to the control. The theoretical pressure is calculated using:

$$f_0(rpm) = \left( \omega \cdot \frac{30}{\pi} \right) = \frac{30}{\pi} \sqrt{\frac{2\sigma |w\cos\theta_h + h\cos\theta_w|}{hw\rho\Delta R \cdot \overline{R}}}$$

which uses the contact angles and channel dimensions to find the angular velocity then apply to the prior equation. The results, respectively: 351.74±24.76 and 487.83±19.66 Pa, for the control and hydrophobic valve (thus, agreeing with the experimental values). In some embodiments, fluid stoppage directly on the initial part of the patch and the picture of the inner channel, represents the stationary fluid.

Fluid movement behaviour in a super-hydrophilic surface according to some embodiments have different phases related to how the fluid moves through a laser modified area.

Figures 11, 12:
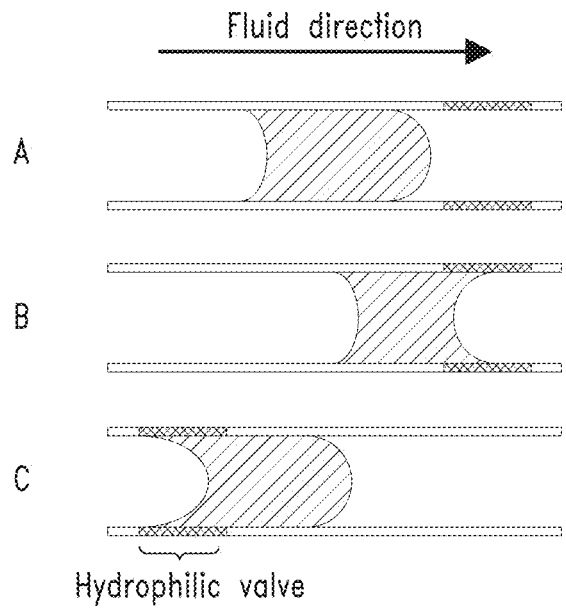
FIG. 11 illustrates three steps in a super-hydrophilic valve, according to some embodiments.
FIG. 12 illustrates a theoretical P calculated using channel parameters such as contact angles and dimensions, according to some embodiments.

A first part, comprising a "speed lane", which happens upon a droplet touching the modified surface. The high surface energy on a super-hydrophilic portion quickly pulls the droplet to the end of the super-hydrophilic portion until it touches an unmodified area. Thus, the pressure necessary to move the droplet decreases due to the high surface energy created by the associated chemical modification. As soon as the droplet touches the lower surface energy, unmodified area, the droplet requires more pressure to overcome the unmodified area. Therefore, behaving similarly to a hydrophobic valve. FIG. 11 illustrates these stages, specifically: (A) fluid is pushed towards the valve through the centrifugal force; (B) as soon as the fluid touches the valve it is quickly pulled to the end of the valve; and (C) once the meniscus passes through the valve, the hydrophilic valve works as valve (portion) holding the fluid and higher centrifugal force is needed to overcome the valve. It is worth noting that (C) is also seen for the hydrophobic surfaces indicating Wenzel state for the surface wettability.

The calculated pressure for the hydrophilic valve channels using the contract angles and channel dimensions was 222.86±19.70 Pa. The fluid entered the hydrophilic patch at 662.50±48.20 rpm which was approximately the same speed necessary to burst the control channel. However, as soon as the droplet meniscus overcame the valve, the fluid was held by the super-hydrophilic surface. The necessary speed to release the droplet from the valve was 802.50±39.14 rpm. Resulting in a difference of 140.0±29.43 rpm for the necessary burst frequency for overcome the surface modified area. Applying this difference and calculating the experimental burst pressure resulted in 212.55±34.87 Pa. A decrease of approximately 39% in the pressure required to move the droplet through the channel. The calculated burst pressure using the contact angle and dimension measurements, which resulted in 222.86±19.70 Pa. The results are summarized in the table shown in FIG. 12 in which a theoretical pressure P calculated using the channel parameters (e.g., contact angles and dimensions); the calculated pressure uses the acquired burst frequency.

Results indicate three (3) different possible uses of hydrophobic valves: (1) use to stop fluids during first sample insertion, which enables a more precise sample measurement; (2) the microfluidic circuits, including channels, can be reduced in size, with the capillary force increasing, and therefore, the valves can stop fluid leaking on a next set of chambers before a desired time. Accordingly, the solvent free modifications presented according to some embodiments of the present disclosure allow for a more secure timing for the addition of different samples or reagents coming from other chambers as the pressure necessary to burst the hydrophobic valve is considerably higher. The centrifugal force necessary to overcome a hydrophobic barrier with the same dimensions of one without these hydrophobic regions is higher. Therefore, allowing for a more precise timing.

Thus, the production of super-hydrophilic areas/portions (e.g., valves) in embodiments of the present disclosure demonstrate a similar valve result as the hydrophobic valves but via a different mechanism. Similarly, hydrophobic valves according to embodiments of the present disclosure also increased the burst pressure necessary to allow fluid movement by holding the fluid in the modified area.

As centrifugal microfluidic miniaturize even further, super-hydrophilic portions can be used to hold microdroplets in position, whilst applying a higher acceleration and deceleration (Euler force) and take advantage of mixing at micro or nano scales.

Moreover, hydrophilic valves according to some embodiments can be used as a platform to increase the speed of transfer of liquids from one chamber to another in one or more fluid circuits. Thus, and for example, in the case of having a channel and chamber covered with a super-hydrophilic surface according to some embodiments of the present disclosure, and a another without it, the modified channel and chamber can receive the liquid before a pressure threshold that is enough to have the fluid moving through unmodified surfaces is reached. Furthermore, the super-hydrophilic surfaces according to some embodiments of the disclosure can be used in open-air microfluidic circuits that require fluids to use capillary force, and, at the same time, requiring the fluid to be held by such capillaries.

While various inventive embodiments have been described and illustrated herein, those of ordinary skill in the art will readily envision a variety of other means, steps, and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant only to be examples and that actual parameters, dimensions, materials, and configurations will depend upon the specific application or applications for which the inventive teachings is/are used. Those skilled in the art will also recognize, or be able to ascertain using no more than routine experimentation, many equivalents to the specific inventive embodiments described herein. It is, therefore, to be understood that the foregoing disclosed embodiments are presented by way of example only and that, within the scope of claims supported by the present disclosure (including equivalents thereto), inventive embodiments may be practiced otherwise than as specifically described and claimed.

Some of the inventive embodiments of the present disclosure are directed to each individual feature, system, article, material, kit, method, and step, described herein. In addition, any combination of two or more such features, systems, articles, materials, kits, methods, and steps, if such features, systems, articles, materials, kits, methods, and steps, are not mutually inconsistent, is included within the inventive scope of the present disclosure. Some embodiments disclosed herein may also be combined with one or more features, as well as complete systems, devices or methods of other embodiments (as well as known systems, devices, or methods) to yield yet other embodiments and inventions. Moreover, some embodiments, may be distinguishable from the prior art by specifically lacking one and/or another feature disclosed in the particular prior art reference(s); i.e., claims to some embodiments may be distinguishable from the prior art by including one or more negative limitations.

Also, as shown above, various inventive concepts may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Any and all references to publications or other documents, including but not limited to, patents, patent applications, articles, webpages, books, etc., presented anywhere in the present application, are herein incorporated by reference in their entirety. Moreover, all definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The terms "can" and "may" are used interchangeably in the present disclosure, and indicate that the referred to element, component, structure, function, functionality, objective, advantage, operation, step, process, apparatus, system, device, result, or clarification, has the ability to be used, included, or produced, or otherwise stand for the proposition indicated in the statement for which the term is used (or referred to) for a particular embodiment(s).

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

REFERENCES

Olson, M. E., and Rosell, J. A. (2013) Vessel diameter-stem diameter scaling across woody angiosperms and the ecological causes of xylem vessel diameter variation. *New Phytol.* 197, 1204-1213.

Sarin, H. (2010) Physiologic upper limits of pore size of different blood capillary types and another perspective on the dual pore theory of microvascular permeability. *J. Angiogenes. Res.* 2.

Taggi, A. J., and Walker, P. (2000) Printing Processes, in *Kirk-Othmer Encyclopedia of Chemical Technology,* pp 171-206.

Whitesides, G. M. (2006) The origins and the future of microfluidics. Nature.

Streets, A. M., and Huang, Y. (2013) Chip in a lab: Microfluidics for next generation life science research. *Biomicrofluidics* 7.

Lin, B., Long, Z., Liu, X., and Qin, J. (2006) Recent advances of microfluidics in Mainland China. *Biotechnol. J.*

Takeuchi, M. N. and S. (2018) Bottom-up biofabrication using microfluidic techniques. *Biofabrication* 10, 44103.

He, T., Wang, C., Urisu, T., Nagahiro, T., Tero, R., and Xia, R. (2010) The PDMS-based microfluidic channel fabricated by synchrotron radiation stimulated etching. *Opt. Express* 18, 9733-9738.

Liparoti, S., Calaon, M., Speranza, V., Tosello, G., Pantani, R., Hansen, N. H., and Titomanlio, G. (2017) Effects of fast mold temperature evolution on micro features replication quality during injection molding, in AIP *Conference Proceedings.*

Zhang, Q., Zhang, M., Djeghlaf, L., Bataille, J., Gamby, J., Haghiri-Gosnet, A. M., and Pallandre, A. (2017) Logic digital fluidic in miniaturized functional devices: Perspective to the next generation of microfluidic lab-on-chips. *Electrophoresis.*

Silverio, V., and de Freitas, S. C. (2017) Microfabrication techniques for microfluidic devices, in *Complex Fluid-Flows in Microfluidics,* pp 25-51.

Martin, J. W., Nieuwoudt, M. K, Vargas, M. J. T., Bodley, O. L. C., Yohendiran, T. S., Oosterbeek, R. N., Williams, D. E., and Cather Simpson, M. (2017) Raman on a disc: high-quality Raman spectroscopy in an open channel on a centrifugal microfluidic disc. *Analyst* 142, 1682-1688.

Wu, J., Zheng, G., and Lee, L. M. (2012) Optical imaging techniques in microfluidics and their applications. *Lab Chip.*

Wang, T., Huang, X., Jia, Q., Yan, M., Yu, H., and Yeo, K. S. (2012) A super-resolution CMOS image sensor for bio-microfluidic imaging, in 2012 *IEEE Biomedical Circuits and Systems Conference: Intelligent Biomedical*

Electronics and Systems for Better Life and Better Environment. *BioCAS 2012—Conference Publications*, pp 388-391.

Bi, H., Duarte, C. M., Brito, M., Vilas-Boas, V., Cardoso, S., and Freitas, P. (2016) Performance enhanced UV/vis spectroscopic microfluidic sensor for ascorbic acid quantification in human blood. *Biosens. Bioelectron.* 85, 568-572.

Zimmerman, W. B. (2011) Electrochemical microfluidics. *Chem. Eng. Sci.* 66, 1412-1425.

Yao, M., Shah, G., and Fang, J. (2012) Highly sensitive and miniaturized fluorescence detection system with an autonomous capillary fluid manipulation chip. *Micromachines* 3, 462-479.

Wheeler, G. (2014) The significance of dairy to the New Zealand economy. *Reserv. Bank New Zeal.*

Federation, I. D. (2013) The economic importance of dairying. *IDF Factsheet.*

Organisation for Economic Co-operation and Development., and Food and Agriculture Organization of the United Nations. (2014) OECD-FAO agricultural outlook. OECD Pub. and the Food and Agriculture Organization of the United Nations, Paris.

Dransfield, M. B., Nebel, R. L., Pearson, R. E., and Warnick, L. D. (1998) Timing of insemination for dairy cows identified in estrus by a radiotelemetric estrus detection system. *J. Dairy Sci.* 81, 1874-1882.

Dobson, H., Walker, S. L., Morris, M. J., Routly, J. E., and Smith, R. F. (2008) Why is it getting more difficult to successfully artificially inseminate dairy cows? *animal.*

Pohler, K. G., Green, J. A., Geary, T. W., Peres, R. F. G., Pereira, M. H. C., Vasconcelos, J. L. M., and Smith, M. F. (2015) Predicting Embryo Presence and Viability, in *Regulation of Implantation and Establishment of Pregnancy in Mammals* (Geisert, R. D., and Bazer, F. W., Eds.), pp 253-270. Springer International Publishing.

Pandey, C. M., Augustine, S., Kumar, S., Kumar, S., Nara, S., Srivastava, S., and Malhotra, B. D. (2018) Microfluidics Based Point-of-Care Diagnostics. *Biotechnol. J.*

Zhao, B., Cui, X., Ren, W., Xu, F., Liu, M., and Ye, Z. G. (2017) A Controllable and Integrated Pump-enabled Microfluidic Chip and Its Application in Droplets Generating. *Sci. Rep.* 7.

Zhang, J., Yan, S., Yuan, D., Alici, G., Nguyen, N. T., Ebrahimi Warkiani, M., and Li, W. (2016) Fundamentals and applications of inertial microfluidics: A review. *Lab Chip.*

Zhang, J., Yan, S., Sluyter, R., Li, W., Alici, G., and Nguyen, N. T. (2014) Inertial particle separation by differential equilibrium positions in a symmetrical serpentine microchannel. *Sci. Rep.* 4.

Wu, L., Guan, G., Hou, H. W., Bhagat, A. A. S., and Han, J. (2012) Separation of leukocytes from blood using spiral channel with trapezoid cross-section. *Anal. Chem.* 84, 9324-9331.

Dudani, J. S., Gossett, D. R., Tse, H. T. K., Lamm, R. J., Kulkarni, R. P., and Carlo, D. Di. (2015) Rapid inertial solution exchange for enrichment and flow cytometric detection of microvesicles. *Biomicrofluidics* 9.

Minh Pham, N., Karlen, W., Beck, H., and Delamarche, E. (2018) Malaria and the "last" parasite: how can technology help? *Malar. and the "last" parasite how can Technol. Help.*

Lisowski, P., and Zarzycki, P. K. (2013) Microfluidic Paper-Based Analytical Devices (pPADs) and Micro Total Analysis Systems (µTAS): Development, Applications and Future Trends. *Chromatographia* 76, 1201-1214.

Smith, S., Moodley, K., Govender, U., Chen, H., Fourie, L., Ngwenya, S., Kumar, S., Mjwana, P., Cele, H., Mbanjwa, M. B., Potgieter, S., Joubert, T.-H., and Land, K. (2015) Paper-based smart microfluidics for education and low-cost diagnostics. *S. Afr. J. Sci. Volume* 111, 1-10.

Freire, S. L. S. (2016) Perspectives on digital microfluidics. *Sensors Actuators. A Phys.*

Jebrail, M. J., Ng, A. H. C., Rai, V., Hili, R., Yudin, A. K., and Wheeler, A. R. (2010) Synchronized synthesis of peptide-based macrocycles by digital microfluidics. *Angew. Chem. Int. Ed. Engl.* 49, 8625-9.

Martin, J. G., Gupta, M., Xu, Y., Akella, S., Liu, J., Dordick, J. S., and Linhardt, R. J. (2009) Toward an artificial Golgi: Redesigning the biological activities of heparan sulfate on a digital microfluidic chip. *J. Am. Chem. Soc.* 131, 11041-11048.

Sista, R., Hua, Z., Thwar, P., Sudarsan, A., Srinivasan, V., Eckhardt, A., Pollack, M., and Pamula, V. (2008) Development of a digital microfluidic platform for point of care testing. *Lab Chip* 8, 2091-2104.

Lee, A. P. (2004) Digital microfluidics for bioassays and drug delivery, in *Engineering in Medicine and Biology Society.* 2004. *IEMBS '04. 26th Annual International Conference of the IEEE*, p 5392.

Kirby, A. E., and Wheeler, A. R. (2013) Digital microfluidics: An emerging sample preparation platform for mass spectrometry. *Anal. Chem.* 85, 6178-6184.

Koh, C. Y., Schaff, U. Y., Piccini, M. E., Stanker, L. H., Cheng, L. W., Ravichandran, E., Singh, B. R., Sommer, G. J., and Singh, A. K. (2015) Centrifugal microfluidic platform for ultrasensitive detection of botulinum toxin. *Anal. Chem.*

Yeo, J. C., Wang, Z., and Lim, C. T. (2015) Microfluidic size separation of cells and particles using a swinging bucket centrifuge. *Biomicrofluidics.*

Siegrist, J., Gorkin, R., Clime, L., Roy, E., Peytavi, R., Kido, H., Bergeron, M., Veres, T., and Madou, M. (2010) Serial siphon valving for centrifugal microfluidic platforms. *Microfluid. Nanofluidics* 9, 55-63.

Gilmore, J., Islam, M., and Martinez-Duarte, R. (2016) Challenges in the use of compact disc-based centrifugal microfluidics for healthcare diagnostics at the extreme point of care. *Micromachines.*

Amasia, M., and Madou, M. (2010) Large-volume centrifugal microfluidic device for blood plasma separation. *Bioanalysis* 2, 1701-1710.

Chen, Q.-L., Ho, H.-P., Cheung, K.-L., Kong, S.-K., Suen, Y.-K., Kwan, Y.-W., Li, W.-J., and Wong, C.-K. (2010) A fluorescence-based centrifugal microfluidic system for parallel detection of multiple allergens. *Proc. SPIE* 7565, 75650F/1-75650F/7.

Thompson, A., Boland, M., and Singh, H. (2009) Milk proteins: from expression to food. *Milk Proteins, from Expr. to Food.*

Wong, N. P., Jenness, R., Keeney, M., and Marth, E. H. (1999) Fundamentals of Dairy Chemistry. *Fundam. dairy Chem.* 767.

(1997) CHAPTER 1: Properties of Milk and Its Components, in *Dairy-Based Ingredients*, pp 1-10. American Association of Cereal Chemists.

Argov, N., Lemay, D. G., and German, J. B. (2008) Milk fat globule structure and function: nanoscience comes to milk production. *Trends Food Sci. Technol.*

Diagnostics, E., Diagnostics, E., Center, B. N., Center, B. N., Sensor, B., Sensor, B., Center, A., and Center, A. (2008)

Microfluidic cd-based somatic cell counter for the early detection of bovine mastitis. *Image (Rochester. N. Y.)* 1762-1764.

Kido, H., Micic, M., Smith, D., Zoval, J., Norton, J., and Madou, M. (2007) A novel, compact disk-like centrifugal microfluidics system for cell lysis and sample homogenization. *Colloids Surfaces B Biointerfaces* 58, 44-51.

Kirby, D., Siegrist, J., Kijanka, G., Zavattoni, L., Sheils, O., O'Leary, J., Burger, R., and Ducrée, J. (2012) Centrifugo-magnetophoretic particle separation. *Microfluid. Nanofluidics* 13, 899-908.

Kuo, J. N., and Chen, X. F. (2015) Plasma separation and preparation on centrifugal microfluidic disk for blood assays. *Microsyst. Technol.* 21, 2485-2494.

Gordon, M. H. (2003) FATS|Occurrence (Caballero, B. B. T.-E. of F. S. and N. (Second E., Ed.), pp 2293-2296. Academic Press, Oxford.

Sichien, M., Thienpont, N., Fredrick, E., Trung Le, T., Van Camp, J., and Dewettinck, K. (2009) Processing means for milk fat fractionation and production of functional compounds, in *Dairy-Derived Ingredients: Food and Nutraceutical Uses*, pp 68-102.

Truong, T., Palmer, M., Bansal, N., and Bhandari, B. (2016) Effect of Milk Fat Globule Size on Functionalities and Sensory Qualities of Dairy Products, in *Effect of Milk Fat Globule Size on the Physical Functionality of Dairy Products*, pp 47-67. Springer International Publishing, Cham.

Haug, A., Hostmark, A. T., and Harstad, O. M. (2007) Bovine milk in human nutrition—a review. *Lipids Health Dis.* 6, 25.

Grażyna, C., Hanna, C., Adam, A., and Magdalena, B. M. (2017) Natural antioxidants in milk and dairy products. *Int. J. Dairy Technol.*

Sweetman, A. J., Thomas, G. O., and Jones, K. C. (1999) Modelling the fate and behaviour of lipophilic organic contaminants in lactating dairy cows. *Environ. Pollut.* 104, 261-270.

Meisterling, E. M., and Dailey, R. a. (1987) Use of concentrations of progesterone and estradiol-17 beta in milk in monitoring postpartum ovarian function in dairy cows. *J. Dairy Sci.* 70, 2154-2161.

Nielsen, S. S. (1959) Food Analysis. chapter 8: Fat Analysis pp 119-132. *Nature*.

Allen, A. H., and Chattaway, W. (1886) Suggestions for the more ready employment of Adams' method of determining fat in milk. *Analyst* 11, 71-73.

Bloor, W. R. (1914) A method for the determination of fat in milk (nephelometric method). *J. Am. Chem. Soc.* 36, 1300-1304.

Lynch, J. M., Barbano, D. M., and Fleming, J. R. (1996) Comparison of Babcock and Ether Extraction Methods for Determination of Fat Content of Cream: Collaborative Study. *J. AOAC Int.* 79, 907-916.

Forcato, D. O., Carmine, M. P., Echeverria, G. E., Pdcora, R. P., and Kivatinitz, S. C. (2005) Milk fat content measurement by a simple UV spectrophotometric method: an alternative screening method. *J. Dairy Sci.* 88, 478-481.

Aernouts, B., Polshin, E., Lammertyn, J., and Saeys, W. (2011) Visible and near-infrared spectroscopic analysis of raw milk for cow health monitoring: Reflectance or transmittance? *J. Dairy Sci.* 94, 5315-5329.

El-Abassy, R. M., Eravuchira, P. J., Donfack, P., von der Kammer, B., and Matemy, A. (2011) Fast determination of milk fat content using Raman spectroscopy. *Vib. Spectrosc.* 56, 3-8.

Zhu, X., Guo, W., Liu, D., and Kang, F. (2018) Determining the Fat Concentration of Fresh Raw Cow Milk Using Dielectric Spectroscopy Combined with Chemometrics. *Food Anal. Methods* 11, 1528-1537.

Mendes, T. O., Junqueira, G. M. A., Porto, B. L. S., Brito, C. D., Sato, F., de Oliveira, M. A. L., Anjos, V., and Bell, M. J. V. (2016) Vibrational spectroscopy for milk fat quantification: line shape analysis of the Raman and infrared spectra. *J. Raman Spectrosc.* 47.

Xu, W., Bai, J., Peng, J., Samanta, A., Divyanshu, and Chang, Y. T. (2014) Milk quality control: Instant and quantitative milk fat determination with a BODIPY sensor-based fluorescence detector. *Chem. Commun.* 50, 10398-10401.

Yoshinaga, K., Nagai, T., Mizobe, H., Kojima, K., and Gotoh N. (2013) Simple method for the quantification of milk fat content in foods by LC-APCI-MS/MS using 1,2-dipalmitoyl-3-butyroyl-glycerol as an indicator. *J. Oleo Sci.* 62, 115-121., Garcia-Cordero, J. L., Barrett, L. M., O'Kennedy, R., and Ricco, A. J. (2010) Microfluidic sedimentation cytometer for milk quality and bovine mastitis monitoring. *Biomed. Microdevices* 12, 1051-1059.

Stevenson, J. S., and Pulley, S. L. (2016) Feedback effects of estradiol and progesterone on ovulation and fertility of dairy cows after gonadotropin-releasing hormone-induced release of luteinizing hormone 1. *J. Dairy Sci.* 99, 3003-3015.

Malekinejad, H., and Rezabakhsh, A. (2015) Hormones in Dairy Foods and Their Impact on Public Health—A Narrative Review Article. *Iran. J. Public Health* 44, 742-58.

Rioux, P., and Rajotte, D. (2004) Progesterone in milk: a simple experiment illustrating the estrous cycle and enzyme immunoassay. *Adv. Physiol. Educ.* 28, 64-67.

Colazo, M. G., Ambrose, D. J., Kastelic, J. P., and Small, J. A. (2008) Comparison of 2 enzyme immunoassays and a radioimmunoassay for measurement of progesterone concentrations in bovine plasma, skim milk, and whole milk. *Can J Vet Res* 72, 32-36.

Heap, R. B., Henville, A., and Linzell, J. L. (1975) Metabolic clearance rate, production rate, and mammary uptake and metabolism of progesterone in cows. *J. Endocrinol.* 66, 239-247.

Shrivastav, T. G., Chaube, S. K., Charu, Rangari, K., Kariya, K. P., Singh, R., and Nagendra, A. (2010) Enzyme linked immunosorbent assay for milk progesterone. *J. Immunoassay Immunochem.* 31, 301-13.

Waldmann, A., Ropstad, E., Landsverk, K., Sorensen, K., Solverod, L., and Dahl, E. (1999) Level and distribution of progesterone in bovine milk in relation to storage in the mammary gland. *Anim. Reprod. Sci.* 56, 79-91.

Pennington, J. A., Spahr, S. L., and Lodge, J. R. (1981) Influences on Progesterone Concentration in Bovine Milk. *J. Dairy Sci.* 64, 259-266.

Vukovic, D., Bozic, A., Relic, R., Stancic, B., Gvozdic, D., and Kucevic, D. (2016) Progesterone concentration in milk and blood serum and reproductive efficiency of cows after Ovsynch treatment. *Turkish J. Vet. Anim. Sci.* 40, 75-80.

Narendran, R., Hacker, R. R., Smith, V. G., and Lun, a. (1979) Estrogen and progesterone concentrations in bovine milk during the estrous cycle. *Theriogenology* 12, 19-25.

Claudia Machinski Rangel de Abreu, A., Maciel Busato, E., Bergstein-Galan, T., Bertol, M., and Romualdo Weiss, R. (2018) Chapter 2—Bovine Reproductive Physiology and Endocrinology.

Oku, Y., Osawa, T., Hirata, T. I., Kon, N., Akasaka, S., Senosy, W. S., Takahashi, T., and Izaike, Y. (2011) Validation of a direct time-resolved fluoroimmunoassay for progesterone in milk from dairy and beef cows. *Vet. J.* 190, 244-248.

Trapiella-Alfonso, L., Costa-Feminded, J. M., Pereiro, R., and Sanz-Medel, A. (2011) Development of a quantum dot-based fluorescent immunoassay for progesterone determination in bovine milk. *Biosens. Bioelectron.* 26, 4753-4759.

Claycomb, R. W., Delwiche, M. J., Munro, C. J., and Bondurant, R. H. (1998) Rapid enzyme immunoassay for measurement of bovine progesterone. *Biosens. Bioelectron.* 13, 1165-1171.

Byszewska-Szpocinska, E., and Markiewicz, A. (2006) New RIA kit for the determination of progesterone in cows' milk. *J. Immunoass. Immunochem.* 27, 279-288.

Samsonova, J. V, Safronova, V. A., and Osipov, A. P. (2015) Pretreatment-free lateral flow enzyme immunoassay for progesterone detection in whole cows' milk. *Talanta* 132, 685-689.

Tulsidas, G. S., Shail, K. C., Charu, Kiran, R., Kiran, P. K., Rita, S., and Anjali, N. (2010) ENZYME LINKED IMMUNOSORBENT ASSAY FOR MILK PROGESTERONE. *J. Immunoass. Immunochem.* 31, 301-313.

Carralero, V., González-Cortés, A., Yidez-Sedefio, P., and Pingarrón, J. M. (2007) Development of a Progesterone Immunosensor Based on a Colloidal Gold-Graphite-Teflon Composite Electrode. *Electroanalysis* 19, 853-858.

Gorkin, R., Park, J., Siegrist, J., Amasia, M., Lee, B. S., Park, J.-M., Kim, J., Kim, H., Madou, M., and Cho, Y.-K. (2010) Centrifugal microfluidics for biomedical applications. *Lab Chip* 10, 1758-1773.

Nolte, D. D. (2009) Invited Review Article: Review of centrifugal microfluidic and bio-optical disks. *Rev. Sci. Instrum.* 80, 101101.

Strohmeier, O., Keller, M., Schwemmer, F., Zehnle, S., Mark, D., von Stetten, F., Zengerle, R., and Paust, N. (2015) Centrifugal microfluidic platforms: advanced unit operations and applications. *Chem. Soc. Rev.* 44, 6187-6229.

Espulgar, W., Aoki, W., Ikeuchi, T., Mita, D., Saito, M., Lee, J. K., and Tamiya, E. (2015) Centrifugal microfluidic platform for single-cell level cardiomyocyte-based drug profiling and screening. *Lab Chip* 15, 3572-3580.

Koh, C. Y., Schaff, U. Y., Piccini, M. E., Stanker, L. H., Cheng, L. W., Ravichandran, E., Singh, B. R., Sommer, G. J., and Singh, A. K. (2015) Centrifugal microfluidic platform for ultrasensitive detection of botulinum toxin. *Anal. Chem.* 87, 922-928.

Zhang, L., Tian, F., Liu, C., Feng, Q., Ma, T., Zhao, Z., Li, T., Jiang, X., and Sun, J. (2018) Hand-powered centrifugal microfluidic platform inspired by the spinning top for sample-to-answer diagnostics of nucleic acids. *Lab Chip* 18, 610-619.

Park, Y.-S., Sunkara, V., Kim, Y., Lee, W. S., Han, J.-R., and Cho, Y.-K. (2016) Fully automated centrifugal microfluidic device for ultrasensitive protein detection from whole blood. *J. Vis. Exp.* 2016, 1-7.

Czilwik, G., Messinger, T., Strohmeier, O., Wadle, S., Von Stetten, F., Paust, N., Roth, G., Zengerle, R., Saarinen, P., Niittymaki, J., McAllister, K., Sheils, O., O'Leary, J., and Mark, D. (2015) Rapid and fully automated bacterial pathogen detection on a centrifugal-microfluidic LabDisk using highly sensitive nested PCR with integrated sample preparation. *Lab Chip* 15, 3749-3759.

Balter, M. L., Chen, A. I., Colinco, C. A., Gorshkov, A., Bixon, B., Martin, V., Fromholtz, A., Maguire, T. J., and Yarmush, M. L. (2016) Differential leukocyte counting: Via fluorescent detection and image processing on a centrifugal microfluidic platform. *Anal. Methods* 8.

Ren, Y., and Leung, W. W. F. (2016) Numerical investigation of cell encapsulation for multiplexing diagnostic assays using novel centrifugal microfluidic emulsification and separation platform. *Micromachines* 7.

Morijiri, T., Yamada, M., Hikida, T., and Seki, M. (2013) Microfluidic counterflow centrifugal elutriation system for sedimentation-based cell separation. *Microfluid. Nanofluidics* 14, 1049-1057.

Moen, S. T., Hatcher, C. L., and Singh, A. K. (2016) A centrifugal microfluidic platform that separates whole blood samples into multiple removable fractions due to several discrete but continuous density gradient sections. *PLoS One* 11.

Park, J., Lee, G.-H., Park, J. Y., Lee, J. C., and Kim, H. C. (2016) A numerical study of the Coriolis effect in centrifugal microfluidics with different channel arrangements. *Microfluid. Nanofluidics* 20, 65.

Brenner, T., Glatzel, T., Zengerle, R., and Ducrée, J. (2005) Frequency-dependent transversal flow control in centrifugal microfluidics. *Lab Chip S,* 146-150.

Noroozi, Z., Kido, H., Micic, M., Pan, H., Bartolome, C., Princevac, M., Zoval, J., and Madou, M. (2009) Reciprocating flow-based centrifugal microfluidics mixer. *Rev. Sci. Instrum.* 80, 75102.

Sharma, V., Park, K., and Srinivasarao, M. (2009) Shape separation of gold nanorods using centrifugation 106, 4981-4985.

Russel, W. B., Saville, D. A., and Schowalter, W. R. (1991) Colloidal Dispersions. *Colloid. Dispersions.*

Sharma, V., Park, K., and Srinivasarao, M. (2009) Shape separation of gold nanorods using centrifugation. *Proc. Natl. Acad. Sci. U.S.A* 106, 4981-4985.

Richardson, J. F., and Zaki, W. N. (1997) Sedimentation and fluidisation: Part I. *Chem. Eng. Res. Des.* 75, S82-S100.

Rowe, P. N. (1987) A convenient empirical equation for estimation of the Richardson-Zaki exponent. *Chem. Eng. Sci.* 42, 2795-2796.

Martin, J., Rakotomalala, N., and Salin, D. (1995) Accurate determination of the sedimentation flux of concentrated suspensions. *Phys. Fluids* 7, 2510-2512.

Philipse, A. P. (1997) Colloidal sedimentation (and filtration). *Curr. Opin. Colloid Interface Sci.* 2, 200-206.

Lu, C., Xie, Y., Yang, Y., Cheng, M. M. C., Koh, C. G., Bai, Y., Lee, L. J., and Juang, Y. J. (2007) New valve and bonding designs for microfluidic biochips containing proteins. *Anal. Chem.* 79, 994-1001.

Madou, M. J., Lee, L. J., Daunert, S., Lai, S., and Shih, C.-H. (2001) Design and fabrication of CD-like microfluidic platforms for diagnostics: microfluidic functions. *Biomed. Microdevices* 3, 245-254.

Ouyang, Y., Wang, S., Li, J., Riehl, P. S., and Landers, P. (2013) Rapid patterning of "tunable" hydrophobic valves on disposable microchips by laser printer lithography. *Lab Chip* 13, 1762-1771.

Ouyang, Y., Wang, S., Li, J., and Riehl, P. (2013) Rapid patterning of "tunable" hydrophobic valves on disposable microchips by laser printer lithography. *Lab Chip* 13, 1762-71.

Coons, A. H., Creech, H. J., and Jones, R. N. (1941) Immunological Properties of an Antibody Containing a Fluorescent Group. *Exp. Biol. Med.*

Aydin, S. (2015) A short history, principles, and types of ELISA, and our laboratory experience with peptide/protein analyses using ELISA. *Peptides* 72, 4-15.

Bale, M. D., Danielson, S. J., Daiss, J. L., Goppert, K. E., and Sutton, R. C. (1989) Influence of copolymer composition on protein adsorption and structural rearrangements at the polymer surface. *J. Colloid Interface Sci.* 132, 176-187.

Engvall, E. (1980) [28] Enzyme Immunoassay ELISA and EMIT. *Methods Enzymol.*

Rubenstein, K. E., Schneider, R. S., and Ullman, E. F. (1972) "Homogeneous" enzyme immunoassay. A new immunochemical technique. *Biochem. Biophys. Res. Commun.*

O'Beime, A. J., and Cooper, H. R. (1979) Heterogeneous enzyme immunoassay. *J. Histochem. Cytochem.*

Lin, A. V. (2015) Direct ELISA, in *ELISA: Methods and Protocols* (Hnasko, R., Ed.), pp 61-67. Springer New York, New York, N.Y.

Lin, A. V. (2015) Indirect ELISA, in *ELISA: Methods and Protocols* (Hnasko, R., Ed.), pp 51-59. Springer New York, New York, N.Y.

Yi, X., Liu, R., Lou, X., and Xia, F. (2018) Colorimetric Sandwich Assays for Protein Detection, in *Biosensors Based on Sandwich Assays* (Xia, F., Zhang, X., Lou, X., and Yuan, Q., Eds.), pp 15-27. Springer Singapore, Singapore.

Huang, F., and Xia, F. (2018) Fluorescence Sandwich Assays for Protein Detection, in *Biosensors Based on Sandwich Assays* (Xia, F., Zhang, X., Lou, X., and Yuan, Q., Eds.), pp 29-45. Springer Singapore, Singapore.

Samsonova, J. V., Safronova, V. A., and Osipov, A. P. (2015) Pretreatment-free lateral flow enzyme immunoassay for progesterone detection in whole cows' milk. *Talanta* 132, 685-689.

Wu, L., Xu, C., Xia, C., Duan, Y., Xu, C., Zhang, H., and Bao, J. (2014) Development and Application of an ELISA Kit for the Detection of Milk Progesterone in Dairy Cows. *Monoclon. Antib. Immunodiagn. Immunother.* 33, 330-333.

Simersky, R., Swaczynova, J., Morris, D. A., Franek, M., and Stmad, M. (2007) Development of an ELISA-based kit for the on-farm determination of progesterone in milk. *Vet. Med. (Praha).* 52, 19-28.

Rajamahendran, R., Keeling, B. J., Robinson, J., and Ravindran, V. (1990) The use of rapid on-farm milk progesterone tests as an aid to reproductive management in dairy-cattle. *Can. J. Anim. Sci.* 70, 997-1003.

Moreira Gabriel, E. Flivia, Tomazelli Coltro, W. K. arlos, and Garcia, C. D. (2014) Fast and versatile fabrication of PMMA microchip electrophoretic devices by laser engraving. *Electrophoresis* 35, 2325-2332.

Chin, C. D., Linder, V., and Sia, S. K. (2012) Commercialization of microfluidic point-of-care diagnostic devices. *Lab Chip* 12, 2118.

Chen, Y., Zhang, L., and Chen, G. (2008) Fabrication, modification, and application of poly(methyl methacrylate) microfluidic chips. *Electrophoresis.*

Urech, L., and Lippert, T. (2010) Photoablation of Polymer Materials, in *Photochemistry and Photophysics of Polymer Materials*, pp 541-568. John Wiley & Sons, Inc.

Zhu, X., Liu, G., Guo, Y., and Tian, Y. (2007) Study of PMMA thermal bonding. *Microsyst. Technol.* 13, 403-407.

Nikcevic, I., Lee, S. H., Piruska, A., Ahn, C. H., Ridgway, T. H., Limbach, P. A., Wehmeyer, K. R., Heineman, W. R., and Seliskar, C. J. (2007) Characterization and performance of injection molded poly(methylmethacrylate) microchips for capillary electrophoresis. *J. Chromatogr. A* 1154, 444-453.

Chen, Z., Gao, Y., Su, R., Li, C., and Lin, J. (2003) Fabrication and characterization of poly(methyl methacrylate) microchannels by in situ polymerization with a novel metal template. *Electrophoresis* 24, 3246-3252.

Li, S. W., Xu, J. H., Wang, Y. J., Lu, Y. C., and Luo, G. S. (2008) Low-temperature bonding of poly-(methyl methacrylate) microfluidic devices under an ultrasonic field. *J. Micromechanics Microengineering* 19, 015035.

Lin, L. (2003) Thermal challenges in MEMS applications: Phase change phenomena and thermal bonding processes, in *Microelectronics Journal*, pp 179-185.

Ogończyk, D., Wegrzyn, J., Jankowski, P., Dabrowski, B., and Garstecki, P. (2010) Bonding of microfluidic devices fabricated in polycarbonate. *Lab Chip* 10, 1324-1327.

Gómez-de Pedro, S., Berenguel-Alonso, M., Couceiro, P., Alonso-Chamarro, J., and Puyol, M. (2017) Automatic microfluidic system to perform multi-step magneto-biochemical assays. *Sensors Actuators. B Chem.* 245, 477-483.

Lefèvre, F., Juneau, P., and Izquierdo, R. (2015) Integration of fluorescence sensors using organic optoelectronic components for microfluidic platform. *Sensors Actuators. B Chem.* 221, 1314-1320.

Said-Galiev, É. E., and Nikitin, L. N. (1992) Ablation of polymers and composites when exposed to CO2 laser radiation (review). *Mech. Compos. Mater.* 28, 97-114.

Brydson, J. (1999) 5.3 Polymer Solubility. *Plast. Mater.* (7th Ed. Elsevier.

Miller-Chou, B. A., and Koenig, J. L. (2003) A review of polymer dissolution. *Prog. Polym. Sci.*

Hansen, C. M. (2000) Solubility Parameters—An Introduction, in *Hansen Solubility Parameters: A User's Handbook*, pp 1-24.

Ogilvie, I. R. G., Sieben, V. J., Floquet, C. F. a, Zmijan, R., Mowlem, M. C., and Morgan, H. (2010) Solvent processing of PMMA and COC chips for bonding devices with optical quality surfaces. 14th *Int. Conf Miniaturized Syst. Chem. Life Sci.* 1244-1246.

Steigert, J., Haeberle, S., Brenner, T., Müller, C., Steinert, C. P., Koltay, P., Gottschlich, N., Reinecke, H., Rilhe, J., Zengerle, R., and Ducrée, J. (2007) Rapid prototyping of microfluidic chips in COC. *J. Micromechanics Microengineering* 17, 333-341.

Tsao, C. W., and DeVoe, D. L. (2009) Bonding of thermoplastic polymer microfluidics. *Microfluid. Nanofluidics.*

Ng, S. H., Tjeung, R. T., Wang, Z. F., Lu, A. C. W., Rodriguez, I., and De Rooij, N. F. (2008) Thermally activated solvent bonding of polymers. *Microsyst. Technol.* 14, 753-759.

cchiello, E., Garbassi, F., and Malatesta, V. (1989) A study of the chemical and morphological alterations of PS and PC surfaces induced by excimer laser treatments. *J. Mater. Sci.* 24, 569-572.

Callewaert, K., Martelé, Y., Breban, L., Naessens, K., Vandaele, P., Baets, R., Geuskens, G., and Schacht, E. (2003) Excimer laser induced patterning of polymeric surfaces, in *Applied Surface Science*, pp 218-225.

Zhang, J.-Y., Esrom, H., Kogelschatz, U., and Emig, G. (1994) Modification of polymers with UV excimer radiation from lasers and lamps. *J. Adhes. Sci. Technol.* 8, 1179-1210.

Ghazaly, M. El, and Aydarous, A. (2017) Photoluminescence emission spectra of Makrofol® {DE} 1-1 upon irradiation with ultraviolet radiation. *Results Phys.* 7, 333-337.

Gupta, A., Rembaum, A., and Moacanin, J. (1978) Solid State Photochemistry of Polycarbonates. *Macromolecules* 11, 1285-1288.

Valle, G. Della, Osellame, R., and Laporta, P. (2009) Micromachining of photonic devices by femtosecond laser pulses. *J. Opt. A Pure Appl. Opt.* 11, 13001.

Suriano, R., Kuznetsov, A., Eaton, S. M., Kiyan, R., Cerullo, G., Osellame, R., Chichkov, B. N., Levi, M., and Turri, S. (2011) Femtosecond laser ablation of polymeric substrates for the fabrication of microfluidic channels. *Appl. Surf. Sci.* 257, 6243-6250.

Wang, Z. K., Zheng, H. Y., Lim, C. P., and Lam, Y. C. (2009) Polymer hydrophilicity and hydrophobicity induced by femtosecond laser direct irradiation. *Appl. Phys. Lett.* 95, 111110.

Harilal, S. S., Freeman, J. R., Diwakar, P. K., and Hassanein, A. (2014) Femtosecond Laser Ablation: Fundamentals and Applications, in *Laser-Induced Breakdown Spectroscopy: Theory and Applications* (Musazzi, S., and Perini, U., Eds.), pp 143-166. Springer Berlin Heidelberg, Berlin, Heidelberg.

Kijlstra, J., Reihs, K., and Klamt, A. (2002) Roughness and topology of ultra-hydrophobic surfaces, in *Colloids and Surfaces A: Physicochemical and Engineering Aspects*, pp 521-529.

Bhushan, B., Jung, Y., and Nosonovsky, M. (2010) Lotus effect: surfaces with roughness-induced superhydrophobicity, self-cleaning, and low adhesion. *Springer Handb* . . . 1437-1524.

Rebollar, E., Vázquez de Aldana, J. R., Pérez-Hernández, J. A., Ezquerra, T. A., Moreno, P., and Castillejo, M. (2012) Ultraviolet and infrared femtosecond laser induced periodic surface structures on thin polymer films. *Appl. Phys. Lett.* 100, 041106.

Colthup, N. B., Daly, L. H., and Wiberley, S. E. (1990) Introduction to Infrared and Raman Spectroscopy. *Introd. to Infrared Raman Spectrosc.*

Berthomieu, C., and Hienerwadel, R. (2009) Fourier transform infrared (FTIR) spectroscopy. *Photosynth. Res.* 101, 157-170.

Chércoles Asensio, R., San Andrds Moya, M., De La Roja, J. M., and Gómez, M. (2009) Analytical characterization of polymers used in conservation and restoration by ATR-FTIR spectroscopy, in *Analytical and Bioanalytical Chemistry*, pp 2081-2096.

Jung, M. R., Horgen, F. D., Orski, S. V., Rodriguez C., V., Beers, K. L., Balazs, G. H., Jones, T. T., Work, T. M., Brignac, K. C., Royer, S. J., Hyrenbach, K. D., Jensen, B. A., and Lynch, J. M. (2018) Validation of ATR FT-IR to identify polymers of plastic marine debris, including those ingested by marine organisms. *Mar. Pollut. Bull.* 127, 704-716.

Noda, I., Dowrey, A. E., Haynes, J. L., and Marcott, C. (2007) Group Frequency Assignments for Major Infrared Bands Observed in Common Synthetic Polymers, in *Physical Properties of Polymers Handbook* (Mark, J. E., Ed.), pp 395-406. Springer New York, New York, N.Y.

Vijayakumari, G., Selvakumar, N., Jeyasubramanian, K., and Mala, R. (2013) Investigation on the electrical properties of polymer metal nanocomposites for physiological sensing applications, in *Physics Procedia*, pp 67-78.

Andrade, J. D. (1985) X-ray Photoelectron Spectroscopy (XPS). *Surf. Interfacial Asp. Biomed. Polym.* 105-195.

Chusuei, C. C., and Goodman, D. W. (2003) X-Ray Photoelectron Spectroscopy, in *Encyclopedia of Physical Science and Technology*, pp 921-938.

Zisman, W. A. (1964) Relation of the Equilibrium Contact Angle to Liquid and Solid Constitution. *Contact Angle. Wettability. Adhes.* 43, 1-51.

Fowkes, F. M. (1964) Attractive forces at interfaces. *Ind. Eng. Chem.* 56, 40-52.

Wu, S. (1971) Calculation of interfacial tension in polymer systems. *J. Polym. Sci. Part C Polym. Symp.* 34, 19-30.

Li, D., and Neumann, A. W. (1992) Contact angles on hydrophobic solid surfaces and their interpretation. *J. Colloid Interface Sci.* 148, 190-200.

Owens, D. K., and Wendt, R. (1969) Estimation of the Surface Free Energy of Polymers. *J. Appl. Polym. Sci.* 13, 1741-1747.

Scanning Electron Microscopy, I., JENSEN, D. J., and CONRADSEN, K. (1978) Scanning electron microscopy., in *Scanning microscopy*, pp 127-160.

Zheng, Q., and Lü, C. (2014) Size Effects of Surface Roughness to Superhydrophobicity. *Procedia IUTAM* 10, 462-475.

Yoshimitsu, Z., Nakajima, A., Watanabe, T. and Hashimoto, K. (2002) Effects of Surface Structure on the Hydrophobicity and Sliding Behavior of Water Droplets. *Langmuir* 18(15), 5818-5822.

Wang, Y., Xie, F., Ma, S., and Dong, L. (2017) Review of surface profile measurement techniques based on optical interferometry. *Opt. Lasers Eng.* 93, 164-170.

Atkinson, J. T., and Lalor, M. J. (1980) The effect of surface roughness on fringe visibility in optical interferometry. *Opt. Lasers Eng.* 1, 131-146.

Yaqoob, Z., Wu, J., and Yang, C. (2005) Spectral domain optical coherence tomography: a better OCT imaging strategy. *Biotechniques*.

B., D., S., C., F., Z., C. H., C., J., Y., H. F., Z., and C., S. (2016) Real-time Functional Analysis of Inertial Microfluidic Devices via Spectral Domain Optical Coherence Tomography. *Sci. Rep.*

Schmitt, J. (1999) Optical Coherence Tomography (OCT): A Review. *IEEE J. Sel. Top. Quantum Electron.*

Podoleanu, A. G. (2012) Optical coherence tomography. *J. Microsc.*

George, M. W. (2006) The origins and the future of microfluidics. *Nature* 442, 368-373.

Burtis, C. A., Mailen, J. C., Johnson, W. F., Scott, C. D., Tiffany, T. O., and Anderson, N. G. (1972) Development of a Miniature Fast Analyzer. *Clin Chem* 18, 753-761.

Abaxis Inc. No Title.

Madou, M. J., Kellogg, G. J., and Soc Photo Opt Instrumentat Engineers, I. B. O. S. (1998) The LabCD™: A centrifuge-based microfluidic platform for diagnostics, in *Conference on Systems and Technologies for Clinical Diagnostics and Drug Discovery*, pp 80-93.

Forouzan, B. a. (2008) Tcp/ip protocol suite. McGraw-Hill.

Ruben, S. D. (2016) Respect the implementation: Using NI myRIO in undergraduate control education, in *Proceedings of the American Control Conference*, pp 7315-7320.

Hohman, B. (2007) LED light source: Major advance in fluorescence microscopy. *Biomed. Instrum. Technol.*

Houghton, H. (2002) LEDs: A flexible option for machine vision. *Sens. Rev.* 22, 130-133.

Resch-Genger, U., Grabolle, M., Cavaliere-Jaricot, S., Nitschke, R., and Nann, T. (2008) Quantum dots versus organic dyes as fluorescent labels. *Nat. Methods*.

National Instruments. (2016) LabVIEW System Design Software. *Natl. Instruments*.

Kangas, M. J., Burks, R. M., Atwater, J., Lukowicz, R. M., Williams, P., and Holmes, A. E. (2017) Colorimetric Sensor Arrays for the Detection and Identification of Chemical Weapons and Explosives. *Crit. Rev. Anal. Chem.* 47, 138-153.

Capitán-Vallvey, L. F., López-Ruiz, N., Martinez-Olmos, A., Erenas, M. M., and Palma, A. J. (2015) Recent developments in computer vision-based analytical chemistry: A tutorial review. *Anal. Chim. Acta.*

Pathak, A., Borana, J., Adhikari, J. V., and Gorthi, S. S. (2017) Indicator-impregnated agarose films for colorimetric measurement of pH. *SLAS Technol.* 22, 81-88.

de Sena, R. C., Soares, M., Pereira, M. L. O., da Silva, R. C. D., do Rosário, F. F., and da Silva, J. F. C. (2011) A Simple Method Based on the Application of a CCD Camera as a Sensor to Detect Low Concentrations of Barium Sulfate in Suspension. *Sensors (Basel).* 11, 864-875.

Moonrungsee, N., Pencharee, S., and Jakmunee, J. (2015) Colorimetric analyzer based on mobile phone camera for determination of available phosphorus in soil. *Talanta* 136, 204-209.

Maleki, N., Safavi, A., and Sedaghatpour, F. (2004) Single-step calibration, prediction and real samples data acquisition for artificial neural network using a CCD camera. *Talanta* 64, 830-835.

Solomon, C., Breckon, T., and Breckon, T. (2010) Fundamentals of Digital Image Processing: A Practical Approach with Examples in Matlab. John Wiley & Sons, Incorporated, New York, UNITED KINGDOM.

Garcia, J. E., Dyer, A. G., Greentree, A. D., Spring, G., and Wilksch, P. A. (2013) Linearisation of RGB Camera Responses for Quantitative Image Analysis of Visible and UV Photography: A Comparison of Two Techniques. *PLoS One* 8, e79534.

Huang, S. C., Cheng, F. C., and Chiu, Y. S. (2013) Efficient contrast enhancement using adaptive gamma correction with weighting distribution. *IEEE Trans. Image Process.* 22, 1032-1041.

Susu Yao, Weisi Lin, EePing Ong, and Zhongkang Lu. (2005) Contrast signal-to-noise ratio for image quality assessment, in *IEEE International Conference on Image Processing* 2005, pp I-397.

Inc., M. (2015) Image Processing Toolbox—MATLAB. *Image Process.*

Ko, Y. C., Ratner, B. D., and Hoffman, A. S. (1981) Characterization of hydrophilic-hydrophobic polymeric surfaces by contact angle measurements. *J. Colloid Interface Sci.* 82, 25-37.

Oss, C. J. van, Good, R. J., Busscher, H. J., and Busscher, R. J. (1990) Estimation of the Polar Surface Tension Parameters of Glycerol and Formamide, for Use in Contact Angle Measurements on Polar Solids. *J. Dispers. Sci. Technol.* 11, 75-81.

Maria Helena Adao, Benilde Saramago, and A. C. F. (1998) Langmuir. *Langmuir* 14, 4198-4203.

Janczuk, B., and Biallopiotrowicz, T. (1989) Surface free-energy components of liquids and low energy solids and contact angles. *J. Colloid Interface Sci.* 127, 189-204.

Thomas, S., Joseph, K., Malhotra, S. K., Goda, K., and Sreekala, M. S. (2012) Polymer Composites, Macro- and Microcomposites. *Polym. Compos.*

D. Fraser Steele, R. Christian Moreton, John N. Staniforth, corresponding author Paul M. Young, Michael J. Tobyn, and S. E. (2008) Surface Energy of Microcrystalline Cellulose Determined by Capillary Intrusion and Inverse Gas Chromatography. *AAPS J.* 10.

Segur, J. B., and Oberstar, H. E. (1951) Viscosity of Glycerol and Its Aqueous Solutions. *Ind. Eng. Chem.* 43, 2117-2120.

Dann, J. R. (1970) Forces involved in the adhesive process. II. Nondispersion forces at solid-liquid interfaces. *J. Colloid Interface Sci.* 32, 321-331.

Beattie, J. K., Djerdjev, A. M., Gray-Weale, A., Kallay, N., Lützenkirchen, J., Preočanin, T., and Selmani, A. (2014) PH and the surface tension of water. *J. Colloid Interface Sci.* 422, 54-57.

(2006) Surface Tension Components and Parameters of Liquids and Solids, in *Interfacial Forces in Aqueous Media, Second Edition*, pp 213-226. CRC Press.

Van Krevelen, D. W., and Te Nijenhuis, K. (2009) Volumetric Properties. *Prop. Polym.*

Hwang, S. S., Ober, C. K., Perutz, S., Iyengar, D. R., Schneggenburger, L. A., and Kramer, E. J. (1995) BLOCK-COPOLYMERS WITH LOW SURFACE-ENERGY SEGMENTS—SILOXANE-MODIFIED AND PERFLUOROALKANE-MODIFIED BLOCKS. *Polymer (Guildf).* 36, 1321-1325.

Janczuk, B., Bialopiotrowicz, T., and Wojcik, W. (1989) The Components of Surface-Tension of Liquids and Their Usefulness in Determinations of Surface Free-Energy of Solids. *J. Colloid Interface Sci.* 127, 59-66.

Ashes, J. R., Gulati, S. K., and Scott, T. W. (1997) Potential to Alter the Content and Composition of Milk Fat Through Nutrition. *J. Dairy Sci.* 80, 2204-2212.

Thiebaud, M., Dumay, E., Picart, L., Guiraud, J. P., and Cheftel, J. C. (2003) High-pressure homogenisation of raw bovine milk. Effects on fat globule size distribution and microbial inactivation. *Int. Dairy J.* 13, 427-439.

Goulden, J. D. S., and Phipps, L. W. (1964) Factors affecting the fat globule sizes during the homogenization of milk and cream. *J. Dairy Res.* 31, 195-200.

Paquin, P. (1999) Technological properties of high pressure homogenizers: The effect of fat globules, milk proteins, and polysaccharides, in *International Dairy Journal*, pp 329-335.

Tang, M., Wang, G., Kong, S. K., and Ho, H. P. (2016) A review of biomedical centrifugal microfluidic platforms. *Micromachines* 7.

Bhagat, A. A. S., Bow, H., Hou, H. W., Tan, S. J., Han, J., and Lim, C. T. (2010) Microfluidics for cell separation. *Med. Biol. Eng. Comput.*

Sackmann, E. K., Fulton, A. L., and Beebe, D. J. (2014) The present and future role of microfluidics in biomedical research. *Nature* 507, 181-9.

Wlodkowic, D., and Darzynkiewicz, Z. (2011) Rise of the micromachines: Microfluidics and the future of cytometry. *Methods Cell Biol.*

Gomez, F. A. (2013) The future of microfluidic point-of-care diagnostic devices. *Bioanalysis* 5, 1-3.

Attia, U. M., Marson, S., and Alcock, J. R. (2009) Micro-injection moulding of polymer microfluidic devices. *Microfluid. Nanofluidics.*

Boone, T. D., Fan, Z. H., Hooper, H. H., Ricco, A. J., Tan, H., and Williams, S. J. (2002) Plastic advances microfluidic devices. *Anal. Chem.* 74, 78A-86A.

Focke, M., Kosse, D., Al-Bamemi, D., Lutz, S., Müller, C., Reinecke, H., Zengerle, R., and von Stetten, F. (2011) Microthermoforming of microfluidic substrates by soft lithography (µTSL): optimization using design of experiments. *J. Micromechanics Microengineering* 21, 115002.

Aghvami, S. A., Opathalage, A., Zhang, Z. K., Ludwig, M., Heymann, M., Norton, M., Wilkins, N., and Fraden, S.

(2017) Rapid prototyping of cyclic olefin copolymer (COC) microfluidic devices. *Sensors Actuators. B Chem.* 247, 940-949.

Klank, H., Kutter, J. P., and Geschke, O. (2002) CO(2)-laser micromachining and back-end processing for rapid production of PMMA-based microfluidic systems. *Lab Chip* 2, 242-246.

Hong, T. F., Ju, W. J., Wu, M. C., Tai, C. H., Tsai, C. H., and Fu, L. M. (2010) Rapid prototyping of PMMA microfluidic chips utilizing a CO2 laser. *Microfluid. Nanofluidics* 9, 1125-1133.

Cheng, J. Y., Wei, C. W., Hsu, K. H., and Young, T. H. (2004) Direct-write laser micromachining and universal surface modification of PMMA for device development. *Sensors Actuators. B Chem.* 99, 186-1%.

Malek, C. G. K. (2006) Laser processing for bio-microfluidics applications (part II). *Anal. Bioanal. Chem.*

Romoli, L., Tantussi, G., and Dini, G. (2011) Experimental approach to the laser machining of PMMA substrates for the fabrication of microfluidic devices. *Opt. Lasers Eng.* 49, 419-427.

Prakash, S., and Kumar, S. (2015) Fabrication of microchannels on transparent PMMA using CO2 Laser (10.6 μm) for microfluidic applications: An experimental investigation. *Int. J. Precis. Eng. Manuf.* 16, 361-366.

Kant, R., Gupta, A., and Bhattacharya, S. (2015) Studies on CO2 Laser Micromachining on PMMA to Fabricate Micro Channel for Microfluidic Applications, in *Lasers Based Manufacturing: 5th International and 26th All India Manufacturing Technology. Design and Research Conference. AIMTDR* 2014 (Joshi, N. S., and Dixit, S. U., Eds.), pp 221-238. Springer India, New Delhi.

Nayak, N. C., Lam, Y. C., Yue, C. Y., and Sinha, A. T. (2008) CO2-laser micromachining of PMMA: the effect of polymer molecular weight. *J. Micromechanics Microengineering* 18, 095020.

Lippok, N., Coen, S., Nielsen, P., and Vanholsbeeck, F. (2012) Dispersion compensation in Fourier domain optical coherence tomography using the fractional Fourier transform. *Opt. Express* 20, 23398.

Snakenborg, D., Klank, H., and Kutter, J. P. (2004) Microstructure fabrication with a CO2 laser system. *J. Micromechanics Microengineering* 14, 182-189.

Chung, C. K., Lin, Y. C., and Huang, G. R. (2005) Bulge formation and improvement of the polymer in $CO_2$ laser micromachining. *J. Micromechanics Microengineering* 15, 1878-1884.

Golding, C. G., Lamboo, L. L., Beniac, D. R., and Booth, T. F. (2016) The scanning electron microscope in microbiology and diagnosis of infectious disease. *Sci Rep* 6, 26516.

Vladimir Majer Václav Svoboda; H. V Kehiaian (Henry V.). (1985) Enthalpies of vaporization of organic compounds: a critical review and data compilation. Oxford.

Haynes, W. M. (2012) CRC Handbook of Chemistry and Physics, 93rd Edition. *Handb. Chem. Phys.*

Srinivasan, R. (1993) Ablation of polymethyl methacrylate films by pulsed (ns) ultraviolet and infrared (9.17 μm) lasers: A comparative study by ultrafast imaging. *J. Appl. Phys.* 73, 2743-2750.

Petropoulos, G. P., Pandazaras, C. N., and Davim, J. P. (2010) Surface Texture Characterization and Evaluation Related to Machining, in *Surface Integrity in Machining* (Davim, J. P., Ed.), pp 37-66. Springer London, London.

Claycomb, R. W., and Delwiche, M. J. (1998) Biosensor for on-line measurement of bovine progesterone during milking. *Biosens. Bioelectron.* 13, 1173-1180.

Pope, G. S., Majzlik, I., Ball, P. J., and Leaver, J. D. (1976) Use of progesterone concentrations in plasma and milk in the diagnosis of pregnancy in domestic cattle. *Br. Vet. J.* 132, 497-506.

Romagnolo, D., and Nebel, R. L. (1993) The accuracy of enzyme-linked immunosorbent assay and latex agglutination progesterone test for the validation of estrus and early pregnancy diagnosis in dairy cattle. *Theriogenology* 39, 1121-1128.

Delwiche, M., Tang, X., Bondurant, R., and Munro, C. (2008) Estrus detection with a progesterone biosensor. *Trans. ASAE* 44, 2003-2008.

Lamming, G. E., and Darwash, A. O. (1998) The use of milk progesterone profiles to characterise components of subfertility in milked dairy cows. *Anim. Reprod. Sci.* 52, 175-190.

Delwiche, M., Tang, X., BonDurant, R., and Munro, C. (2001) Improved biosensor for measurement of progesterone in bovine milk. *Trans. Am. Soc. Agric. Eng.* 44.

Laura, T.-A., Jose, M. C.-F., Rosario, P., and Alfredo, S.-M. (2011) Development of a quantum dot-based fluorescent immunoassay for progesterone determination in bovine milk. *Biosens. Bioelectron.* 26, 4753-4759.

Jones, L. S., Randolph, T. W., Kohnert, U., Papadimitriou, A., Winter, G., Hagmann, M. L., Manning, M. C., and Carpenter, J. F. (2001) The effects of Tween 20 and sucrose on the stability of anti-L-selectin during lyophilization and reconstitution. *J. Pharm. Sci.* 90, 1466-1477.

Mensink, M. A., Frijlink, H. W., Van Der, K., Maarschalk, V., and Hinrichs, W. L. J. (2017) How sugars protect proteins in the solid state and during drying (review): Mechanisms of stabilization in relation to stress conditions. *Eur. J. Pharm. Biopharm.* 114, 288-295.

Ajmera, A., and Scherlieǣ, R. (2014) Stabilisation of proteins via mixtures of amino acids during spray drying. *Int. J. Pharm.* 463, 98-107.

McKENNA, A. B., and SINGH, H. (1991) Age gelation in UHT-processed reconstituted concentrated skim milk. *Int. J. Food Sci. Technol.* 26, 27-38.

Datta, N., and Deeth, H. C. (2001) Age gelation of UHT milk—A review. *Food Bioprod. Process. Trans. Inst. Chem. Eng. Part C.*

Harwalkar, V. R., Beckett, D. C., McKellar, R. C., Emmons, D. B., and Doyle, G. E. (1983) Age-Thickening and Gelation of Sterilized Evaporated Milk. *J. Dairy Sci.* 66, 735-742.

Ion Titapiccolo, G., Alexander, M., and Corredig, M. (2010) Rennet-induced aggregation of homogenized milk: Impact of the presence of fat globules on the structure of casein gels. *Dairy Sci. Technol.* 90, 623-639.

Kong, M. C. R., and Salin, E. D. (2010) Pneumatically Pumping Fluids Radially Inward On Centrifugal Microfluidic Platforms in Motion. *Anal. Chem.* 82, 8039-8041.

Clime, L., Brassard, D., Geissler, M., and Veres, T. (2015) Active pneumatic control of centrifugal microfluidic flows for lab-on-a-chip applications. *Lab Chip* 15, 2400-2411.

Rombach, M., Hin, S., Strohmeier, O., Von Stetten, F., Zengerle, R., and Mark, D. (2014) Pre-storage and release of purification reagents for full "hands-off" integration of DNA/RNA assays on the Labdisk platform, in *18th International Conference on Miniaturized Systems for Chemistry and Life Sciences. MicroTAS* 2014.

Van Oordt, T., Barb, Y., Smetana, J., Zengerle, R., and Von Stetten, F. (2013) Miniature stick-packaging-an industrial technology for pre-storage and release of reagents in lab-on-a-chip systems. *Lab Chip* 13, 2888-2892.

Van Oordt, T., Barb, Y., Zengerle, R., and Von Stetten, F. (2014) Lamination of polyethylene composite films by ultrasonic welding: Investigation of peel behavior and identification of optimum welding parameters. *J. Appl. Polym. Sci.* 131.

Van Oordt, T., Strohmeier, O., Mark, D., Zengerle, R., Eberhard, M., Drexler, J., Patel, P., Weidmann, M., Zgaga-Griesz, A., Bessler, W. G., and Von Stetten, F. (2012) The LabDisk—A fully automated centrifugal lab-on-a-chip system for the detection of biological threats, in *Communications in Computer and Information Science*, pp 220-223.

Kim, H. J., Liu, S., Keum, Y. S., Hwang, E. C., and Li, Q. X. (2003) Improved Enzyme-Linked Immunosorbent Assay for the Insecticide Imidacloprid, in *Environmental Fate and Effects ofPesticides*, pp 2-30. American Chemical Society.

Watkins, B. E., Stanker, L. H., and Vanderlaan, M. (1989) An immunoassay for chlorinated dioxins in soils. *Chemosphere* 19, 267-270.

Steinitz, M. (2000) Quantitation of the blocking effect of Tween 20 and bovine serum albumin in ELISA microwells. *Anal. Biochem.* 282, 232-238.

Yang, L. J., Yao, T. J., and Tai, Y. C. (2004) The marching velocity of the capillary meniscus in a microchannel. *J. Micromechanics Microengineering* 14, 220-225.

Tsao, C. W. (2016) Polymer microfluidics: Simple, low-cost fabrication process bridging academic lab research to commercialized production. *Micromachines*.

Konstantinou, D., Shirazi, A., Sadri, A., and Young, E. W. K. (2016) Combined hot embossing and milling for medium volume production of thermoplastic microfluidic devices. *Sensors Actuators. B Chem.* 234, 209-221.

Berthier, E., Young, E. W. K., and Beebe, D. (2012) Engineers are from PDMS-land, Biologists are from Polystyrenia. *Lab Chip* 12, 1224.

Goddard, J. M., and Hotchkiss, J. H. (2007) Polymer surface modification for the attachment of bioactive compounds. *Prog. Polym. Sci.*

Becker, H., and Locascio, L. E. (2002) Polymer microfluidic devices. *Talanta*.

Das, R. G. and D. Y. and S. (2011) Large-area microlens arrays fabricated on flexible polycarbonate sheets via single-step laser interference ablation. *J. Micromechanics Microengineering* 21, 15010.

Liu, J., Wang, S., Lv, M., and Zeng, X. (2014) Surface modification of bisphenol A polycarbonate material by ultraviolet Nd:YVO 4 laser high-speed microprocessing technology. *J. Micromechanics Microengineering* 24, 85002.

Kong, Y., Chen, H., Wang, Y., and Soper, S. A. (2006) Fabrication of a gold microelectrode for amperometric detection on a polycarbonate electrophoresis chip by photodirected electroless plating. *Electrophoresis* 27, 2940-2950.

Zhang, Y., Hansen, H. N., De Grave, A., Tang, P. T., and Nielsen, J. S. (2011) Selective metallization of polymers using laser induced surface activation (LISA)—characterization and optimization of porous surface topography. *Int. J. Adv. Manuf Technol.* 55, 573-580.

Zhou, Q., Chen, H., and Wang, Y. (2010) Region-selective electroless gold plating on polycarbonate sheets by UV-patterning in combination with silver activating. *Electrochim. Acta* 55, 2542-2549.

Hanafy, T. A. (2012) Dielectric relaxation and Schottky conduction of IR laser irradiated Makrofol-DE polycarbonate. *J. Appl. Polym. Sci.* 124, 1-8.

Devalckenaere, M., Jadin, A., Kolev, K., and Laude, L. D. (1999) Excimer laser ablation of polycarbonate-based plastic substrates. *Nucl. Instruments Methods Phys. Res. Sect. B-Beam Interact. with Mater. Atoms* 151, 263-267.

Naessens, K., Ottevaere, H., Baets, R., Van Daele, P., and Thienpont, H. (2003) Direct writing of microlenses in polycarbonate with excimer laser ablation. *Appl. Opt.* 42, 6349-6359.

Meunier, T., Villafranca, A. B., Bhardwaj, R., and Weck, A. (2012) Fabrication of microlens arrays in polycarbonate with nanojoule energy femtosecond laser pulses. *Opt. Lett.* 37, 4266-8.

Hu, J. P., and Qi, L. T. (2013) Experimental Investigation on Femtosecond Laser Ablation of Polycarbonate, in *Advances in Materials and Materials Processing*, pp 2359-2362. Trans Tech Publications.

Baudach, S., Bonse, J., Kruger, J., and Kautek, W. (2000) Ultrashort pulse laser ablation of polycarbonate and polymethylmethacrylate. *Appl. Surf Sci.* 154, 555-560.

Li, X., Ballerini, D. R., and Shen, W. (2012) A perspective on paper-based microfluidics: Current status and future trends. *Biomicrofluidics* 6, 11301-11313.

Casavant, B. P., Berthier, E., Theberge, A. B., Berthier, J., Montanez-Sauri, S. I., Bischel, L. L., Brakke, K., Hedman, C. J., Bushman, W., Keller, N. P., and Beebe, D. J. (2013) Suspended microfluidics. *Proc. Natl. Acad. Sci.* 110, 10111-10116.

Choi, K., Ng, A. H. C., Fobel, R., and Wheeler, A. R. (2012) Digital microfluidics. *Annu. Rev. Anal. Chem.* (Palo Alto. Calf.). 5, 413-40.

Jankowski, P., and Garstecki, P. (2016) Stable hydrophilic surface of polycarbonate. *Sensors Actuators B Chem.* 226, 151-155.

Vijayalakshmi, K. A., Mekala, M., Yoganand, C. P., and Navaneetha Pandiyaraj, K. (2011) Studies on modification of surface properties in polycarbonate (PC) film induced by DC glow discharge plasma. *Int. J. Polym. Sci.* 2011.

Mark, D., Weber, P., Lutz, S., Focke, M., Zengerle, R., and Von Stetten, F. (2011) Aliquoting on the centrifugal microfluidic platform based on centrifugo-pneumatic valves. *Microfluid. Nanofluidics* 10, 1279-1288.

Meng, X., Zhu, Y., Chen, Y., Lu, Y., Xu, Y., and Cheng, J. (2017) Conditional siphon priming for multi-step assays on centrifugal microfluidic platforms. *Sensors Actuators B Chem.* 242, 710-717.

Cai, T. min, Jia, Z. hai, Yang, H. nan, and Wang, G. (2016) Investigation of Cassie-Wenzel Wetting transitions on microstructured surfaces. *Colloid Polym. Sci.* 294, 833-840.

Weibin, G., Shimin, H., Minjiao, Y., long, J., and Yi, D. (2009) The effects of hydrothermal aging on properties and structure of bisphenol A polycarbonate. *Polym. Degrad. Stab.* 94, 13-17.

Jang, B. N., and Wilkie, C. A. (2005) The theral degradation of bisphenol a polycarbonate in air. *Thermochim. Acta* 426, 73-84.

Davis, A., and Golden, J. H. (1965) Competition between scission and cross-linking processes in the thermal degradation of a polycarbonate [11]. *Nature*.

Davis, A., and Golden, J. H. (1968) Thermal degradation of polycarbonate. *J. Chem. Soc. B Phys. Org.* 1967, 45-47.

Smith, M., Scudiero, L., Espinal, J., McEwen, J. S., and Garcia-Perez, M. (2016) Improving the deconvolution and interpretation of XPS spectra from chars by ab initio calculations. *Carbon N. Y.* 110, 155-171.

Moulder, J. F. (1992) Handbook of X-ray photoelectron spectroscopy: a reference book of standard spectra for identification and interpretation of XPS data. *Surf Interface Anal.*

Urbaniak-domagala, W. (2012) The Use of the Spectrometric Technique FTIR-ATR to Examine the Polymers Surface. *Adv. Apects Spectrosc.* 86-104.

Wenzel, R. N. (1936) Resistance of solid surfaces to wetting by water. *Ind. Eng. Chem.* 28, 988-994.

Ducrée, J. (2013) Centrifugal Microfluidics, in *Encyclopedia of Microfluidics and Nanofluidics* (Li, D., Ed.), pp 1-18. Springer US, Boston, Mass.

What is currently claimed:

1. A method of making a hydrophobic area and a super-hydrophilic area on at least one surface of a substrate or a film, comprising:
machining, using laser ablation, at least a portion of the at least one surface of the substrate or the film via a plurality of spot pulses from a laser to form, via a mask or a spatial light modulator (SLM), a super-hydrophilic area and a hydrophobic area,
wherein:
for the super-hydrophilic area, the laser comprises a nanosecond laser, and for the hydrophobic area, the laser comprises a femtosecond laser.

2. The method of claim 1, wherein the power of the nanosecond laser is configured based on the depth of ablation desired.

3. The method of claim 1, wherein a wavelength of the nanosecond laser is selected from the group consisting of: between 150-400 nm, 150-350 nm, 150-300 nm, 150-250 nm, 150-200 nm, 200-400 nm, 250-400 nm, 300-400 nm, and 350-400 nm.

4. The method of claim 1, wherein a wavelength of the nanosecond laser is selected in the UV range.

5. The method of claim 1, e nanosecond laser is a UV laser.

6. The method of claim 1, wherein the femtosecond laser is an IR laser.

7. The method of claim 1, wherein a wavelength of e nanosecond laser is 248 nm.

8. The method of claim 1, wherein the spot pulses of the nanosecond laser are delivered for a duration selected from the group consisting of: between 1-50 ns, between 5-50 ns, between 10-50 ns, between 15-50 ns, between 20-50 ns, between 25-50 ns, between 30-50 ns, between 35-50 ns, between 40-50 ns, and between 45-50 ns.

9. The method of claim 1, wherein a repetition rate of the nanosecond laser is selected from the group consisting of: between: 1 Hz-5 kHz, 1 Hz-4 kHz, 1 Hz-3 kHz, 1 Hz-2 kHz, 250 Hz-5 kHz, 250 Hz-4 kHz, 250 Hz-3 kHz, 500 Hz-5 kHz, 500 Hz-4 kHz, 500 Hz-5 kHz, 1-5 kHz, 1-4 kHz, 1-3 kHz, 1-2 kHz, 2-5 kHz, 2-4 kHz, 2-3 kHz, 3-5 kHz, 3-4 kHz, and 4-5 kHz.

10. The method of claim 1, wherein a repetition rate of the nanosecond laser is 500 Hz.

11. The method of claim 1, wherein a spot pulse size established by the nanosecond laser is selected from the group consisting of: between 10-10,000 $\mu m^2$, between 100-10,000 $\mu m^2$, between 250-10,000 $\mu m^2$, between 500-10,000 $\mu m^2$, between 750-10,000 $\mu m^2$, between 1,000-10,000 $\mu m^2$, between 2,000-10,000 $\mu m^2$, between 3,000-10,000 $\mu m^2$, between 4,000-10,000 $\mu m^2$, between 5,000-10,000 $\mu m^2$, between 6,000-10,000 $\mu m^2$, between 7,000-10,000 $\mu m^2$, between 8,000-10,000 $\mu m^2$, between 9,000-10,000 $\mu m^2$, between 10-1,000 $\mu m^2$, between 10-2,000 $\mu m^2$, between 10-3,000 $\mu m^2$, between 10-4,000 $\mu m^2$, between 10-5,000 $\mu m^2$, between 10-6,000 $\mu m^2$, between 10-7,000 $\mu m^2$, between 10-8,000 $\mu m^2$, between 10-9,000 $\mu m^2$, between 1,000-2,000 $\mu m^2$, between 1,000-3,000 $\mu m^2$, between 1,000-4,000 $\mu m^2$, between 1,000-5,000 $\mu m^2$, between 1,000-6,000 $\mu m^2$, between 1,000-7,000 $\mu m^2$, between 1,000-8,000 $\mu m^2$, between 1,000-9,000 $\mu m^2$, between and 1,000-10,000 $\mu m^2$.

12. The method of claim 1, wherein a spacing between spot pulses of the nanosecond laser is selected from the group consisting of: between 1-100,000 nm, between 1-75,000 nm, between 1-50,000 nm, between 1-25,000 nm, between 1-20,000 nm, between 1-15,000 nm, between 1-10,000 nm, between 1-5,000 nm, between 1-4,000 nm, between 1-3,000 nm, between 1-2,000 nm, between 1-1,000 nm, between 1000-100,000 nm, between 10,000-100,000 nm, between 25,000-100,000 nm, between 50,000-100,000 nm, and between 75,000-100,000 nm.

13. The method of claim 1, wherein a spacing between lines of spot pulses of the nanosecond laser is selected from the group consisting of: between 1 nm-1000 $\mu m$, between 1 nm-750 $\mu m$, between 1 nm-500 $\mu m$, between 1 nm-250 $\mu m$, between 1 nm-100 $\mu m$, between 1 nm-50 $\mu m$, between 1 nm-10 $\mu m$, between 1 nm-1 $\mu m$, between 10 nm-1000 $\mu m$, between 100 nm-1000 $\mu m$, between 1 nm-1000 $\mu m$, between 10 nm-1000 $\mu m$, between 100 $\mu m$-1000 $\mu m$, between 250 $\mu m$-1000 $\mu m$, between 500 $\mu m$-1000 $\mu m$, between 750 $\mu m$-1000 $\mu m$, between 800 $\mu m$-1000 $\mu m$, and between 900 $\mu m$-1000 $\mu m$.

14. The method of claim 1, wherein the nanosecond laser establishes the super-hydrophilic area within a channel, having a contact angle with the at least a surface of the hydrophobic area of less than 50 deg.

15. The method of claim 1, wherein the power of the femtosecond laser is configured based on the depth of ablation desired.

16. The method of claim 1, wherein the power of the femtosecond laser is selected from the group consisting of: between 1-1000 mW, between 10-1000 mW, between 25-1000 mW, between 50-1000 mW, between 100-1000 mW, between 250-1000 mW, between 300-1000 mW, between 400-1000 mW, between 500-1000 mW, between 750-1000 mW, between 800-1000 mW, between 900-1000 mW, between 1-900 mW, between 1-800 mW, between 1-700 mW, between 1-600 mW, between 1-500 mW, between 1-400 mW, between 1-300 mW, between 1-200 mW, between 1-100 mW, between 1-50 mW, between 1-25 mW, between 1-20 mW, between 1-15 mW, between 1-10 mW, and between 1-5 mW.

17. The method of claim 1, wherein a wavelength of the femtosecond laser is selected from the group consisting of: between 680-1130 nm, between 680-1000 nm, between 680-900 nm, between 680-800 nm, between 680-700 nm, between 700-1130 nm, between 800-1130 nm, between 900-1130 nm, and between 1000-1130 nm.

18. The method of claim 1, wherein the spot pulses of the femtosecond laser between 25-400 fs, between 50-400 fs, between 75-400 fs, between 100-400 fs, between 150-400 fs, between 00-400 fs, between 250-400 fs, between 300-400 fs, between 350-400 fs, between 10-300 fs, between 10-200 fs, between 10-100 fs, between 10-75 fs, between 10-50 fs, and between 10-25 fs.

19. The method of claim 10, wherein a repetition rate of the femtosecond laser is selected from the group consisting of: between 500 Hz-300 kHz, between 500 Hz-200 kHz, between 500 Hz-100 kHz, between 500 Hz-50 kHz, between 500 Hz-10 kHz, between 500 Hz-5 kHz, between 500 Hz-1 kHz, between 500 Hz-750 Hz, between 750 Hz-300 kHz, between 1 kHz-300 kHz, between 1.5 kHz-300 kHz, between 2 kHz-300 kHz, between 5 kHz-300 kHz, between 10 kHz-300 kHz, between 25 kHz-300 kHz, between 50 kHz-300 kHz, between 100 kHz-300 kHz, between 150 kHz-300 kHz, between 200 kHz-300 kHz, and between 250 kHz-300 kHz.

20. The method of claim 10, wherein a repetition rate of the femtosecond laser is 1 kHz.

21. The method of claim 10, wherein a spot size established by the femtosecond laser is selected from the group consisting of: between 1-2500 $\mu m^2$, between 1-2000 $\mu m^2$, between 1-1500 $\mu m^2$, between 1-1000 $\mu m^2$, between 1-750 $\mu m^2$, between 1-500 $\mu m^2$, between 1-250 $\mu m^2$, between 1-100 $\mu m^2$, between 1-75 $\mu m^2$, between 1-50 $\mu m^2$, between 1-25 $\mu m^2$, between 1-10 $\mu m^2$, between 1-5 $\mu m^2$, between 1-2 $\mu m^2$, between 10-2500 $\mu m^2$, between 25-2500 $\mu m^2$, between 50-2500 $\mu m^2$, between 75-2500 $\mu m^2$, between 100-2500 $\mu m^2$, between 250-2500 $\mu m^2$, between 500-2500 $\mu m^2$, between 750-2500 $\mu m^2$, between 1000-2500 $\mu m^2$, between 1250-2500 $\mu m^2$, between 1500-2500 $\mu m^2$, between 1750-2500 $\mu m^2$, between 2000-2500 $\mu m^2$, and between 2250-2500 $\mu m^2$.

22. The method of claim 10, wherein a spacing between spot pulses of the femtosecond laser is selected from the group consisting of: between 500 nm-100 $\mu m$, between 1 $\mu m$-100 $\mu m$, between 10 $\mu m$-100 $\mu m$, between 25 $\mu m$-100 $\mu m$, between 50 $\mu m$-100 $\mu m$, between 75 $\mu m$-100 $\mu m$, between 80 $\mu m$-100 $\mu m$, between 90 $\mu m$-100 $\mu m$, between 500 nm-90 $\mu m$, between 500 nm-75 $\mu m$, between 500 nm-50 $\mu m$, between 500 nm-25 $\mu m$, between 500 nm-10 $\mu m$, between 500 nm-5 $\mu m$; between 500 nm-2 $\mu m$, and between 500 nm-1 $\mu m$.

23. The method of claim 1, wherein a spacing between lines of spot pulses of the femtosecond laser is selected from the group consisting of: between 100 nm-100 $\mu m$, between 2500 nm-100 $\mu m$, between 500 nm-100 $\mu m$, between 750 nm-100 $\mu m$, between 1 $\mu m$-100 $\mu m$, between 2 nm-100 $\mu m$, between 5 $\mu m$-100 $\mu m$, between 10 $\mu m$-100 $\mu m$, between 25 $\mu m$-100 $\mu m$, between 30 $\mu m$-100 $\mu m$; between 40 $\mu m$-100 $\mu m$, between 50 $\mu m$-100 $\mu m$, between 75 $\mu m$-100 $\mu m$, between 80 $\mu m$-100 $\mu m$, between 90 $\mu m$-100 $\mu m$, between 100 nm-100 $\mu m$, between 100 nm-75 $\mu m$, between 100 nm-50 $\mu m$, between 100 nm-25 $\mu m$, between 100 nm-20 $\mu m$, between 100 nm-10 $\mu m$, between 100 nm-5 $\mu m$, between 100 nm-2 $\mu m$, between 100 nm-1 $\mu m$, between 100 nm-900 nm, between 100 nm-750 nm, between 100 nm-500 nm, between 100 nm-250 nm, between 100 nm-200 nm, and between 100 nm-150 nm.

24. The method of claim 1, wherein the femtosecond laser establishes the hydrophobic area within a channel, such that, at a contact angle θ of 90 degrees or greater is formed with the at least one surface within the hydrophobic area.

25. The methods of any of claim 1, wherein the substrate comprises a polycarbonate (PC) substrate or film, or a substrate or film material including properties corresponding to that of PC.

26. The methods of claim 1, w herein the substrate or film is adhered to one or more additional layers.

27. The method of claim 26, wherein the one or more additional layers comprise one or more of: at least one layer of polyethylene terephthalate (PET), at least one layer of polycarbonate (PC), at least one surface, at least one layer of polymethyl methacrylate (PMMA), and at least one layer of a pressure sensitive adhesive (PSA) arranged between adjacent layers.

28. The method of claim 1, wherein at least one of the super-hydrophilic areas and/or the hydrophobic areas are configured as valves for a microfluidic circuit, device, or channel.

* * * * *